US011787698B2

(12) United States Patent
 Kaner et al.

(10) Patent No.: US 11,787,698 B2
(45) Date of Patent: Oct. 17, 2023

(54) PURIFICATION AND DRYING OF GRAPHENE OXIDE

(71) Applicant: The Regents of the University of California, Oakland, CA (US)

(72) Inventors: Richard B. Kaner, Pacific Palisades, CA (US); Matthew Kowal, Los Angeles, CA (US); Dukwoo Jun, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 23 days.

(21) Appl. No.: 17/193,407

(22) Filed: Mar. 5, 2021

(65) Prior Publication Data

US 2021/0395094 A1    Dec. 23, 2021

Related U.S. Application Data

(63) Continuation of application No. 15/970,968, filed on May 4, 2018, now Pat. No. 10,988,383.

(Continued)

(51) Int. Cl.
  *C01B 32/198* (2017.01)
  *B01D 21/26* (2006.01)
(Continued)

(52) U.S. Cl.
  CPC .......... *C01B 32/198* (2017.08); *B01D 21/262* (2013.01); *B01D 61/14* (2013.01); *B01D 61/147* (2013.01); *B01D 2315/08* (2013.01); *B01D 2315/10* (2013.01); *B82Y 30/00* (2013.01); *B82Y 40/00* (2013.01); *C01P 2006/12* (2013.01);
(Continued)

(58) Field of Classification Search
  CPC ...... C01B 32/198; B01J 19/28; B01D 21/262; B01D 61/14; B01D 61/147; B01D 2315/10; C01P 2006/12; C01P 2006/408; Y10S 977/734; Y10S 977/845; B82Y 40/00; B82Y 30/00
  See application file for complete search history.

(56) References Cited

U.S. PATENT DOCUMENTS 9,108,158 B2   8/2015   Yu et al.
2010/0323177 A1   12/2010   Ruoff et al.
(Continued)

FOREIGN PATENT DOCUMENTS

CN    102992309 A    3/2013
CN    103011138 A    4/2013
(Continued)

OTHER PUBLICATIONS

First Office Action for Chinese Patent Application No. 2022072102033380, dated Jul. 26, 2022, 19 pages.
(Continued)

*Primary Examiner* — Richard M Rump
(74) *Attorney, Agent, or Firm* — Withrow & Terranova, P.L.L.C.

(57) ABSTRACT

Provided herein are graphene materials, fabrication processes, and devices with improved performance and a high throughput. In some embodiments, the present disclosure provides graphene oxide (GO) materials and methods for forming GO materials. Such methods for forming GO materials avoid the shortcomings of current forming methods, to facilitate facile, high-throughput production of GO materials.

25 Claims, 15 Drawing Sheets

Related U.S. Application Data

(60) Provisional application No. 62/509,970, filed on May 23, 2017, provisional application No. 62/501,999, filed on May 5, 2017.

(51) Int. Cl.
  *B01D 61/14* (2006.01)
  *B82Y 40/00* (2011.01)
  *B82Y 30/00* (2011.01)

(52) U.S. Cl.
  CPC ...... *C01P 2006/40* (2013.01); *C01P 2006/80* (2013.01); *Y10S 977/734* (2013.01); *Y10S 977/845* (2013.01)

(56) References Cited

U.S. PATENT DOCUMENTS

| | | |
|---|---|---|
| 2011/0052813 A1 | 3/2011 | Ho et al. |
| 2016/0347617 A1 | 12/2016 | Zhang et al. |
| 2018/0319667 A1 | 11/2018 | Kaner et al. |

FOREIGN PATENT DOCUMENTS

| | | | |
|---|---|---|---|
| CN | 103130216 | A | 6/2013 |
| CN | 103848419 | A | 6/2014 |
| CN | 104591142 | A | 5/2015 |
| CN | 106006623 | A | 10/2016 |
| EP | 3081530 | A1 | 10/2016 |
| JP | S4881170 | A | 10/1973 |
| JP | 2015160766 | A | 9/2015 |
| JP | 2016084266 | A | 5/2016 |
| WO | 2014179708 | A1 | 11/2014 |
| WO | 2016114617 | A1 | 7/2016 |
| WO | 2018204823 | A1 | 11/2018 |

OTHER PUBLICATIONS

Examination Report for European Patent Application No. 18794576.1, dated Jan. 4, 2022, 6 pages.
Ceriotti, G, et al., "Rapid method for the purification of graphene oxide," The Royal Society of Chemistry, vol. 5, Issue 62, 2015, 10 pages.
Chen, Ji, et al., "High-yield preparation of graphene oxide from small graphite flakes via an improved Hummers method with a simple purification process," Carbon, vol. 81, Oct. 2014, Elsevier Ltd, pp. 826-834.
Morimoto, N., et al., "Tailoring the Oxygen Content of Graphite and Reduced Graphene Oxide for Specific Applications," Scientific Reports, vol. 6, Article No. 21715, Feb. 25, 2016, 8 pages.
Tölle, F. J., et al., "Scale-up and purification of graphite oxide as intermediate for functionalized graphene," Carbon, vol. 75, Available online Apr. 13, 2014, pp. 432-442.
Non-Final Office Action for U.S. Appl. No. 15/970,968, dated Mar. 13, 2020, 9 pages.
Final Office Action for U.S. Appl. No. 15/970,968, dated Sep. 28, 2020, 6 pages.
Notice of Allowance for U.S. Appl. No. 15/970,968, dated Dec. 4, 2020, 7 pages.
Extended European Search Report for European Patent Application No. 18794576.1, dated Jan. 14, 2021, 9 pages.
International Search Report and Written Opinion for International Patent Application No. PCT/US2018/031149, dated Jul. 31, 2018, 8 pages.
International Preliminary Report on Patentability for International Patent Application No. PCT/US2018/031149, dated Nov. 14, 2019, 7 pages.
Notification of Reasons for Rejection for Japanese Patent Application No. 2019-560225, dated Mar. 2, 2022, 8 pages.
Second Office Action for Chinese Patent Application No. 2018800452950, dated Feb. 24, 2023, 11 pages.
Notification of Decision of Rejection for Japanese Patent Application No. 2019-560226, dated Dec. 23, 2022, 5 pages.
Notice of Preliminary Rejection for Korean Patent Application No. 10-2019-7033640, dated Nov. 10, 2022, 6 pages.

PURIFICATION AND DRYING OF GRAPHENE OXIDE

CROSS REFERENCE

This application is a continuation of U.S. patent application Ser. No. 15/970,968, filed May 4, 2018, now U.S. Pat. No. 10,988,383, which claims the benefit of U.S. Provisional Application No. 62/501,999, filed May 5, 2017, and U.S. Provisional Application No. 62/509,970, filed May 23, 2017, which applications are incorporated herein by reference in their entireties.

BACKGROUND

Provided herein are graphene materials, fabrication processes, and devices with improved performance and a high throughput. In some embodiments, the present disclosure provides graphene oxide (GO) materials and methods for forming GO materials. Such methods for forming GO materials avoid the shortcomings of current forming methods to facilitate facile, high-throughput production of GO materials.

SUMMARY

The instant disclosure provides graphene materials, fabrication processes, and devices with improved performance. In some embodiments, the present disclosure provides graphene oxide (GO) materials and methods for forming GO materials. Such methods for forming GO materials avoid the shortcomings of current graphene processing methods. Features of the subject matter described herein provide for a high throughput of GO materials with high purities for applications including, but not limited to, inkjet printing, screen printing, printed circuit boards, radio frequency identification chips, smart fabrics, conductive coatings, gravure printing, flexographic printing, batteries, supercapacitors, electrodes, electromagnetic interference shielding, printed transistors, memory, sensors, large area heaters, electronics, membranes, anti-static coatings, and energy storage systems.

A first aspect provided herein is a method of forming a purified GO material comprising: forming a GO suspension; dewatering the GO suspension with a first filter to form a dewatered GO suspension; forming a GO solution comprising the dewatered GO suspension and a solvent solution; and filtering the GO solution through a second filter. In some embodiments the method comprises: forming a GO suspension; depositing the GO suspension and a solvent solution onto a first filter; and filtering the GO solution through the first filter. In some embodiments, the GO suspension comprises GO. In some embodiments, forming a GO suspension comprises a Hummers' method.

In some embodiments, a mass of the GO suspension per an area of the first filter is about 3 kilograms per meter squared ($kg/m^2$) to about 30 $kg/m^2$. In some embodiments, a mass of the GO suspension per an area of the first filter is at least about 3 $kg/m^2$. In some embodiments, a mass of the GO suspension per an area of the first filter is at most about 30 $kg/m^2$. In some embodiments, a mass of the GO suspension per an area of the first filter is about 3 $kg/m^2$ to about 5 $kg/m^2$, about 3 $kg/m^2$ to about 8 $kg/m^2$, about 3 $kg/m^2$ to about 14 $kg/m^2$, about 3 $kg/m^2$ to about 18 $kg/m^2$, about 3 $kg/m^2$ to about 22 $kg/m^2$, about 3 $kg/m^2$ to about 26 $kg/m^2$, about 3 $kg/m^2$ to about 30 $kg/m^2$, about 5 $kg/m^2$ to about 8 $kg/m^2$, about 5 $kg/m^2$ to about 14 $kg/m^2$, about 5 $kg/m^2$ to about 18 $kg/m^2$, about 5 $kg/m^2$ to about 22 $kg/m^2$, about 5 $kg/m^2$ to about 26 $kg/m^2$, about 5 $kg/m^2$ to about 30 $kg/m^2$, about 8 $kg/m^2$ to about 14 $kg/m^2$, about 8 $kg/m^2$ to about 18 $kg/m^2$, about 8 $kg/m^2$ to about 22 $kg/m^2$, about 8 $kg/m^2$ to about 26 $kg/m^2$, about 8 $kg/m^2$ to about 30 $kg/m^2$, about 14 $kg/m^2$ to about 18 $kg/m^2$, about 14 $kg/m^2$ to about 22 $kg/m^2$, about 14 $kg/m^2$ to about 26 $kg/m^2$, about 14 $kg/m^2$ to about 30 $kg/m^2$, about 18 $kg/m^2$ to about 22 $kg/m^2$, about 18 $kg/m^2$ to about 26 $kg/m^2$, about 18 $kg/m^2$ to about 30 $kg/m^2$, about 22 $kg/m^2$ to about 26 $kg/m^2$, about 22 $kg/m^2$ to about 30 $kg/m^2$, or about 26 $kg/m^2$ to about 30 $kg/m^2$. In some embodiments, a mass of the GO suspension per an area of the first filter is about 3 $kg/m^2$, about 5 $kg/m^2$, about 8 $kg/m^2$, about 14 $kg/m^2$, about 18 $kg/m^2$, about 22 $kg/m^2$, about 26 $kg/m^2$, or about 30 $kg/m^2$. In some embodiments, a mass of the GO suspension per an area of the first filter is at least about 3 $kg/m^2$, about 5 $kg/m^2$, about 8 $kg/m^2$, about 14 $kg/m^2$, about 18 $kg/m^2$, about 22 $kg/m^2$, about 26 $kg/m^2$, or about 30 $kg/m^2$. In some embodiments, a mass of the GO suspension per an area of the first filter is at most about 3 $kg/m^2$, about 5 $kg/m^2$, about 8 $kg/m^2$, about 14 $kg/m^2$, about 18 $kg/m^2$, about 22 $kg/m^2$, about 26 $kg/m^2$, or about 30 $kg/m^2$.

In some embodiments, the percent by mass of the GO in the GO suspension is about 0.05% to about 2%. In some embodiments, the percent by mass of the GO in the GO suspension is at least about 0.05%. In some embodiments, the percent by mass of the GO in the GO suspension is at most about 2%. In some embodiments, the percent by mass of the GO in the GO suspension is about 0.05% to about 0.1%, about 0.05% to about 0.2%, about 0.05% to about 0.4%, about 0.05% to about 0.6%, about 0.05% to about 0.8%, about 0.05% to about 1%, about 0.05% to about 1.2%, about 0.05% to about 1.4%, about 0.05% to about 1.6%, about 0.05% to about 1.8%, about 0.05% to about 2%, about 0.1% to about 0.2%, about 0.1% to about 0.4%, about 0.1% to about 0.6%, about 0.1% to about 0.8%, about 0.1% to about 1%, about 0.1% to about 1.2%, about 0.1% to about 1.4%, about 0.1% to about 1.6%, about 0.1% to about 1.8%, about 0.1% to about 2%, about 0.2% to about 0.4%, about 0.2% to about 0.6%, about 0.2% to about 0.8%, about 0.2% to about 1%, about 0.2% to about 1.2%, about 0.2% to about 1.4%, about 0.2% to about 1.6%, about 0.2% to about 1.8%, about 0.2% to about 2%, about 0.4% to about 0.6%, about 0.4% to about 0.8%, about 0.4% to about 1%, about 0.4% to about 1.2%, about 0.4% to about 1.4%, about 0.4% to about 1.6%, about 0.4% to about 1.8%, about 0.4% to about 2%, about 0.6% to about 0.8%, about 0.6% to about 1%, about 0.6% to about 1.2%, about 0.6% to about 1.4%, about 0.6% to about 1.6%, about 0.6% to about 1.8%, about 0.6% to about 2%, about 0.8% to about 1%, about 0.8% to about 1.2%, about 0.8% to about 1.4%, about 0.8% to about 1.6%, about 0.8% to about 1.8%, about 0.8% to about 2%, about 1% to about 1.2%, about 1% to about 1.4%, about 1% to about 1.6%, about 1% to about 1.8%, about 1% to about 2%, about 1.2% to about 1.4%, about 1.2% to about 1.6%, about 1.2% to about 1.8%, about 1.2% to about 2%, about 1.4% to about 1.6%, about 1.4% to about 1.8%, about 1.4% to about 2%, about 1.6% to about 1.8%, about 1.6% to about 2%, or about 1.8% to about 2%. In some embodiments, the percent by mass of the GO in the GO suspension is about 0.05%, about 0.1%, about 0.2%, about 0.4%, about 0.6%, about 0.8%, about 1%, about 1.2%, about 1.4%, about 1.6%, about 1.8%, or about 2%. In some embodiments, the percent by mass of the GO in the GO suspension is at least about 0.05%, about 0.1%, about 0.2%, about 0.4%, about 0.6%, about 0.8%, about 1%, about 1.2%, about 1.4%, about 1.6%, about 1.8%, or about 2%. In some embodiments, the percent by mass of the GO in the GO suspension is at most about 0.05%, about 0.1%, about 0.2%, about 0.4%, about 0.6%, about 0.8%, about 1%, about 1.2%, about 1.4%, about 1.6%, about 1.8%, or about 2%.

In some embodiments, depositing the GO suspension and a solvent solution onto a first filter comprises depositing the GO suspension onto the first filter and then depositing the solvent solution onto the GO suspension on the first filter.

In some embodiments, the solvent solution comprises water, a solvent, or any combination thereof. In some embodiments, the solvent comprises an organic solvent. In some embodiments, the solvent comprises acetic acid, acetone, acetonitrile, benzene, 1-butanol, 2-butanol, 2-butanone, t-butyl alcohol, carbon tetrachloride, chlorobenzene, chloroform, cyclohexane, 1,2-dichloroethane, diethylene glycol, diethyl ether, diglyme, diethylene glycol, dimethyl ether, 1,2-dimethoxy-ethane, dimethyl-formamide, dimethyl sulfoxide, 1,4-dioxane, ethanol, ethyl acetate, ethylene glycol, glycerin, heptane, hexamethylphosphoramide, hexamethylphosphoroustriamide, hexane, methanol, methyl t-butyl ether, methylene chloride, N-methyl-2-pyrrolidinone, nitromethane, pentane, petroleum ether, 1-propanol, 2-propanol, pyridine, tetrahydrofuran, toluene, triethyl amine, o-xylene, m-xylene, p-xylene, or any combination thereof. In some embodiments, the organic solvent comprises a polar organic solvent. In some embodiments, the polar organic solvent comprises ethyl acetate, tetrahydrofuran, dichloromethane, acetone, acetonitrile, dimethylformamide, dimethyl sulfoxide, acetic acid, n-butanol, isopropanol, n-propanol, ethanol, methanol, formic acid, or any combination thereof. In some embodiments, the polar organic solvent comprises a protic polar organic solvent. In some embodiments, the protic polar organic solvent comprises acetic acid, n-butanol, isopropanol, n-propanol, ethanol, methanol, formic acid, or any combination thereof. In some embodiments, the polar organic solvent comprises an alcohol. In some embodiments, the alcohol comprises methanol, ethanol, propan-2-ol, butan-1-ol, pentan-1-ol, hexadecan-1-ol, ethane-1,2-diol, propane-1,2-diol, propane-1,2,3-triol, butane-1,2,3,4-tetraol, pentane-1,2,3,4,5-pentol, hexane-1,2,3,4,5,6-hexol, heptane-1,2,3,4,5,6,7-heptol, prop-2-ene-1-ol, 3,7-dimethylocta-2,6-dien-1-ol, prop-2-yn-1-ol, cyclohexane-1,2,3,4,5,6-hexol, 2-(2-propyl)-5-methylcyclohexane-1-ol, or any combination thereof. In some embodiments, the solvent comprises methanol, ethanol, acetone, dimethyl sulfoxide, dimethylformamide, N-methyl-2-pyrrolidone, or any combination thereof.

In some embodiments, the solvent has a vapor pressure of about 0.05 kilopascals (kPa) to about 30 kPa. In some embodiments, the solvent has a vapor pressure of at least about 0.05 kPa. In some embodiments, the solvent has a vapor pressure of at most about 30 kPa. In some embodiments, the solvent has a vapor pressure of about 0.05 kPa to about 0.1 kPa, about 0.05 kPa to about 1 kPa, about 0.05 kPa to about 3 kPa, about 0.05 kPa to about 6 kPa, about 0.05 kPa to about 9 kPa, about 0.05 kPa to about 15 kPa, about 0.05 kPa to about 20 kPa, about 0.05 kPa to about 25 kPa, about 0.05 kPa to about 30 kPa, about 0.1 kPa to about 1 kPa, about 0.1 kPa to about 3 kPa, about 0.1 kPa to about 6 kPa, about 0.1 kPa to about 9 kPa, about 0.1 kPa to about 15 kPa, about 0.1 kPa to about 20 kPa, about 0.1 kPa to about 25 kPa, about 0.1 kPa to about 30 kPa, about 1 kPa to about 3 kPa, about 1 kPa to about 6 kPa, about 1 kPa to about 9 kPa, about 1 kPa to about 15 kPa, about 1 kPa to about 20 kPa, about 1 kPa to about 25 kPa, about 1 kPa to about 30 kPa, about 3 kPa to about 6 kPa, about 3 kPa to about 9 kPa, about 3 kPa to about 15 kPa, about 3 kPa to about 20 kPa, about 3 kPa to about 25 kPa, about 3 kPa to about 30 kPa, about 6 kPa to about 9 kPa, about 6 kPa to about 15 kPa, about 6 kPa to about 20 kPa, about 6 kPa to about 25 kPa, about 6 kPa to about 30 kPa, about 9 kPa to about 15 kPa, about 9 kPa to about 20 kPa, about 9 kPa to about 25 kPa, about 9 kPa to about 30 kPa, about 15 kPa to about 20 kPa, about 15 kPa to about 25 kPa, about 15 kPa to about 30 kPa, about 20 kPa to about 25 kPa, about 20 kPa to about 30 kPa, or about 25 kPa to about 30 kPa. In some embodiments, the solvent has a vapor pressure of about 0.05 kPa, about 0.1 kPa, about 1 kPa, about 3 kPa, about 6 kPa, about 9 kPa, about 15 kPa, about 20 kPa, about 25 kPa, or about 30 kPa. In some embodiments, the solvent has a vapor pressure of at least about 0.05 kPa, about 0.1 kPa, about 1 kPa, about 3 kPa, about 6 kPa, about 9 kPa, about 15 kPa, about 20 kPa, about 25 kPa, or about 30 kPa. In some embodiments, the solvent has a vapor pressure of at most about 0.05 kPa, about 0.1 kPa, about 1 kPa, about 3 kPa, about 6 kPa, about 9 kPa, about 15 kPa, about 20 kPa, about 25 kPa, or about 30 kPa.

In some embodiments, the percent by mass of the solvent in the solvent solution is about 0.1% to about 99%. In some embodiments, the percent by mass of the solvent in the solvent solution is at least about 0.1%. In some embodiments, the percent by mass of the solvent in the solvent solution is at most about 99%. In some embodiments, the percent by mass of the solvent in the solvent solution is about 0.1% to about 1%, about 0.1% to about 5%, about 0.1% to about 10%, about 0.1% to about 15%, about 0.1% to about 20%, about 0.1% to about 30%, about 0.1% to about 40%, about 0.1% to about 50%, about 0.1% to about 60%, about 0.1% to about 80%, about 0.1% to about 99%, about 1% to about 5%, about 1% to about 10%, about 1% to about 15%, about 1% to about 20%, about 1% to about 30%, about 1% to about 40%, about 1% to about 50%, about 1% to about 60%, about 1% to about 80%, about 1% to about 99%, about 5% to about 10%, about 5% to about 15%, about 5% to about 20%, about 5% to about 30%, about 5% to about 40%, about 5% to about 50%, about 5% to about 60%, about 5% to about 80%, about 5% to about 99%, about 10% to about 15%, about 10% to about 20%, about 10% to about 30%, about 10% to about 40%, about 10% to about 50%, about 10% to about 60%, about 10% to about 80%, about 10% to about 99%, about 15% to about 20%, about 15% to about 30%, about 15% to about 40%, about 15% to about 50%, about 15% to about 60%, about 15% to about 80%, about 15% to about 99%, about 20% to about 30%, about 20% to about 40%, about 20% to about 50%, about 20% to about 60%, about 20% to about 80%, about 20% to about 99%, about 30% to about 40%, about 30% to about 50%, about 30% to about 60%, about 30% to about 80%, about 30% to about 99%, about 40% to about 50%, about 40% to about 60%, about 40% to about 80%, about 40% to about 99%, about 50% to about 60%, about 50% to about 80%, about 50% to about 99%, about 60% to about 80%, about 60% to about 99%, or about 80% to about 99%. In some embodiments, the percent by mass of the solvent in the solvent solution is about 0.1%, about 1%, about 5%, about 10%, about 15%, about 20%, about 30%, about 40%, about 50%, about 60%, about 80%, or about 99%. In some embodiments, the percent by mass of the solvent in the solvent solution is at least about 0.1%, about 1%, about 5%, about 10%, about 15%, about 20%, about 30%, about 40%, about 50%, about 60%, about 80%, or about 99%. In some embodiments, the percent by mass of the solvent in the solvent solution is at most about 0.1%, about 1%, about 5%, about 10%, about 15%, about 20%, about 30%, about 40%, about 50%, about 60%, about 80%, or about 99%.

In some embodiments, the percent by mass of the GO suspension in the GO suspension and the solvent solution is about 10% to about 60%. In some embodiments, the percent by mass of the GO suspension in the GO suspension and the solvent solution is at least about 10%. In some embodiments, the percent by mass of the GO suspension in the GO suspension and the solvent solution is at most about 60%. In some embodiments, the percent by mass of the GO suspension in the GO suspension and the solvent solution is about 10% to about 15%, about 10% to about 20%, about 10% to about 25%, about 10% to about 30%, about 10% to about 35%, about 10% to about 40%, about 10% to about 45%, about 10% to about 50%, about 10% to about 55%, about 10% to about 60%, about 15% to about 20%, about 15% to about 25%, about 15% to about 30%, about 15% to about 35%, about 15% to about 40%, about 15% to about 45%, about 15% to about 50%, about 15% to about 55%, about 15% to about 60%, about 20% to about 25%, about 20% to about 30%, about 20% to about 35%, about 20% to about 40%, about 20% to about 45%, about 20% to about 50%, about 20% to about 55%, about 20% to about 60%, about 25% to about 30%, about 25% to about 35%, about 25% to about 40%, about 25% to about 45%, about 25% to about 50%, about 25% to about 55%, about 25% to about 60%, about 30% to about 35%, about 30% to about 40%, about 30% to about 45%, about 30% to about 50%, about 30% to about 55%, about 30% to about 60%, about 35% to about 40%, about 35% to about 45%, about 35% to about 50%, about 35% to about 55%, about 35% to about 60%, about 40% to about 45%, about 40% to about 50%, about 40% to about 55%, about 40% to about 60%, about 45% to about 50%, about 45% to about 55%, about 45% to about 60%, about 50% to about 55%, about 50% to about 60%, or about 55% to about 60%. In some embodiments, the percent by mass of the GO suspension in the GO suspension and the solvent solution is about 10%, about 15%, about 20%, about 25%, about 30%, about 35%, about 40%, about 45%, about 50%, about 55%, or about 60%. In some embodiments, the percent by mass of the GO suspension in the GO suspension and the solvent solution is at least about 10%, about 15%, about 20%, about 25%, about 30%, about 35%, about 40%, about 45%, about 50%, about 55%, or about 60%. In some embodiments, the percent by mass of the GO suspension in the GO suspension and the solvent solution is at most about 10%, about 15%, about 20%, about 25%, about 30%, about 35%, about 40%, about 45%, about 50%, about 55%, or about 60%.

In some embodiments, filtering the GO solution comprises centrifugal filtering, dead-end filtering, cross-flow filtering, stationary phase filtering, dynamic phase filtering, surface filtering, depth filtering, vacuum filtering, recirculation filtering, or any combination thereof.

In some embodiments, filtering the GO solution comprises dead-end filtering and vacuum filtering, wherein a hydraulic pressure exerted upon the GO suspension is about 1 pound per square inch (psi) to about 5 psi. In some embodiments, filtering the GO solution comprises dead-end, vacuum filtering, wherein a hydraulic pressure exerted upon the GO suspension is at least about 1 psi. In some embodiments, filtering the GO solution comprises dead-end, vacuum filtering, wherein a hydraulic pressure exerted upon the GO suspension is at most about 5 psi. In some embodiments, filtering the GO solution comprises dead-end, vacuum filtering, wherein a hydraulic pressure exerted upon the GO suspension is about 1 psi to about 1.5 psi, about 1 psi to about 2 psi, about 1 psi to about 2.5 psi, about 1 psi to about 3 psi, about 1 psi to about 3.5 psi, about 1 psi to about 4 psi, about 1 psi to about 5 psi, about 1.5 psi to about 2 psi, about 1.5 psi to about 2.5 psi, about 1.5 psi to about 3 psi, about 1.5 psi to about 3.5 psi, about 1.5 psi to about 4 psi, about 1.5 psi to about 5 psi, about 2 psi to about 2.5 psi, about 2 psi to about 3 psi, about 2 psi to about 3.5 psi, about 2 psi to about 4 psi, about 2 psi to about 5 psi, about 2.5 psi to about 3 psi, about 2.5 psi to about 3.5 psi, about 2.5 psi to about 4 psi, about 2.5 psi to about 5 psi, about 3 psi to about 3.5 psi, about 3 psi to about 4 psi, about 3 psi to about 5 psi, about 3.5 psi to about 4 psi, about 3.5 psi to about 5 psi, or about 4 psi to about 5 psi. In some embodiments, filtering the GO solution comprises dead-end, vacuum filtering, wherein a hydraulic pressure exerted upon the GO suspension is about 1 psi, about 1.5 psi, about 2 psi, about 2.5 psi, about 3 psi, about 3.5 psi, about 4 psi, or about 5 psi. In some embodiments, filtering the GO solution comprises dead-end, vacuum filtering, wherein a hydraulic pressure exerted upon the GO suspension is at least about 1 psi, about 1.5 psi, about 2 psi, about 2.5 psi, about 3 psi, about 3.5 psi, about 4 psi, or about 5 psi. In some embodiments, filtering the GO solution comprises dead-end, vacuum filtering, wherein a hydraulic pressure exerted upon the GO suspension is at most about 1 psi, about 1.5 psi, about 2 psi, about 2.5 psi, about 3 psi, about 3.5 psi, about 4 psi, or about 5 psi.

In some embodiments, the first filter comprises a Buchner funnel, a surface filter, a sieve, a filter paper, a belt filter, a drum filter, a cross-flow filter, a screen filter, a depth filter, a polymeric membrane, a ceramic membrane, a stainless steel filter, a stainless steel mesh, a carbon fiber mesh, a microfilter, an ultrafilter, a membrane, or any combination thereof. In some embodiments, the first filter comprises a stainless steel, dead-end Buchner funnel.

In some embodiments, the first filter has a pore size of about 0.5 micrometers ($\mu$m) to about 100 $\mu$m. In some embodiments, the first filter has a pore size of at least about 0.5 $\mu$m. In some embodiments, the first filter has a pore size of at most about 100 $\mu$m. In some embodiments, the first filter has a pore size of about 0.5 $\mu$m to about 1 $\mu$m, about 0.5 $\mu$m to about 2 $\mu$m, about 0.5 $\mu$m to about 5 $\mu$m, about 0.5 $\mu$m to about 10 $\mu$m, about 0.5 $\mu$m to about 20 $\mu$m, about 0.5 $\mu$m to about 30 $\mu$m, about 0.5 $\mu$m to about 40 $\mu$m, about 0.5 $\mu$m to about 50 $\mu$m, about 0.5 $\mu$m to about 60 $\mu$m, about 0.5 $\mu$m to about 80 $\mu$m, about 0.5 $\mu$m to about 100 $\mu$m, about 1 $\mu$m to about 2 $\mu$m, about 1 $\mu$m to about 5 $\mu$m, about 1 $\mu$m to about 10 $\mu$m, about 1 $\mu$m to about 20 $\mu$m, about 1 $\mu$m to about 30 $\mu$m, about 1 $\mu$m to about 40 $\mu$m, about 1 $\mu$m to about 50 $\mu$m, about 1 $\mu$m to about 60 $\mu$m, about 1 $\mu$m to about 80 $\mu$m, about 1 $\mu$m to about 100 $\mu$m, about 2 $\mu$m to about 5 $\mu$m, about 2 $\mu$m to about 10 $\mu$m, about 2 $\mu$m to about 20 $\mu$m, about 2 $\mu$m to about 30 $\mu$m, about 2 $\mu$m to about 40 $\mu$m, about 2 $\mu$m to about 50 $\mu$m, about 2 $\mu$m to about 60 $\mu$m, about 2 $\mu$m to about 80 $\mu$m, about 2 $\mu$m to about 100 $\mu$m, about 5 $\mu$m to about 10 $\mu$m, about 5 $\mu$m to about 20 $\mu$m, about 5 $\mu$m to about 30 $\mu$m, about 5 $\mu$m to about 40 $\mu$m, about 5 $\mu$m to about 50 $\mu$m, about 5 $\mu$m to about 60 $\mu$m, about 5 $\mu$m to about 80 $\mu$m, about 5 $\mu$m to about 100 $\mu$m, about 10 $\mu$m to about 20 $\mu$m, about 10 $\mu$m to about 30 $\mu$m, about 10 $\mu$m to about 40 $\mu$m, about 10 $\mu$m to about 50 $\mu$m, about 10 $\mu$m to about 60 $\mu$m, about 10 $\mu$m to about 80 $\mu$m, about 10 $\mu$m to about 100 $\mu$m, about 20 $\mu$m to about 30 $\mu$m, about 20 $\mu$m to about 40 $\mu$m, about 20 $\mu$m to about 50 $\mu$m, about 20 $\mu$m to about 60 $\mu$m, about 20 $\mu$m to about 80 $\mu$m, about 20 $\mu$m to about 100 $\mu$m, about 30 $\mu$m to about 40 $\mu$m, about 30 $\mu$m to about 50 $\mu$m, about 30 $\mu$m to about 60 $\mu$m, about 30 µm to about 80 µm, about 30 µm to about 100 µm, about 40 µm to about 50 µm, about 40 µm to about 60 µm, about 40 µm to about 80 µm, about 40 µm to about 100 µm, about 50 µm to about 60 µm, about 50 µm to about 80 µm, about 50 µm to about 100 µm, about 60 µm to about 80 µm, about 60 µm to about 100 µm, or about 80 µm to about 100 µm. In some embodiments, the first filter has a pore size of about 0.5 µm, about 1 µm, about 2 µm, about 5 µm, about 10 µm, about 20 µm, about 30 µm, about 40 µm, about 50 µm, about 60 µm, about 80 µm, or about 100 µm. In some embodiments, the first filter has a pore size of at least about 0.5 µm, about 1 µm, about 2 µm, about 5 µm, about 10 µm, about 20 µm, about 30 µm, about 40 µm, about 50 µm, about 60 µm, about 80 µm, or about 100 µm. In some embodiments, the first filter has a pore size of at most about 0.5 µm, about 1 µm, about 2 µm, about 5 µm, about 10 µm, about 20 µm, about 30 µm, about 40 µm, about 50 µm, about 60 µm, about 80 µm, or about 100 µm.

Some embodiments further comprise dewatering the GO suspension. In some embodiments, the GO suspension is dewatered with a second filter before depositing the GO suspension and the solvent solution on a first filter.

In some embodiments, dewatering the GO suspension comprises centrifugal filtering, dead-end filtering, cross-flow filtering, stationary phase filtering, dynamic phase filtering, surface filtering, depth filtering, vacuum filtering, recirculation filtering, or any combination thereof. In some embodiments, the second filter comprises a Buchner funnel, a surface filter, a sieve, a filter paper, a belt filter, a drum filter, a cross-flow filter, a screen filter, a depth filter, a polymeric membrane, a ceramic membrane, a stainless steel filter, a stainless steel mesh, a carbon fiber mesh, a microfilter, an ultrafilter, a membrane, or any combination thereof. In some embodiments, the second filter comprises a stainless steel, dead-end Buchner funnel.

In some embodiments, the second filter has a pore size of about 0.5 µm to about 100 µm. In some embodiments, the second filter has a pore size of at least about 0.5 µm. In some embodiments, the second filter has a pore size of at most about 100 µm. In some embodiments, the second filter has a pore size of about 0.5 µm to about 1 µm, about 0.5 µm to about 2 µm, about 0.5 µm to about 5 µm, about 0.5 µm to about 10 µm, about 0.5 µm to about 20 µm, about 0.5 µm to about 30 µm, about 0.5 µm to about 40 µm, about 0.5 µm to about 50 µm, about 0.5 µm to about 60 µm, about 0.5 µm to about 80 µm, about 0.5 µm to about 100 µm, about 1 µm to about 2 µm, about 1 µm to about 5 µm, about 1 µm to about 10 µm, about 1 µm to about 20 µm, about 1 µm to about 30 µm, about 1 µm to about 40 µm, about 1 µm to about 50 µm, about 1 µm to about 60 µm, about 1 µm to about 80 µm, about 1 µm to about 100 µm, about 2 µm to about 5 µm, about 2 µm to about 10 µm, about 2 µm to about 20 µm, about 2 µm to about 30 µm, about 2 µm to about 40 µm, about 2 µm to about 50 µm, about 2 µm to about 60 µm, about 2 µm to about 80 µm, about 2 µm to about 100 µm, about 5 µm to about 10 µm, about 5 µm to about 20 µm, about 5 µm to about 30 µm, about 5 µm to about 40 µm, about 5 µm to about 50 µm, about 5 µm to about 60 µm, about 5 µm to about 80 µm, about 5 µm to about 100 µm, about 10 µm to about 20 µm, about 10 µm to about 30 µm, about 10 µm to about 40 µm, about 10 µm to about 50 µm, about 10 µm to about 60 µm, about 10 µm to about 80 µm, about 10 µm to about 100 µm, about 20 µm to about 30 µm, about 20 µm to about 40 µm, about 20 µm to about 50 µm, about 20 µm to about 60 µm, about 20 µm to about 80 µm, about 20 µm to about 100 µm, about 30 µm to about 40 µm, about 30 µm to about 50 µm, about 30 µm to about 60 µm, about 30 µm to about 80 µm, about 30 µm to about 100 µm, about 40 µm to about 50 µm, about 40 µm to about 60 µm, about 40 µm to about 80 µm, about 40 µm to about 100 µm, about 50 µm to about 60 µm, about 50 µm to about 80 µm, about 50 µm to about 100 µm, about 60 µm to about 80 µm, about 60 µm to about 100 µm, or about 80 µm to about 100 µm. In some embodiments, the second filter has a pore size of about 0.5 µm, about 1 µm, about 2 µm, about 5 µm, about 10 µm, about 20 µm, about 30 µm, about 40 µm, about 50 µm, about 60 µm, about 80 µm, or about 100 µm. In some embodiments, the second filter has a pore size of at least about 0.5 µm, about 1 µm, about 2 µm, about 5 µm, about 10 µm, about 20 µm, about 30 µm, about 40 µm, about 50 µm, about 60 µm, about 80 µm, or about 100 µm. In some embodiments, the second filter has a pore size of at most about 0.5 µm, about 1 µm, about 2 µm, about 5 µm, about 10 µm, about 20 µm, about 30 µm, about 40 µm, about 50 µm, about 60 µm, about 80 µm, or about 100 µm.

In some embodiments, the second filter is the first filter. In some embodiments, the second filter and the first filter are distinct filters.

In some embodiments, dewatering the GO suspension reduces a water content of the GO suspension by about 45% to about 99%. In some embodiments, dewatering the GO suspension reduces a water content of the GO suspension by at least about 45%. In some embodiments, dewatering the GO suspension reduces a water content of the GO suspension by at most about 99%. In some embodiments, dewatering the GO suspension reduces a water content of the GO suspension by about 45% to about 50%, about 45% to about 55%, about 45% to about 60%, about 45% to about 65%, about 45% to about 70%, about 45% to about 75%, about 45% to about 80%, about 45% to about 85%, about 45% to about 90%, about 45% to about 99%, about 50% to about 55%, about 50% to about 60%, about 50% to about 65%, about 50% to about 70%, about 50% to about 75%, about 50% to about 80%, about 50% to about 85%, about 50% to about 90%, about 50% to about 99%, about 55% to about 60%, about 55% to about 65%, about 55% to about 70%, about 55% to about 75%, about 55% to about 80%, about 55% to about 85%, about 55% to about 90%, about 55% to about 99%, about 60% to about 65%, about 60% to about 70%, about 60% to about 75%, about 60% to about 80%, about 60% to about 85%, about 60% to about 90%, about 60% to about 99%, about 65% to about 70%, about 65% to about 75%, about 65% to about 80%, about 65% to about 85%, about 65% to about 90%, about 65% to about 99%, about 70% to about 75%, about 70% to about 80%, about 70% to about 85%, about 70% to about 90%, about 70% to about 99%, about 75% to about 80%, about 75% to about 85%, about 75% to about 90%, about 75% to about 99%, about 80% to about 85%, about 80% to about 90%, about 80% to about 99%, about 85% to about 90%, about 85% to about 99%, or about 90% to about 99%. In some embodiments, dewatering the GO suspension reduces a water content of the GO suspension by about 45%, about 50%, about 55%, about 60%, about 65%, about 70%, about 75%, about 80%, about 85%, about 90%, or about 99%. In some embodiments, dewatering the GO suspension reduces a water content of the GO suspension by at least about 45%, about 50%, about 55%, about 60%, about 65%, about 70%, about 75%, about 80%, about 85%, about 90%, or about 99%. In some embodiments, dewatering the GO suspension reduces a water content of the GO suspension by at most about 45%, about 50%, about 55%, about 60%, about 65%, about 70%, about 75%, about 80%, about 85%, about 90%, or about 99%.

In some embodiments, the percent by mass of the GO in the GO suspension after dewatering the GO suspension is about 40% to about 90%. In some embodiments, the percent by mass of the GO in the GO suspension after dewatering the GO suspension is at least about 40%. In some embodiments, the percent by mass of the GO in the GO suspension after dewatering the GO suspension is at most about 90%. In some embodiments, the percent by mass of the GO in the GO suspension after dewatering the GO suspension is about 40% to about 45%, about 40% to about 50%, about 40% to about 55%, about 40% to about 60%, about 40% to about 65%, about 40% to about 70%, about 40% to about 75%, about 40% to about 80%, about 40% to about 85%, about 40% to about 90%, about 45% to about 50%, about 45% to about 55%, about 45% to about 60%, about 45% to about 65%, about 45% to about 70%, about 45% to about 75%, about 45% to about 80%, about 45% to about 85%, about 45% to about 90%, about 50% to about 55%, about 50% to about 60%, about 50% to about 65%, about 50% to about 70%, about 50% to about 75%, about 50% to about 80%, about 50% to about 85%, about 50% to about 90%, about 55% to about 60%, about 55% to about 65%, about 55% to about 70%, about 55% to about 75%, about 55% to about 80%, about 55% to about 85%, about 55% to about 90%, about 60% to about 65%, about 60% to about 70%, about 60% to about 75%, about 60% to about 80%, about 60% to about 85%, about 60% to about 90%, about 65% to about 70%, about 65% to about 75%, about 65% to about 80%, about 65% to about 85%, about 65% to about 90%, about 70% to about 75%, about 70% to about 80%, about 70% to about 85%, about 70% to about 90%, about 75% to about 80%, about 75% to about 85%, about 75% to about 90%, about 80% to about 85%, about 80% to about 90%, or about 85% to about 90%. In some embodiments, the percent by mass of the GO in the GO suspension after dewatering the GO suspension is about 40%, about 45%, about 50%, about 55%, about 60%, about 65%, about 70%, about 75%, about 80%, about 85%, or about 90%. In some embodiments, the percent by mass of the GO in the GO suspension after dewatering the GO suspension is at least about 40%, about 45%, about 50%, about 55%, about 60%, about 65%, about 70%, about 75%, about 80%, about 85%, or about 90%. In some embodiments, the percent by mass of the GO in the GO suspension after dewatering the GO suspension is at most about 40%, about 45%, about 50%, about 55%, about 60%, about 65%, about 70%, about 75%, about 80%, about 85%, or about 90%.

Some embodiments further comprise drying the GO suspension and the solvent solution. In some embodiments, drying the GO suspension is performed by air blowing, dry evaporation, heating (e.g., oven heating), freeze-drying, or any combination thereof. In some embodiments, the dry evaporation is performed at an ambient temperature. In some embodiments, the air blowing is performed with a dry gas stream. In some embodiments, the air blowing is performed with a dry gas stream at a pressure of about 10 psi to about 30 psi.

In some embodiments, the heating (e.g., oven heating) is performed at a temperature of about 10° C. to about 50° C. In some embodiments, the heating is performed at a temperature of at least about 10° C. In some embodiments, the heating is performed at a temperature of at most about 50° C. In some embodiments, the heating is performed at a temperature of about 10° C. to about 15° C., about 10° C. to about 20° C., about 10° C. to about 25° C., about 10° C. to about 30° C., about 10° C. to about 35° C., about 10° C. to about 40° C., about 10° C. to about 45° C., about 10° C. to about 50° C., about 15° C. to about 20° C., about 15° C. to about 25° C., about 15° C. to about 30° C., about 15° C. to about 35° C., about 15° C. to about 40° C., about 15° C. to about 45° C., about 15° C. to about 50° C., about 20° C. to about 25° C., about 20° C. to about 30° C., about 20° C. to about 35° C., about 20° C. to about 40° C., about 20° C. to about 45° C., about 20° C. to about 50° C., about 25° C. to about 30° C., about 25° C. to about 35° C., about 25° C. to about 40° C., about 25° C. to about 45° C., about 25° C. to about 50° C., about 30° C. to about 35° C., about 30° C. to about 40° C., about 30° C. to about 45° C., about 30° C. to about 50° C., about 35° C. to about 40° C., about 35° C. to about 45° C., about 35° C. to about 50° C., about 40° C. to about 45° C., about 40° C. to about 50° C., or about 45° C. to about 50° C. In some embodiments, the heating is performed at a temperature of about 10° C., about 15° C., about 20° C., about 25° C., about 30° C., about 35° C., about 40° C., about 45° C., or about 50° C. In some embodiments, the heating is performed at a temperature of at least about 10° C., about 15° C., about 20° C., about 25° C., about 30° C., about 35° C., about 40° C., about 45° C., or about 50° C. In some embodiments, the heating is performed at a temperature of at most about 10° C., about 15° C., about 20° C., about 25° C., about 30° C., about 35° C., about 40° C., about 45° C., or about 50° C.

In some embodiments, the percent by mass of the GO in the GO suspension after drying the GO suspension is about 30% to about 90%. In some embodiments, the percent by mass of the GO in the GO suspension after drying the GO suspension is at least about 30%. In some embodiments, the percent by mass of the GO in the GO suspension after drying the GO suspension is at most about 90%. In some embodiments, the percent by mass of the GO in the GO suspension after drying the GO suspension is about 30% to about 35%, about 30% to about 40%, about 30% to about 45%, about 30% to about 50%, about 30% to about 55%, about 30% to about 60%, about 30% to about 65%, about 30% to about 70%, about 30% to about 75%, about 30% to about 80%, about 30% to about 90%, about 35% to about 40%, about 35% to about 45%, about 35% to about 50%, about 35% to about 55%, about 35% to about 60%, about 35% to about 65%, about 35% to about 70%, about 35% to about 75%, about 35% to about 80%, about 35% to about 90%, about 40% to about 45%, about 40% to about 50%, about 40% to about 55%, about 40% to about 60%, about 40% to about 65%, about 40% to about 70%, about 40% to about 75%, about 40% to about 80%, about 40% to about 90%, about 45% to about 50%, about 45% to about 55%, about 45% to about 60%, about 45% to about 65%, about 45% to about 70%, about 45% to about 75%, about 45% to about 80%, about 45% to about 90%, about 50% to about 55%, about 50% to about 60%, about 50% to about 65%, about 50% to about 70%, about 50% to about 75%, about 50% to about 80%, about 50% to about 90%, about 55% to about 60%, about 55% to about 65%, about 55% to about 70%, about 55% to about 75%, about 55% to about 80%, about 55% to about 90%, about 60% to about 65%, about 60% to about 70%, about 60% to about 75%, about 60% to about 80%, about 60% to about 90%, about 65% to about 70%, about 65% to about 75%, about 65% to about 80%, about 65% to about 90%, about 70% to about 75%, about 70% to about 80%, about 70% to about 90%, about 75% to about 80%, about 75% to about 90%, or about 80% to about 90%. In some embodiments, the percent by mass of the GO in the GO suspension after drying the GO suspension is about 30%, about 35%, about 40%, about 45%, about 50%, about 55%, about 60%, about 65%, about 70%, about 75%, about 80%, or about 90%. In some embodiments, the percent by mass of the GO in the GO suspension after drying the GO suspension is at least about 30%, about 35%, about 40%, about 45%, about 50%, about 55%, about 60%, about 65%, about 70%, about 75%, about 80%, or about 90%. In some embodiments, the percent by mass of the GO in the GO suspension after drying the GO suspension is at most about 30%, about 35%, about 40%, about 45%, about 50%, about 55%, about 60%, about 65%, about 70%, about 75%, about 80%, or about 90%.

In some embodiments, drying the GO suspension forms a GO powder. In some embodiments, the GO powder is anhydrous, intercalated, exfoliated, or any combination thereof. In some embodiments, the GO powder comprises a single layer of GO. In some embodiments, the GO powder is dispersible in water, a polar solvent, or any combination thereof.

In some embodiments, the GO material is aqueous. In some embodiments, the aqueous material comprises an ink, a paste, a solution, a fluid, a liquid, a paint, a dye, a coating, or a compound.

In some embodiments the GO material has a surface area of about 800 $m^2/g$ to about 2,400 $m^2/g$. In some embodiments the GO material has a surface area of at least about 800 $m^2/g$. In some embodiments the GO material has a surface area of at most about 2,400 $m^2/g$. In some embodiments the GO material has a surface area of about 800 $m^2/g$ to about 1,000 $m^2/g$, about 800 $m^2/g$ to about 1,200 $m^2/g$, about 800 $m^2/g$ to about 1,400 $m^2/g$, about 800 $m^2/g$ to about 1,600 $m^2/g$, about 800 $m^2/g$ to about 1,800 $m^2/g$, about 800 $m^2/g$ to about 2,000 $m^2/g$, about 800 $m^2/g$ to about 2,200 $m^2/g$, about 800 $m^2/g$ to about 2,400 $m^2/g$, about 1,000 $m^2/g$ to about 1,200 $m^2/g$, about 1,000 $m^2/g$ to about 1,400 $m^2/g$, about 1,000 $m^2/g$ to about 1,600 $m^2/g$, about 1,000 $m^2/g$ to about 1,800 $m^2/g$, about 1,000 $m^2/g$ to about 2,000 $m^2/g$, about 1,000 $m^2/g$ to about 2,200 $m^2/g$, about 1,000 $m^2/g$ to about 2,400 $m^2/g$, about 1,200 $m^2/g$ to about 1,400 $m^2/g$, about 1,200 $m^2/g$ to about 1,600 $m^2/g$, about 1,200 $m^2/g$ to about 1,800 $m^2/g$, about 1,200 $m^2/g$ to about 2,000 $m^2/g$, about 1,200 $m^2/g$ to about 2,200 $m^2/g$, about 1,200 $m^2/g$ to about 2,400 $m^2/g$, about 1,400 $m^2/g$ to about 1,600 $m^2/g$, about 1,400 $m^2/g$ to about 1,800 $m^2/g$, about 1,400 $m^2/g$ to about 2,000 $m^2/g$, about 1,400 $m^2/g$ to about 2,200 $m^2/g$, about 1,400 $m^2/g$ to about 2,400 $m^2/g$, about 1,600 $m^2/g$ to about 1,800 $m^2/g$, about 1,600 $m^2/g$ to about 2,000 $m^2/g$, about 1,600 $m^2/g$ to about 2,200 $m^2/g$, about 1,600 $m^2/g$ to about 2,400 $m^2/g$, about 1,800 $m^2/g$ to about 2,000 $m^2/g$, about 1,800 $m^2/g$ to about 2,200 $m^2/g$, about 1,800 $m^2/g$ to about 2,400 $m^2/g$, about 2,000 $m^2/g$ to about 2,200 $m^2/g$, about 2,000 $m^2/g$ to about 2,400 $m^2/g$, or about 2,200 $m^2/g$ to about 2,400 $m^2/g$. In some embodiments the GO material has a surface area of about 800 $m^2/g$, about 1,000 $m^2/g$, about 1,200 $m^2/g$, about 1,400 $m^2/g$, about 1,600 $m^2/g$, about 1,800 $m^2/g$, about 2,000 $m^2/g$, about 2,200 $m^2/g$, or about 2,400 $m^2/g$.

In some embodiments the GO material has a conductivity of about 0.1 siemens per meter (S/m) to about 5 S/m. In some embodiments the GO material has a conductivity of at least about 0.1 S/m. In some embodiments the GO material has a conductivity of at most about 5 S/m. In some embodiments the GO material has a conductivity of about 0.1 S/m to about 0.2 S/m, about 0.1 S/m to about 0.5 S/m, about 0.1 S/m to about 0.75 S/m, about 0.1 S/m to about 1 S/m, about 0.1 S/m to about 2 S/m, about 0.1 S/m to about 3 S/m, about 0.1 S/m to about 4 S/m, about 0.1 S/m to about 5 S/m, about 0.2 S/m to about 0.5 S/m, about 0.2 S/m to about 0.75 S/m, about 0.2 S/m to about 1 S/m, about 0.2 S/m to about 2 S/m, about 0.2 S/m to about 3 S/m, about 0.2 S/m to about 4 S/m, about 0.2 S/m to about 5 S/m, about 0.5 S/m to about 0.75 S/m, about 0.5 S/m to about 1 S/m, about 0.5 S/m to about 2 S/m, about 0.5 S/m to about 3 S/m, about 0.5 S/m to about 4 S/m, about 0.5 S/m to about 5 S/m, about 0.75 S/m to about 1 S/m, about 0.75 S/m to about 2 S/m, about 0.75 S/m to about 3 S/m, about 0.75 S/m to about 4 S/m, about 0.75 S/m to about 5 S/m, about 1 S/m to about 2 S/m, about 1 S/m to about 3 S/m, about 1 S/m to about 4 S/m, about 1 S/m to about 5 S/m, about 2 S/m to about 3 S/m, about 2 S/m to about 4 S/m, about 2 S/m to about 5 S/m, about 3 S/m to about 4 S/m, about 3 S/m to about 5 S/m, or about 4 S/m to about 5 S/m. In some embodiments the GO material has a conductivity of about 0.1 S/m, about 0.2 S/m, about 0.5 S/m, about 0.75 S/m, about 1 S/m, about 2 S/m, about 3 S/m, about 4 S/m, or about 5 S/m. In some embodiments the GO material has a conductivity of at least about 0.1 S/m, about 0.2 S/m, about 0.5 S/m, about 0.75 S/m, about 1 S/m, about 2 S/m, about 3 S/m, about 4 S/m, or about 5 S/m. In some embodiments the GO material has a conductivity of at most about 0.1 S/m, about 0.2 S/m, about 0.5 S/m, about 0.75 S/m, about 1 S/m, about 2 S/m, about 3 S/m, about 4 S/m, or about 5 S/m.

In some embodiments the GO material has a C:O mass ratio of about 1:3 to about 5:1. In some embodiments the GO material has a C:O mass ratio of at least about 1:3. In some embodiments the GO material has a C:O mass ratio of at most about 5:1. In some embodiments the GO material has a C:O mass ratio of about 1:3 to about 1:2, about 1:3 to about 1:1, about 1:3 to about 2:1, about 1:3 to about 3:1, about 1:3 to about 4:1, about 1:3 to about 5:1, about 1:2 to about 1:1, about 1:2 to about 2:1, about 1:2 to about 3:1, about 1:2 to about 4:1, about 1:2 to about 5:1, about 1:1 to about 2:1, about 1:1 to about 3:1, about 1:1 to about 4:1, about 1:1 to about 5:1, about 2:1 to about 3:1, about 2:1 to about 4:1, about 2:1 to about 5:1, about 3:1 to about 4:1, about 3:1 to about 5:1, or about 4:1 to about 5:1. In some embodiments the GO material has a C:O mass ratio of about 1:3, about 1:2, about 1:1, about 2:1, about 3:1, about 4:1, or about 5:1. In some embodiments the GO material has a C:O mass ratio of at least about 1:3, about 1:2, about 1:1, about 2:1, about 3:1, about 4:1, or about 5:1. In some embodiments the GO material has a C:O mass ratio of at most about 1:3, about 1:2, about 1:1, about 2:1, about 3:1, about 4:1, or about 5:1.

In some embodiments the GO material has an oxidation percentage of about 15% to about 60%. In some embodiments the GO material has an oxidation percentage of at least about 15%. In some embodiments the GO material has an oxidation percentage of at most about 60%. In some embodiments the GO material has an oxidation percentage of about 15% to about 20%, about 15% to about 25%, about 15% to about 30%, about 15% to about 35%, about 15% to about 40%, about 15% to about 45%, about 15% to about 50%, about 15% to about 55%, about 15% to about 60%, about 20% to about 25%, about 20% to about 30%, about 20% to about 35%, about 20% to about 40%, about 20% to about 45%, about 20% to about 50%, about 20% to about 55%, about 20% to about 60%, about 25% to about 30%, about 25% to about 35%, about 25% to about 40%, about 25% to about 45%, about 25% to about 50%, about 25% to about 55%, about 25% to about 60%, about 30% to about 35%, about 30% to about 40%, about 30% to about 45%, about 30% to about 50%, about 30% to about 55%, about 30% to about 60%, about 35% to about 40%, about 35% to about 45%, about 35% to about 50%, about 35% to about 55%, about 35% to about 60%, about 40% to about 45%, about 40% to about 50%, about 40% to about 55%, about 40% to about 60%, about 45% to about 50%, about 45% to about 55%, about 45% to about 60%, about 50% to about 55%, about 50% to about 60%, or about 55% to about 60%. In some embodiments the GO material has an oxidation percentage of about 15%, about 20%, about 25%, about 30%, about 35%, about 40%, about 45%, about 50%, about 55%, or about 60%. In some embodiments the GO material has an oxidation percentage of at least about 15%, about 20%, about 25%, about 30%, about 35%, about 40%, about 45%, about 50%, about 55%, or about 60%. In some embodiments the GO material has an oxidation percentage of at most about 15%, about 20%, about 25%, about 30%, about 35%, about 40%, about 45%, about 50%, about 55%, or about 60%.

In some embodiments, at least one of the conductivity, the surface area, the C:O ratio, and the oxidization percentage of the GO material is measured by methylene blue absorption.

In some embodiments, the method of the first aspect is capable of producing a throughput of the GO material per an area of the first filter of about 100 grams per hour meter squared [$g/(h*m^2)$] to about 300 $g/(h*m^2)$. In some embodiments, the method of the first aspect is capable of producing a throughput of the GO material per an area of the first filter of at least about 100 $g/(h*m^2)$. In some embodiments, the method of the first aspect is capable of producing a throughput of the GO material per an area of the first filter of at most about 300 $g/(h*m^2)$. In some embodiments, the method of the first aspect is capable of producing a throughput of the GO material per an area of the first filter of about 100 $g/(h*m^2)$ to about 125 $g/(h*m^2)$, about 100 $g/(h*m^2)$ to about 150 $g/(h*m^2)$, about 100 $g/(h*m^2)$ to about 175 $g/(h*m^2)$, about 100 $g/(h*m^2)$ to about 200 $g/(h*m^2)$, about 100 $g/(h*m^2)$ to about 225 $g/(h*m^2)$, about 100 $g/(h*m^2)$ to about 250 $g/(h*m^2)$, about 100 $g/(h*m^2)$ to about 275 $g/(h*m^2)$, about 100 $g/(h*m^2)$ to about 300 $g/(h*m^2)$, about 125 $g/(h*m^2)$ to about 150 $g/(h*m^2)$, about 125 $g/(h*m^2)$ to about 175 $g/(h*m^2)$, about 125 $g/(h*m^2)$ to about 200 $g/(h*m^2)$, about 125 $g/(h*m^2)$ to about 225 $g/(h*m^2)$, about 125 $g/(h*m^2)$ to about 250 $g/(h*m^2)$, about 125 $g/(h*m^2)$ to about 275 $g/(h*m^2)$, about 125 $g/(h*m^2)$ to about 300 $g/(h*m^2)$, about 150 $g/(h*m^2)$ to about 175 $g/(h*m^2)$, about 150 $g/(h*m^2)$ to about 200 $g/(h*m^2)$, about 150 $g/(h*m^2)$ to about 225 $g/(h*m^2)$, about 150 $g/(h*m^2)$ to about 250 $g/(h*m^2)$, about 150 $g/(h*m^2)$ to about 275 $g/(h*m^2)$, about 150 $g/(h*m^2)$ to about 300 $g/(h*m^2)$, about 175 $g/(h*m^2)$ to about 200 $g/(h*m^2)$, about 175 $g/(h*m^2)$ to about 225 $g/(h*m^2)$, about 175 $g/(h*m^2)$ to about 250 $g/(h*m^2)$, about 175 $g/(h*m^2)$ to about 275 $g/(h*m^2)$, about 175 $g/(h*m^2)$ to about 300 $g/(h*m^2)$, about 200 $g/(h*m^2)$ to about 225 $g/(h*m^2)$, about 200 $g/(h*m^2)$ to about 250 $g/(h*m^2)$, about 200 $g/(h*m^2)$ to about 275 $g/(h*m^2)$, about 200 $g/(h*m^2)$ to about 300 $g/(h*m^2)$, about 225 $g/(h*m^2)$ to about 250 $g/(h*m^2)$, about 225 $g/(h*m^2)$ to about 275 $g/(h*m^2)$, about 225 $g/(h*m^2)$ to about 300 $g/(h*m^2)$, about 250 $g/(h*m^2)$ to about 275 $g/(h*m^2)$, about 250 $g/(h*m^2)$ to about 300 $g/(h*m^2)$, or about 275 $g/(h*m^2)$ to about 300 $g/(h*m^2)$. In some embodiments, the method of the first aspect is capable of producing a throughput of the GO material per an area of the first filter of about 100 $g/(h*m^2)$, about 125 $g/(h*m^2)$, about 150 $g/(h*m^2)$, about 175 $g/(h*m^2)$, about 200 $g/(h*m^2)$, about 225 $g/(h*m^2)$, about 250 $g/(h*m^2)$, about 275 $g/(h*m^2)$, or about 300 $g/(h*m^2)$. In some embodiments, the method of the first aspect is capable of producing a throughput of the GO material per an area of the first filter of at least about 100 $g/(h*m^2)$, about 125 $g/(h*m^2)$, about 150 $g/(h*m^2)$, about 175 $g/(h*m^2)$, about 200 $g/(h*m^2)$, about 225 $g/(h*m^2)$, about 250 $g/(h*m^2)$, about 275 $g/(h*m^2)$, or about 300 $g/(h*m^2)$. In some embodiments, the method of the first aspect is capable of producing a throughput of the GO material per an area of the first filter of at most about 100 $g/(h*m^2)$, about 125 $g/(h*m^2)$, about 150 $g/(h*m^2)$, about 175 $g/(h*m^2)$, about 200 $g/(h*m^2)$, about 225 $g/(h*m^2)$, about 250 $g/(h*m^2)$, about 275 $g/(h*m^2)$, or about 300 $g/(h*m^2)$.

A second aspect provided herein is a method of forming a purified GO material comprising: adding a solvent solution to a GO suspension comprising GO; and filtering the GO solution through a first filter. In some embodiments, the GO suspension is formed by a Hummers' method.

In some embodiments, the percent by mass of the GO in the GO suspension is about 0.05% to about 2%. In some embodiments, the percent by mass of the GO in the GO suspension is at least about 0.05%. In some embodiments, the percent by mass of the GO in the GO suspension is at most about 2%. In some embodiments, the percent by mass of the GO in the GO suspension is about 0.05% to about 0.1%, about 0.05% to about 0.2%, about 0.05% to about 0.4%, about 0.05% to about 0.6%, about 0.05% to about 0.8%, about 0.05% to about 1%, about 0.05% to about 1.2%, about 0.05% to about 1.4%, about 0.05% to about 1.6%, about 0.05% to about 1.8%, about 0.05% to about 2%, about 0.1% to about 0.2%, about 0.1% to about 0.4%, about 0.1% to about 0.6%, about 0.1% to about 0.8%, about 0.1% to about 1%, about 0.1% to about 1.2%, about 0.1% to about 1.4%, about 0.1% to about 1.6%, about 0.1% to about 1.8%, about 0.1% to about 2%, about 0.2% to about 0.4%, about 0.2% to about 0.6%, about 0.2% to about 0.8%, about 0.2% to about 1%, about 0.2% to about 1.2%, about 0.2% to about 1.4%, about 0.2% to about 1.6%, about 0.2% to about 1.8%, about 0.2% to about 2%, about 0.4% to about 0.6%, about 0.4% to about 0.8%, about 0.4% to about 1%, about 0.4% to about 1.2%, about 0.4% to about 1.4%, about 0.4% to about 1.6%, about 0.4% to about 1.8%, about 0.4% to about 2%, about 0.6% to about 0.8%, about 0.6% to about 1%, about 0.6% to about 1.2%, about 0.6% to about 1.4%, about 0.6% to about 1.6%, about 0.6% to about 1.8%, about 0.6% to about 2%, about 0.8% to about 1%, about 0.8% to about 1.2%, about 0.8% to about 1.4%, about 0.8% to about 1.6%, about 0.8% to about 1.8%, about 0.8% to about 2%, about 1% to about 1.2%, about 1% to about 1.4%, about 1% to about 1.6%, about 1% to about 1.8%, about 1% to about 2%, about 1.2% to about 1.4%, about 1.2% to about 1.6%, about 1.2% to about 1.8%, about 1.2% to about 2%, about 1.4% to about 1.6%, about 1.4% to about 1.8%, about 1.4% to about 2%, about 1.6% to about 1.8%, about 1.6% to about 2%, or about 1.8% to about 2%. In some embodiments, the percent by mass of the GO in the GO suspension is about 0.05%, about 0.1%, about 0.2%, about 0.4%, about 0.6%, about 0.8%, about 1%, about 1.2%, about 1.4%, about 1.6%, about 1.8%, or about 2%. In some embodiments, the percent by mass of the GO in the GO suspension is at least about 0.05%, about 0.1%, about 0.2%, about 0.4%, about 0.6%, about 0.8%, about 1%, about 1.2%, about 1.4%, about 1.6%, about 1.8%, or about 2%. In some embodiments, the percent by mass of the GO in the GO suspension is at most about 0.05%, about 0.1%, about 0.2%, about 0.4%, about 0.6%, about 0.8%, about 1%, about 1.2%, about 1.4%, about 1.6%, about 1.8%, or about 2%.

In some embodiments, the percent by mass of the GO suspension in the GO suspension and the solvent solution is about 10% to about 50%. In some embodiments, the percent by mass of the GO suspension in the GO suspension and the solvent solution is at least about 10%. In some embodiments, the percent by mass of the GO suspension in the GO suspension and the solvent solution is at most about 50%. In some embodiments, the percent by mass of the GO suspension in the GO suspension and the solvent solution is about 10% to about 15%, about 10% to about 20%, about 10% to about 25%, about 10% to about 30%, about 10% to about 35%, about 10% to about 40%, about 10% to about 45%, about 10% to about 50%, about 15% to about 20%, about 15% to about 25%, about 15% to about 30%, about 15% to about 35%, about 15% to about 40%, about 15% to about 45%, about 15% to about 50%, about 20% to about 25%, about 20% to about 30%, about 20% to about 35%, about 20% to about 40%, about 20% to about 45%, about 20% to about 50%, about 25% to about 30%, about 25% to about 35%, about 25% to about 40%, about 25% to about 45%, about 25% to about 50%, about 30% to about 35%, about 30% to about 40%, about 30% to about 45%, about 30% to about 50%, about 35% to about 40%, about 35% to about 45%, about 35% to about 50%, about 40% to about 45%, about 40% to about 50%, or about 45% to about 50%. In some embodiments, the percent by mass of the GO suspension in the GO suspension and the solvent solution is about 10%, about 15%, about 20%, about 25%, about 30%, about 35%, about 40%, about 45%, or about 50%. In some embodiments, the percent by mass of the GO suspension in the GO suspension and the solvent solution is at least about 10%, about 15%, about 20%, about 25%, about 30%, about 35%, about 40%, about 45%, or about 50%. In some embodiments, the percent by mass of the GO suspension in the GO suspension and the solvent solution is at most about 10%, about 15%, about 20%, about 25%, about 30%, about 35%, about 40%, about 45%, or about 50%.

In some embodiments, the solvent solution comprises water, a solvent, or any combination thereof. In some embodiments, the solvent comprises an organic solvent. In some embodiments, the solvent comprises acetic acid, acetone, acetonitrile, benzene, 1-butanol, 2-butanol, 2-butanone, t-butyl alcohol, carbon tetrachloride, chlorobenzene, chloroform, cyclohexane, 1,2-dichloroethane, diethylene glycol, diethyl ether, diglyme, diethylene glycol, dimethyl ether, 1,2-dimethoxy-ethane, dimethyl-formamide, dimethyl sulfoxide, 1,4-dioxane, ethanol, ethyl acetate, ethylene glycol, glycerin, heptane, hexamethylphosphoramide, hexamethylphosphoroustriamide, hexane, methanol, methyl t-butyl ether, methylene chloride, N-methyl-2-pyrrolidinone, nitromethane, pentane, petroleum ether, 1-propanol, 2-propanol, pyridine, tetrahydrofuran, toluene, triethyl amine, o-xylene, m-xylene, p-xylene, or any combination thereof. In some embodiments, the organic solvent comprises a polar organic solvent. In some embodiments, the polar organic solvent comprises ethyl acetate, tetrahydrofuran, dichloromethane, acetone, acetonitrile, dimethylformamide, dimethyl sulfoxide, acetic acid, n-butanol, isopropanol, n-propanol, ethanol, methanol, formic acid, or any combination thereof. In some embodiments, the polar organic solvent comprises a protic polar organic solvent. In some embodiments, the protic polar organic solvent comprises acetic acid, n-butanol, isopropanol, n-propanol, ethanol, methanol, formic acid, or any combination thereof. In some embodiments, the polar organic solvent comprises an alcohol. In some embodiments, the alcohol comprises methanol, ethanol, propan-2-ol, butan-1-ol, pentan-1-ol, hexadecan-1-ol, ethane-1,2-diol, propane-1,2-diol, propane-1,2,3-triol, butane-1,2,3,4-tetraol, pentane-1,2,3,4,5-pentol, hexane-1,2,3,4,5,6-hexol, heptane-1,2,3,4,5,6,7-heptol, prop-2-ene-1-ol, 3,7-dimethylocta-2,6-dien-1-ol, prop-2-yn-1-ol, cyclohexane-1,2,3,4,5,6-hexol, 2-(2-propyl)-5-methyl-cyclohexane-1-ol, or any combination thereof. In some embodiments, the solvent comprises methanol, ethanol, acetone, dimethyl sulfoxide, dimethylformamide, N-methyl-2-pyrrolidone, or any combination thereof.

In some embodiments, the solvent has a vapor pressure of about 0.05 kPa to about 30 kPa. In some embodiments, the solvent has a vapor pressure of at least about 0.05 kPa. In some embodiments, the solvent has a vapor pressure of at most about 30 kPa. In some embodiments, the solvent has a vapor pressure of about 0.05 kPa to about 0.1 kPa, about 0.05 kPa to about 1 kPa, about 0.05 kPa to about 3 kPa, about 0.05 kPa to about 6 kPa, about 0.05 kPa to about 9 kPa, about 0.05 kPa to about 15 kPa, about 0.05 kPa to about 20 kPa, about 0.05 kPa to about 25 kPa, about 0.05 kPa to about 30 kPa, about 0.1 kPa to about 1 kPa, about 0.1 kPa to about 3 kPa, about 0.1 kPa to about 6 kPa, about 0.1 kPa to about 9 kPa, about 0.1 kPa to about 15 kPa, about 0.1 kPa to about 20 kPa, about 0.1 kPa to about 25 kPa, about 0.1 kPa to about 30 kPa, about 1 kPa to about 3 kPa, about 1 kPa to about 6 kPa, about 1 kPa to about 9 kPa, about 1 kPa to about 15 kPa, about 1 kPa to about 20 kPa, about 1 kPa to about 25 kPa, about 1 kPa to about 30 kPa, about 3 kPa to about 6 kPa, about 3 kPa to about 9 kPa, about 3 kPa to about 15 kPa, about 3 kPa to about 20 kPa, about 3 kPa to about 25 kPa, about 3 kPa to about 30 kPa, about 6 kPa to about 9 kPa, about 6 kPa to about 15 kPa, about 6 kPa to about 20 kPa, about 6 kPa to about 25 kPa, about 6 kPa to about 30 kPa, about 9 kPa to about 15 kPa, about 9 kPa to about 20 kPa, about 9 kPa to about 25 kPa, about 9 kPa to about 30 kPa, about 15 kPa to about 20 kPa, about 15 kPa to about 25 kPa, about 15 kPa to about 30 kPa, about 20 kPa to about 25 kPa, about 20 kPa to about 30 kPa, or about 25 kPa to about 30 kPa. In some embodiments, the solvent has a vapor pressure of about 0.05 kPa, about 0.1 kPa, about 1 kPa, about 3 kPa, about 6 kPa, about 9 kPa, about 15 kPa, about 20 kPa, about 25 kPa, or about 30 kPa. In some embodiments, the solvent has a vapor pressure of at least about 0.05 kPa, about 0.1 kPa, about 1 kPa, about 3 kPa, about 6 kPa, about 9 kPa, about 15 kPa, about 20 kPa, about 25 kPa, or about 30 kPa. In some embodiments, the solvent has a vapor pressure of at most about 0.05 kPa, about 0.1 kPa, about 1 kPa, about 3 kPa, about 6 kPa, about 9 kPa, about 15 kPa, about 20 kPa, about 25 kPa, or about 30 kPa.

In some embodiments, the percent by mass of the solvent in the solvent solution is about 0.1% to about 99%. In some embodiments, the percent by mass of the solvent in the solvent solution is at least about 0.1%. In some embodiments, the percent by mass of the solvent in the solvent solution is at most about 99%. In some embodiments, the percent by mass of the solvent in the solvent solution is about 0.1% to about 1%, about 0.1% to about 5%, about 0.1% to about 10%, about 0.1% to about 15%, about 0.1% to about 20%, about 0.1% to about 30%, about 0.1% to about 40%, about 0.1% to about 50%, about 0.1% to about 60%, about 0.1% to about 80%, about 0.1% to about 99%, about 1% to about 5%, about 1% to about 10%, about 1% to about 15%, about 1% to about 20%, about 1% to about 30%, about 1% to about 40%, about 1% to about 50%, about 1% to about 60%, about 1% to about 80%, about 1% to about 99%, about 5% to about 10%, about 5% to about 15%, about 5% to about 20%, about 5% to about 30%, about 5% to about 40%, about 5% to about 50%, about 5% to about 60%, about 5% to about 80%, about 5% to about 99%, about 10% to about 15%, about 10% to about 20%, about 10% to about 30%, about 10% to about 40%, about 10% to about 50%, about 10% to about 60%, about 10% to about 80%, about 10% to about 99%, about 15% to about 20%, about 15% to about 30%, about 15% to about 40%, about 15% to about 50%, about 15% to about 60%, about 15% to about 80%, about 15% to about 99%, about 20% to about 30%, about 20% to about 40%, about 20% to about 50%, about 20% to about 60%, about 20% to about 80%, about 20% to about 99%, about 30% to about 40%, about 30% to about 50%, about 30% to about 60%, about 30% to about 80%, about 30% to about 99%, about 40% to about 50%, about 40% to about 60%, about 40% to about 80%, about 40% to about 99%, about 50% to about 60%, about 50% to about 80%, about 50% to about 99%, about 60% to about 80%, about 60% to about 99%, or about 80% to about 99%. In some embodiments, the percent by mass of the solvent in the solvent solution is about 0.1%, about 1%, about 5%, about 10%, about 15%, about 20%, about 30%, about 40%, about 50%, about 60%, about 80%, or about 99%. In some embodiments, the percent by mass of the solvent in the solvent solution is at least about 0.1%, about 1%, about 5%, about 10%, about 15%, about 20%, about 30%, about 40%, about 50%, about 60%, about 80%, or about 99%. In some embodiments, the percent by mass of the solvent in the solvent solution is at most about 0.1%, about 1%, about 5%, about 10%, about 15%, about 20%, about 30%, about 40%, about 50%, about 60%, about 80%, or about 99%.

In some embodiments, filtering the GO solution comprises centrifugal filtering, dead-end filtering, cross-flow filtering, stationary phase filtering, dynamic phase filtering, surface filtering, depth filtering, vacuum filtering, recirculation filtering, or any combination thereof. In some embodiments, the first filter comprises a Buchner funnel, a surface filter, a sieve, a filter paper, a belt filter, a drum filter, a cross-flow filter, a screen filter, a depth filter, a polymeric membrane, a ceramic membrane, a stainless steel filter, a stainless steel mesh, a carbon fiber mesh, a microfilter, an ultrafilter, a membrane, or any combination thereof.

In some embodiments, the first filter has a pore size of about 0.5 µm to about 100 µm. In some embodiments, the first filter has a pore size of at least about 0.5 µm. In some embodiments, the first filter has a pore size of at most about 100 µm. In some embodiments, the first filter has a pore size of about 0.5 µm to about 1 µm, about 0.5 µm to about 2 µm, about 0.5 µm to about 5 µm, about 0.5 µm to about 10 µm, about 0.5 µm to about 20 µm, about 0.5 µm to about 30 µm, about 0.5 µm to about 40 µm, about 0.5 µm to about 50 µm, about 0.5 µm to about 60 µm, about 0.5 µm to about 80 µm, about 0.5 µm to about 100 µm, about 1 µm to about 2 µm, about 1 µm to about 5 µm, about 1 µm to about 10 µm, about 1 µm to about 20 µm, about 1 µm to about 30 µm, about 1 µm to about 40 µm, about 1 µm to about 50 µm, about 1 µm to about 60 µm, about 1 µm to about 80 µm, about 1 µm to about 100 µm, about 2 µm to about 5 µm, about 2 µm to about 10 µm, about 2 µm to about 20 µm, about 2 µm to about 30 µm, about 2 µm to about 40 µm, about 2 µm to about 50 µm, about 2 µm to about 60 µm, about 2 µm to about 80 µm, about 2 µm to about 100 µm, about 5 µm to about 10 µm, about 5 µm to about 20 µm, about 5 µm to about 30 µm, about 5 µm to about 40 µm, about 5 µm to about 50 µm, about 5 µm to about 60 µm, about 5 µm to about 80 µm, about 5 µm to about 100 µm, about 10 µm to about 20 µm, about 10 µm to about 30 µm, about 10 µm to about 40 µm, about 10 µm to about 50 µm, about 10 µm to about 60 µm, about 10 µm to about 80 µm, about 10 µm to about 100 µm, about 20 µm to about 30 µm, about 20 µm to about 40 µm, about 20 µm to about 50 µm, about 20 µm to about 60 µm, about 20 µm to about 80 µm, about 20 µm to about 100 µm, about 30 µm to about 40 µm, about 30 µm to about 50 µm, about 30 µm to about 60 µm, about 30 µm to about 80 µm, about 30 µm to about 100 µm, about 40 µm to about 50 µm, about 40 µm to about 60 µm, about 40 µm to about 80 µm, about 40 µm to about 100 µm, about 50 µm to about 60 µm, about 50 µm to about 80 µm, about 50 µm to about 100 µm, about 60 µm to about 80 µm, about 60 µm to about 100 µm, or about 80 µm to about 100 µm. In some embodiments, the first filter has a pore size of about 0.5 µm, about 1 µm, about 2 µm, about 5 µm, about 10 µm, about 20 µm, about 30 µm, about 40 µm, about 50 µm, about 60 µm, about 80 µm, or about 100 µm. In some embodiments, the first filter has a pore size of at least about 0.5 µm, about 1 µm, about 2 µm, about 5 µm, about 10 µm, about 20 µm, about 30 µm, about 40 µm, about 50 µm, about 60 µm, about 80 µm, or about 100 µm. In some embodiments, the first filter has a pore size of at most about 0.5 µm, about 1 µm, about 2 µm, about 5 µm, about 10 µm, about 20 µm, about 30 µm, about 40 µm, about 50 µm, about 60 µm, about 80 µm, or about 100 µm.

In some embodiments, a volumetric flux of the GO suspension and the solvent solution through the first filter is about 10 liters per hour meter squared [$L/(h*m^2)$] to about 100 $L/(h*m^2)$. In some embodiments, a volumetric flux of the GO suspension and the solvent solution through the first filter is at least about 10 $L/(h*m^2)$. In some embodiments, a volumetric flux of the GO suspension and the solvent solution through the first filter is at most about 100 $L/(h*m^2)$. In some embodiments, a volumetric flux of the GO suspension and the solvent solution through the first filter is about 10 $L/(h*m^2)$ to about 20 $L/(h*m^2)$, about 10 $L/(h*m^2)$ to about 30 $L/(h*m^2)$, about 10 $L/(h*m^2)$ to about 40 $L/(h*m^2)$, about 10 $L/(h*m^2)$ to about 50 $L/(h*m^2)$, about 10 $L/(h*m^2)$ to about 60 $L/(h*m^2)$, about 10 $L/(h*m^2)$ to about 70 $L/(h*m^2)$, about 10 $L/(h*m^2)$ to about 80 $L/(h*m^2)$, about 10 $L/(h*m^2)$ to about 90 $L/(h*m^2)$, about 10 $L/(h*m^2)$ to about 100 $L/(h*m^2)$, about 20 $L/(h*m^2)$ to about 30 $L/(h*m^2)$, about 20 $L/(h*m^2)$ to about 40 $L/(h*m^2)$, about 20 $L/(h*m^2)$ to about 50 $L/(h*m^2)$, about 20 $L/(h*m^2)$ to about 60 $L/(h*m^2)$, about 20 $L/(h*m^2)$ to about 70 $L/(h*m^2)$, about 20 $L/(h*m^2)$ to about 80 $L/(h*m^2)$, about 20 $L/(h*m^2)$ to about 90 $L/(h*m^2)$, about 20 $L/(h*m^2)$ to about 100 $L/(h*m^2)$, about 30 $L/(h*m^2)$ to about 40 $L/(h*m^2)$, about 30 $L/(h*m^2)$ to about 50 $L/(h*m^2)$, about 30 $L/(h*m^2)$ to about 60 $L/(h*m^2)$, about 30 $L/(h*m^2)$ to about 70 $L/(h*m^2)$, about 30 $L/(h*m^2)$ to about 80 $L/(h*m^2)$, about 30 $L/(h*m^2)$ to about 90 $L/(h*m^2)$, about 30 $L/(h*m^2)$ to about 100 $L/(h*m^2)$, about 40 $L/(h*m^2)$ to about 50 $L/(h*m^2)$, about 40 $L/(h*m^2)$ to about 60 $L/(h*m^2)$, about 40 $L/(h*m^2)$ to about 70 $L/(h*m^2)$, about 40 $L/(h*m^2)$ to about 80 $L/(h*m^2)$, about 40 $L/(h*m^2)$ to about 90 $L/(h*m^2)$, about 40 $L/(h*m^2)$ to about 100 $L/(h*m^2)$, about 50 $L/(h*m^2)$ to about 60 $L/(h*m^2)$, about 50 $L/(h*m^2)$ to about 70 $L/(h*m^2)$, about 50 $L/(h*m^2)$ to about 80 $L/(h*m^2)$, about 50 $L/(h*m^2)$ to about 90 $L/(h*m^2)$, about 50 $L/(h*m^2)$ to about 100 $L/(h*m^2)$, about 60 $L/(h*m^2)$ to about 70 $L/(h*m^2)$, about 60 $L/(h*m^2)$ to about 80 $L/(h*m^2)$, about 60 $L/(h*m^2)$ to about 90 $L/(h*m^2)$, about 60 $L/(h*m^2)$ to about 100 $L/(h*m^2)$, about 70 $L/(h*m^2)$ to about 80 $L/(h*m^2)$, about 70 $L/(h*m^2)$ to about 90 $L/(h*m^2)$, about 70 $L/(h*m^2)$ to about 100 $L/(h*m^2)$, about 80 $L/(h*m^2)$ to about 90 $L/(h*m^2)$, about 80 $L/(h*m^2)$ to about 100 $L/(h*m^2)$, or about 90 $L/(h*m^2)$ to about 100 $L/(h*m^2)$. In some embodiments, a volumetric flux of the GO suspension and the solvent solution through the first filter is about 10 $L/(h*m^2)$, about 20 $L/(h*m^2)$, about 30 $L/(h*m^2)$, about 40 $L/(h*m^2)$, about 50 $L/(h*m^2)$, about 60 $L/(h*m^2)$, about 70 $L/(h*m^2)$, about 80 $L/(h*m^2)$, about 90 $L/(h*m^2)$, or about 100 $L/(h*m^2)$. In some embodiments, a volumetric flux of the GO suspension and the solvent solution through the first filter is at least about 10 $L/(h*m^2)$, about 20 L/(h*m$^2$), about 30 L/(h*m$^2$), about 40 L/(h*m$^2$), about 50 L/(h*m$^2$), about 60 L/(h*m$^2$), about 70 L/(h*m$^2$), about 80 L/(h*m$^2$), or about 90 L/(h*m$^2$), or about 100 L/(h*m$^2$). In some embodiments, a volumetric flux of the GO suspension and the solvent solution through the first filter is at most about 10 L/(h*m$^2$), about 20 L/(h*m$^2$), about 30 L/(h*m$^2$), about 40 L/(h*m$^2$), about 50 L/(h*m$^2$), about 60 L/(h*m$^2$), about 70 L/(h*m$^2$), about 80 L/(h*m$^2$), about 90 L/(h*m$^2$), or about 100 L/(h*m$^2$).

In some embodiments, filtering the GO solution comprises cross-flow recirculation filtering the GO solution to form a retentate and a permeate, wherein the retentate is added to the GO solution. Some embodiments further comprise continually adding a volume of the solvent solution to the GO solution during the cross-flow recirculation filtering of the GO solution. In some embodiments, the volume of the solvent solution is added to the GO solution is added at a solvent solution flow rate approximately equal to a flow rate of the permeate.

In some embodiments, for a period of time the solvent solution comprises water. In some embodiments, for a period of time the solvent solution comprises a solvent. In some embodiments, for a period of time the solvent solution comprises water and a solvent. In some embodiments, the solvent comprises an organic solvent. In some embodiments, for a period of time the solvent solution comprises at least one of water and a solvent.

Some embodiments further comprise dewatering the GO suspension. In some embodiments, the GO suspension is dewatered with a second filter before depositing the GO suspension and the solvent solution on a first filter.

In some embodiments, dewatering the GO suspension reduces the water content of the GO suspension by about 45% to about 99%. In some embodiments, dewatering the GO suspension reduces a water content of the GO suspension by at least about 45%. In some embodiments, dewatering the GO suspension reduces a water content of the GO suspension by at most about 99%. In some embodiments, dewatering the GO suspension reduces a water content of the GO suspension by about 45% to about 50%, about 45% to about 55%, about 45% to about 60%, about 45% to about 65%, about 45% to about 70%, about 45% to about 75%, about 45% to about 80%, about 45% to about 85%, about 45% to about 90%, about 45% to about 99%, about 50% to about 55%, about 50% to about 60%, about 50% to about 65%, about 50% to about 70%, about 50% to about 75%, about 50% to about 80%, about 50% to about 85%, about 50% to about 90%, about 50% to about 99%, about 55% to about 60%, about 55% to about 65%, about 55% to about 70%, about 55% to about 75%, about 55% to about 80%, about 55% to about 85%, about 55% to about 90%, about 55% to about 99%, about 60% to about 65%, about 60% to about 70%, about 60% to about 75%, about 60% to about 80%, about 60% to about 85%, about 60% to about 90%, about 60% to about 99%, about 65% to about 70%, about 65% to about 75%, about 65% to about 80%, about 65% to about 85%, about 65% to about 90%, about 65% to about 99%, about 70% to about 75%, about 70% to about 80%, about 70% to about 85%, about 70% to about 90%, about 70% to about 99%, about 75% to about 80%, about 75% to about 85%, about 75% to about 90%, about 75% to about 99%, about 80% to about 85%, about 80% to about 90%, about 80% to about 99%, about 85% to about 90%, about 85% to about 99%, or about 90% to about 99%. In some embodiments, dewatering the GO suspension reduces a water content of the GO suspension by about 45%, about 50%, about 55%, about 60%, about 65%, about 70%, about 75%, about 80%, about 85%, about 90%, or about 99%. In some embodiments, dewatering the GO suspension reduces a water content of the GO suspension by at least about 45%, about 50%, about 55%, about 60%, about 65%, about 70%, about 75%, about 80%, about 85%, about 90%, or about 99%. In some embodiments, dewatering the GO suspension reduces a water content of the GO suspension by at most about 45%, about 50%, about 55%, about 60%, about 65%, about 70%, about 75%, about 80%, about 85%, about 90%, or about 99%.

In some embodiments, dewatering the GO suspension occurs directly before adding the solvent solution to the GO suspension.

In some embodiments, the process of dewatering the GO suspension comprises centrifugal filtering, dead-end filtering, cross-flow filtering, stationary phase filtering, dynamic phase filtering, surface filtering, depth filtering, vacuum filtering, recirculation filtering, or any combination thereof. In some embodiments, the second filter comprises a Buchner funnel, a surface filter, a sieve, a filter paper, a belt filter, a drum filter, a cross-flow filter, a screen filter, a depth filter, a polymeric membrane, a ceramic membrane, a stainless steel filter, a stainless steel mesh, a carbon fiber mesh, a microfilter, an ultrafilter, or any combination thereof.

In some embodiments, the second filter has a pore size of about 0.5 μm to about 100 μm. In some embodiments, the second filter has a pore size of at least about 0.5 μm. In some embodiments, the second filter has a pore size of at most about 100 μm. In some embodiments, the second filter has a pore size of about 0.5 μm to about 1 μm, about 0.5 μm to about 2 μm, about 0.5 μm to about 5 μm, about 0.5 μm to about 10 μm, about 0.5 μm to about 20 μm, about 0.5 μm to about 30 μm, about 0.5 μm to about 40 μm, about 0.5 μm to about 50 μm, about 0.5 μm to about 60 μm, about 0.5 μm to about 80 μm, about 0.5 μm to about 100 μm, about 1 μm to about 2 μm, about 1 μm to about 5 μm, about 1 μm to about 10 μm, about 1 μm to about 20 μm, about 1 μm to about 30 μm, about 1 μm to about 40 μm, about 1 μm to about 50 μm, about 1 μm to about 60 μm, about 1 μm to about 80 μm, about 1 μm to about 100 μm, about 2 μm to about 5 μm, about 2 μm to about 10 μm, about 2 μm to about 20 μm, about 2 μm to about 30 μm, about 2 μm to about 40 μm, about 2 μm to about 50 μm, about 2 μm to about 60 μm, about 2 μm to about 80 μm, about 2 μm to about 100 μm, about 5 μm to about 10 μm, about 5 μm to about 20 μm, about 5 μm to about 30 μm, about 5 μm to about 40 μm, about 5 μm to about 50 μm, about 5 μm to about 60 μm, about 5 μm to about 80 μm, about 5 μm to about 100 μm, about 10 μm to about 20 μm, about 10 μm to about 30 μm, about 10 μm to about 40 μm, about 10 μm to about 50 μm, about 10 μm to about 60 μm, about 10 μm to about 80 μm, about 10 μm to about 100 μm, about 20 μm to about 30 μm, about 20 μm to about 40 μm, about 20 μm to about 50 μm, about 20 μm to about 60 μm, about 20 μm to about 80 μm, about 20 μm to about 100 μm, about 30 μm to about 40 μm, about 30 μm to about 50 μm, about 30 μm to about 60 μm, about 30 μm to about 80 μm, about 30 μm to about 100 μm, about 40 μm to about 50 μm, about 40 μm to about 60 μm, about 40 μm to about 80 μm, about 40 μm to about 100 μm, about 50 μm to about 60 μm, about 50 μm to about 80 μm, about 50 μm to about 100 μm, about 60 μm to about 80 μm, about 60 μm to about 100 μm, or about 80 μm to about 100 μm. In some embodiments, the second filter has a pore size of about 0.5 μm, about 1 μm, about 2 μm, about 5 μm, about 10 μm, about 20 μm, about 30 μm, about 40 μm, about 50 μm, about 60 μm, about 80 μm, or about 100 μm. In some embodiments, the second filter has a pore size of at least about 0.5 µm, about 1 µm, about 2 µm, about 5 µm, about 10 µm, about 20 µm, about 30 µm, about 40 µm, about 50 µm, about 60 µm, about 80 µm, or about 100 µm. In some embodiments, the second filter has a pore size of at most about 0.5 µm, about 1 µm, about 2 µm, about 5 µm, about 10 µm, about 20 µm, about 30 µm, about 40 µm, about 50 µm, about 60 µm, about 80 µm, or about 100 µm.

In some embodiments, the second filter is the first filter. In some embodiments, the second filter and the first filter are distinct filters.

In some embodiments, the percent by mass of the GO in the GO suspension after the step of filtering the GO solution through the second filter is about 0.1 L/(h*m$^2$) to about 1 L/(h*m$^2$). In some embodiments, the percent by mass of the GO in the GO suspension after the step of filtering the GO solution through the second filter is at least about 0.1 L/(h*m$^2$). In some embodiments, the percent by mass of the GO in the GO suspension after the step of filtering the GO solution through the second filter is at most about 1 L/(h*m$^2$). In some embodiments, the percent by mass of the GO in the GO suspension after the step of filtering the GO solution through the second filter is about 0.1 L/(h*m$^2$) to about 0.2 L/(h*m$^2$), about 0.1 L/(h*m$^2$) to about 0.3 L/(h*m$^2$), about 0.1 L/(h*m$^2$) to about 0.4 L/(h*m$^2$), 0.1 L/(h*m$^2$) to about 0.5 L/(h*m$^2$), about 0.1 L/(h*m$^2$) to about 0.6 L/(h*m$^2$), about 0.1 L/(h*m$^2$) to about 0.7 L/(h*m$^2$), about 0.1 L/(h*m$^2$) to about 0.8 L/(h*m$^2$), about 0.1 L/(h*m$^2$) to about 0.9 L/(h*m$^2$), about 0.1 L/(h*m$^2$) to about 1 L/(h*m$^2$), about 0.2 L/(h*m$^2$) to about 0.3 L/(h*m$^2$), about 0.2 L/(h*m$^2$) to about 0.4 L/(h*m$^2$), about 0.2 L/(h*m$^2$) to about 0.5 L/(h*m$^2$), about 0.2 L/(h*m$^2$) to about 0.6 L/(h*m$^2$), about 0.2 L/(h*m$^2$) to about 0.7 L/(h*m$^2$), about 0.2 L/(h*m$^2$) to about 0.8 L/(h*m$^2$), about 0.2 L/(h*m$^2$) to about 0.9 L/(h*m$^2$), about 0.2 L/(h*m$^2$) to about 1 L/(h*m$^2$), about 0.3 L/(h*m$^2$) to about 0.4 L/(h*m$^2$), about 0.3 L/(h*m$^2$) to about 0.5 L/(h*m$^2$), about 0.3 L/(h*m$^2$) to about 0.6 L/(h*m$^2$), about 0.3 L/(h*m$^2$) to about 0.7 L/(h*m$^2$), about 0.3 L/(h*m$^2$) to about 0.8 L/(h*m$^2$), about 0.3 L/(h*m$^2$) to about 0.9 L/(h*m$^2$), about 0.3 L/(h*m$^2$) to about 1 L/(h*m$^2$), about 0.4 L/(h*m$^2$) to about 0.5 L/(h*m$^2$), about 0.4 L/(h*m$^2$) to about 0.6 L/(h*m$^2$), about 0.4 L/(h*m$^2$) to about 0.7 L/(h*m$^2$), about 0.4 L/(h*m$^2$) to about 0.8 L/(h*m$^2$), about 0.4 L/(h*m$^2$) to about 0.9 L/(h*m$^2$), about 0.4 L/(h*m$^2$) to about 1 L/(h*m$^2$), about 0.5 L/(h*m$^2$) to about 0.6 L/(h*m$^2$), about 0.5 L/(h*m$^2$) to about 0.7 L/(h*m$^2$), about 0.5 L/(h*m$^2$) to about 0.8 L/(h*m$^2$), about 0.5 L/(h*m$^2$) to about 0.9 L/(h*m$^2$), about 0.5 L/(h*m$^2$) to about 1 L/(h*m$^2$), about 0.6 L/(h*m$^2$) to about 0.7 L/(h*m$^2$), about 0.6 L/(h*m$^2$) to about 0.8 L/(h*m$^2$), about 0.6 L/(h*m$^2$) to about 0.9 L/(h*m$^2$), about 0.6 L/(h*m$^2$) to about 1 L/(h*m$^2$), about 0.7 L/(h*m$^2$) to about 0.8 L/(h*m$^2$), about 0.7 L/(h*m$^2$) to about 0.9 L/(h*m$^2$), about 0.7 L/(h*m$^2$) to about 1 L/(h*m$^2$), about 0.8 L/(h*m$^2$) to about 0.9 L/(h*m$^2$), about 0.8 L/(h*m$^2$) to about 1 L/(h*m$^2$), or about 0.9 L/(h*m$^2$) to about 1 L/(h*m$^2$). In some embodiments, the percent by mass of the GO in the GO suspension after the step of filtering the GO solution through the second filter is about 0.1 L/(h*m$^2$), about 0.2 L/(h*m$^2$), about 0.3 L/(h*m$^2$), about 0.4 L/(h*m$^2$), about 0.5 L/(h*m$^2$), about 0.6 L/(h*m$^2$), about 0.7 L/(h*m$^2$), about 0.8 L/(h*m$^2$), about 0.9 L/(h*m$^2$), or about 1 L/(h*m$^2$).

Some embodiments further comprise drying the GO suspension. In some embodiments, drying the GO suspension is performed by air blowing, oven heating, dry evaporation, freeze-drying, or any combination thereof. In some embodiments, drying the GO suspension is performed by a drying method known to one of skill in the art. In some embodiments, the dry evaporation is performed at an ambient temperature. In some embodiments, the air blowing is performed with a dry gas stream. In some embodiments, the air blowing is performed with a dry gas stream at a pressure of about 10 psi to about 30 psi. In some embodiments, drying the GO suspension is performed for a period of time of at least about 5 minutes, 10 minutes, 20 minutes, 30 minutes, 40 minutes, 50 minutes, or about 60 minutes, and/or no more than about 5 minutes, 10 minutes, 20 minutes, 30 minutes, 40 minutes, 50 minutes, or about 60 minutes. In some embodiments, drying the GO suspension is performed for a period of time of at least about 1 hour, 2 hours, 3 hours, 4 hours, 5 hours, 6 hours, 7 hours, 8 hours, 9 hours, 10 hours, 11 hours, or about 12 hours, and/or no more than about 1 hour, 2 hours, 3 hours, 4 hours, 5 hours, 6 hours, 7 hours, 8 hours, 9 hours, 10 hours, 11 hours, or about 12 hours.

In some embodiments, the heating is performed at a temperature of about 10° C. to about 50° C. In some embodiments, the heating is performed at a temperature of at least about 10° C. In some embodiments, the heating is performed at a temperature of at most about 50° C. In some embodiments, the heating is performed at a temperature of about 10° C. to about 15° C., about 10° C. to about 20° C., about 10° C. to about 25° C., about 10° C. to about 30° C., about 10° C. to about 35° C., about 10° C. to about 40° C., about 10° C. to about 45° C., about 10° C. to about 50° C., about 15° C. to about 20° C., about 15° C. to about 25° C., about 15° C. to about 30° C., about 15° C. to about 35° C., about 15° C. to about 40° C., about 15° C. to about 45° C., about 15° C. to about 50° C., about 20° C. to about 25° C., about 20° C. to about 30° C., about 20° C. to about 35° C., about 20° C. to about 40° C., about 20° C. to about 45° C., about 20° C. to about 50° C., about 25° C. to about 30° C., about 25° C. to about 35° C., about 25° C. to about 40° C., about 25° C. to about 45° C., about 25° C. to about 50° C., about 30° C. to about 35° C., about 30° C. to about 40° C., about 30° C. to about 45° C., about 30° C. to about 50° C., about 35° C. to about 40° C., about 35° C. to about 45° C., about 35° C. to about 50° C., about 40° C. to about 45° C., about 40° C. to about 50° C., or about 45° C. to about 50° C. In some embodiments, the heating is performed at a temperature of about 10° C., about 15° C., about 20° C., about 25° C., about 30° C., about 35° C., about 40° C., about 45° C., or about 50° C. In some embodiments, the heating is performed at a temperature of at least about 10° C., about 15° C., about 20° C., about 25° C., about 30° C., about 35° C., about 40° C., about 45° C., or about 50° C. In some embodiments, the heating is performed at a temperature of at most about 10° C., about 15° C., about 20° C., about 25° C., about 30° C., about 35° C., about 40° C., about 45° C., or about 50° C.

In some embodiments, the percent by mass of the GO in the GO suspension after drying the GO suspension is about 30% to about 90%. In some embodiments, the percent by mass of the GO in the GO suspension after drying the GO suspension is at least about 30%. In some embodiments, the percent by mass of the GO in the GO suspension after drying the GO suspension is at most about 90%. In some embodiments, the percent by mass of the GO in the GO suspension after drying the GO suspension is about 30% to about 35%, about 30% to about 40%, about 30% to about 45%, about 30% to about 50%, about 30% to about 55%, about 30% to about 60%, about 30% to about 65%, about 30% to about 70%, about 30% to about 75%, about 30% to about 80%, about 30% to about 90%, about 35% to about 40%, about 35% to about 45%, about 35% to about 50%, about 35% to about 55%, about 35% to about 60%, about 35% to about 65%, about 35% to about 70%, about 35% to about 75%, about 35% to about 80%, about 35% to about 90%, about 40% to about 45%, about 40% to about 50%, about 40% to about 55%, about 40% to about 60%, about 40% to about 65%, about 40% to about 70%, about 40% to about 75%, about 40% to about 80%, about 40% to about 90%, about 45% to about 50%, about 45% to about 55%, about 45% to about 60%, about 45% to about 65%, about 45% to about 70%, about 45% to about 75%, about 45% to about 80%, about 45% to about 90%, about 50% to about 55%, about 50% to about 60%, about 50% to about 65%, about 50% to about 70%, about 50% to about 75%, about 50% to about 80%, about 50% to about 90%, about 55% to about 60%, about 55% to about 65%, about 55% to about 70%, about 55% to about 75%, about 55% to about 80%, about 55% to about 90%, about 60% to about 65%, about 60% to about 70%, about 60% to about 75%, about 60% to about 80%, about 60% to about 90%, about 65% to about 70%, about 65% to about 75%, about 65% to about 80%, about 65% to about 90%, about 70% to about 75%, about 70% to about 80%, about 70% to about 90%, about 75% to about 80%, about 75% to about 90%, or about 80% to about 90%. In some embodiments, the percent by mass of the GO in the GO suspension after drying the GO suspension is about 30%, about 35%, about 40%, about 45%, about 50%, about 55%, about 60%, about 65%, about 70%, about 75%, about 80%, or about 90%. In some embodiments, the percent by mass of the GO in the GO suspension after drying the GO suspension is at least about 30%, about 35%, about 40%, about 45%, about 50%, about 55%, about 60%, about 65%, about 70%, about 75%, about 80%, or about 90%. In some embodiments, the percent by mass of the GO in the GO suspension after drying the GO suspension is at most about 30%, about 35%, about 40%, about 45%, about 50%, about 55%, about 60%, about 65%, about 70%, about 75%, about 80%, or about 90%.

In some embodiments, drying the GO suspension forms a GO powder. In some embodiments, the GO powder is dispersible in water or a polar solvent. In some embodiments, the GO powder is anhydrous, intercalated, exfoliated, or any combination thereof. In some embodiments, the GO powder comprises a single layer of GO. In some embodiments, the GO powder is dispersible in water, a polar solvent, or any combination thereof.

In some embodiments, the GO material is aqueous. In some embodiments, the aqueous material comprises an ink, a paste, a solution, a fluid, a liquid, a paint, a dye, a coating, or a compound.

In some embodiments the GO material has a surface area of about 800 $m^2/g$ to about 2,400 $m^2/g$. In some embodiments the GO material has a surface area of at least about 800 $m^2/g$. In some embodiments the GO material has a surface area of at most about 2,400 $m^2/g$. In some embodiments the GO material has a surface area of about 800 $m^2/g$ to about 1,000 $m^2/g$, about 800 $m^2/g$ to about 1,200 $m^2/g$, about 800 $m^2/g$ to about 1,400 $m^2/g$, about 800 $m^2/g$ to about 1,600 $m^2/g$, about 800 $m^2/g$ to about 1,800 $m^2/g$, about 800 $m^2/g$ to about 2,000 $m^2/g$, about 800 $m^2/g$ to about 2,200 $m^2/g$, about 800 $m^2/g$ to about 2,400 $m^2/g$, about 1,000 $m^2/g$ to about 1,200 $m^2/g$, about 1,000 $m^2/g$ to about 1,400 $m^2/g$, about 1,000 $m^2/g$ to about 1,600 $m^2/g$, about 1,000 $m^2/g$ to about 1,800 $m^2/g$, about 1,000 $m^2/g$ to about 2,000 $m^2/g$, about 1,000 $m^2/g$ to about 2,200 $m^2/g$, about 1,000 $m^2/g$ to about 2,400 $m^2/g$, about 1,200 $m^2/g$ to about 1,400 $m^2/g$, about 1,200 $m^2/g$ to about 1,600 $m^2/g$, about 1,200 $m^2/g$ to about 1,800 $m^2/g$, about 1,200 $m^2/g$ to about 2,000 $m^2/g$, about 1,200 $m^2/g$ to about 2,200 $m^2/g$, about 1,200 $m^2/g$ to about 2,400 $m^2/g$, about 1,400 $m^2/g$ to about 1,600 $m^2/g$, about 1,400 $m^2/g$ to about 1,800 $m^2/g$, about 1,400 $m^2/g$ to about 2,000 $m^2/g$, about 1,400 $m^2/g$ to about 2,200 $m^2/g$, about 1,400 $m^2/g$ to about 2,400 $m^2/g$, about 1,600 $m^2/g$ to about 1,800 $m^2/g$, about 1,600 $m^2/g$ to about 2,000 $m^2/g$, about 1,600 $m^2/g$ to about 2,200 $m^2/g$, about 1,600 $m^2/g$ to about 2,400 $m^2/g$, about 1,800 $m^2/g$ to about 2,000 $m^2/g$, about 1,800 $m^2/g$ to about 2,200 $m^2/g$, about 1,800 $m^2/g$ to about 2,400 $m^2/g$, about 2,000 $m^2/g$ to about 2,200 $m^2/g$, about 2,000 $m^2/g$ to about 2,400 $m^2/g$, or about 2,200 $m^2/g$ to about 2,400 $m^2/g$. In some embodiments the GO material has a surface area of about 800 $m^2/g$, about 1,000 $m^2/g$, about 1,200 $m^2/g$, about 1,400 $m^2/g$, about 1,600 $m^2/g$, about 1,800 $m^2/g$, about 2,000 $m^2/g$, about 2,200 $m^2/g$, or about 2,400 $m^2/g$.

In some embodiments the GO material has a conductivity of about 0.1 S/m to about 5 S/m. In some embodiments the GO material has a conductivity of at least about 0.1 S/m. In some embodiments the GO material has a conductivity of at most about 5 S/m. In some embodiments the GO material has a conductivity of about 0.1 S/m to about 0.2 S/m, about 0.1 S/m to about 0.5 S/m, about 0.1 S/m to about 0.75 S/m, about 0.1 S/m to about 1 S/m, about 0.1 S/m to about 2 S/m, about 0.1 S/m to about 3 S/m, about 0.1 S/m to about 4 S/m, about 0.1 S/m to about 5 S/m, about 0.2 S/m to about 0.5 S/m, about 0.2 S/m to about 0.75 S/m, about 0.2 S/m to about 1 S/m, about 0.2 S/m to about 2 S/m, about 0.2 S/m to about 3 S/m, about 0.2 S/m to about 4 S/m, about 0.2 S/m to about 5 S/m, about 0.5 S/m to about 0.75 S/m, about 0.5 S/m to about 1 S/m, about 0.5 S/m to about 2 S/m, about 0.5 S/m to about 3 S/m, about 0.5 S/m to about 4 S/m, about 0.5 S/m to about 5 S/m, about 0.75 S/m to about 1 S/m, about 0.75 S/m to about 2 S/m, about 0.75 S/m to about 3 S/m, about 0.75 S/m to about 4 S/m, about 0.75 S/m to about 5 S/m, about 1 S/m to about 2 S/m, about 1 S/m to about 3 S/m, about 1 S/m to about 4 S/m, about 1 S/m to about 5 S/m, about 2 S/m to about 3 S/m, about 2 S/m to about 4 S/m, about 2 S/m to about 5 S/m, about 3 S/m to about 4 S/m, about 3 S/m to about 5 S/m, or about 4 S/m to about 5 S/m. In some embodiments the GO material has a conductivity of about 0.1 S/m, about 0.2 S/m, about 0.5 S/m, about 0.75 S/m, about 1 S/m, about 2 S/m, about 3 S/m, about 4 S/m, or about 5 S/m. In some embodiments the GO material has a conductivity of at least about 0.1 S/m, about 0.2 S/m, about 0.5 S/m, about 0.75 S/m, about 1 S/m, about 2 S/m, about 3 S/m, about 4 S/m, or about 5 S/m. In some embodiments the GO material has a conductivity of at most about 0.1 S/m, about 0.2 S/m, about 0.5 S/m, about 0.75 S/m, about 1 S/m, about 2 S/m, about 3 S/m, about 4 S/m, or about 5 S/m.

In some embodiments the GO material has a C:O mass ratio of about 1:3 to about 5:1. In some embodiments the GO material has a C:O mass ratio of at least about 1:3. In some embodiments the GO material has a C:O mass ratio of at most about 5:1. In some embodiments the GO material has a C:O mass ratio of about 1:3 to about 1:2, about 1:3 to about 1:1, about 1:3 to about 2:1, about 1:3 to about 3:1, about 1:3 to about 4:1, about 1:3 to about 5:1, about 1:2 to about 1:1, about 1:2 to about 2:1, about 1:2 to about 3:1, about 1:2 to about 4:1, about 1:2 to about 5:1, about 1:1 to about 2:1, about 1:1 to about 3:1, about 1:1 to about 4:1, about 1:1 to about 5:1, about 2:1 to about 3:1, about 2:1 to about 4:1, about 2:1 to about 5:1, about 3:1 to about 4:1, about 3:1 to about 5:1, or about 4:1 to about 5:1. In some embodiments the GO material has a C:O mass ratio of about 1:3, about 1:2, about 1:1, about 2:1, about 3:1, about 4:1, or about 5:1. In some embodiments the GO material has a C:O mass ratio of at least about 1:3, about 1:2, about 1:1, about 2:1, about 3:1, about 4:1, or about 5:1. In some embodiments the GO material has a C:O mass ratio of at most about 1:3, about 1:2, about 1:1, about 2:1, about 3:1, about 4:1, or about 5:1.

In some embodiments the GO material has an oxidation percentage of about 15% to about 60%. In some embodiments the GO material has an oxidation percentage of at least about 15%. In some embodiments the GO material has an oxidation percentage of at most about 60%. In some embodiments the GO material has an oxidation percentage of about 15% to about 20%, about 15% to about 25%, about 15% to about 30%, about 15% to about 35%, about 15% to about 40%, about 15% to about 45%, about 15% to about 50%, about 15% to about 55%, about 15% to about 60%, about 20% to about 25%, about 20% to about 30%, about 20% to about 35%, about 20% to about 40%, about 20% to about 45%, about 20% to about 50%, about 20% to about 55%, about 20% to about 60%, about 25% to about 30%, about 25% to about 35%, about 25% to about 40%, about 25% to about 45%, about 25% to about 50%, about 25% to about 55%, about 25% to about 60%, about 30% to about 35%, about 30% to about 40%, about 30% to about 45%, about 30% to about 50%, about 30% to about 55%, about 30% to about 60%, about 35% to about 40%, about 35% to about 45%, about 35% to about 50%, about 35% to about 55%, about 35% to about 60%, about 40% to about 45%, about 40% to about 50%, about 40% to about 55%, about 40% to about 60%, about 45% to about 50%, about 45% to about 55%, about 45% to about 60%, about 50% to about 55%, about 50% to about 60%, or about 55% to about 60%. In some embodiments the GO material has an oxidation percentage of about 15%, about 20%, about 25%, about 30%, about 35%, about 40%, about 45%, about 50%, about 55%, or about 60%. In some embodiments the GO material has an oxidation percentage of at least about 15%, about 20%, about 25%, about 30%, about 35%, about 40%, about 45%, about 50%, about 55%, or about 60%. In some embodiments the GO material has an oxidation percentage of at most about 15%, about 20%, about 25%, about 30%, about 35%, about 40%, about 45%, about 50%, about 55%, or about 60%.

In some embodiments, one of the conductivity, the surface area, the C:O ratio, and the oxidization percentage of the GO material is measured by methylene blue absorption.

In some embodiments of this aspect, the method is capable of producing a throughput of the GO material per an area of the first filter of about 25 $g/(h*m^2)$ to about 100 $g/(h*m^2)$. In some embodiments of this aspect, the method is capable of producing a throughput of the GO material per an area of the first filter of at least about 25 $g/(h*m^2)$. In some embodiments of this aspect, the method is capable of producing a throughput of the GO material per an area of the first filter of at most about 100 $g/(h*m^2)$. In some embodiments of this aspect, the method is capable of producing a throughput of the GO material per an area of the first filter of about 25 $g/(h*m^2)$ to about 30 $g/(h*m^2)$, about 25 $g/(h*m^2)$ to about 35 $g/(h*m^2)$, about 25 $g/(h*m^2)$ to about 40 $g/(h*m^2)$, about 25 $g/(h*m^2)$ to about 45 $g/(h*m^2)$, about 25 $g/(h*m^2)$ to about 50 $g/(h*m^2)$, about 25 $g/(h*m^2)$ to about 60 $g/(h*m^2)$, about 25 $g/(h*m^2)$ to about 70 $g/(h*m^2)$, about 25 $g/(h*m^2)$ to about 80 $g/(h*m^2)$, about 25 $g/(h*m^2)$ to about 90 $g/(h*m^2)$, about 25 $g/(h*m^2)$ to about 100 $g/(h*m^2)$, about 30 $g/(h*m^2)$ to about 35 $g/(h*m^2)$, about 30 $g/(h*m^2)$ to about 40 $g/(h*m^2)$, about 30 $g/(h*m^2)$ to about 45 $g/(h*m^2)$, about 30 $g/(h*m^2)$ to about 50 $g/(h*m^2)$, about 30 $g/(h*m^2)$ to about 60 $g/(h*m^2)$, about 30 $g/(h*m^2)$ to about 70 $g/(h*m^2)$, about 30 $g/(h*m^2)$ to about 80 $g/(h*m^2)$, about 30 $g/(h*m^2)$ to about 90 $g/(h*m^2)$, about 30 $g/(h*m^2)$ to about 100 $g/(h*m^2)$, about 35 $g/(h*m^2)$ to about 40 $g/(h*m^2)$, about 35 $g/(h*m^2)$ to about 45 $g/(h*m^2)$, about 35 $g/(h*m^2)$ to about 50 $g/(h*m^2)$, about 35 $g/(h*m^2)$ to about 60 $g/(h*m^2)$, about 35 $g/(h*m^2)$ to about 70 $g/(h*m^2)$, about 35 $g/(h*m^2)$ to about 80 $g/(h*m^2)$, about 35 $g/(h*m^2)$ to about 90 $g/(h*m^2)$, about 35 $g/(h*m^2)$ to about 100 $g/(h*m^2)$, about 40 $g/(h*m^2)$ to about 45 $g/(h*m^2)$, about 40 $g/(h*m^2)$ to about 50 $g/(h*m^2)$, about 40 $g/(h*m^2)$ to about 60 $g/(h*m^2)$, about 40 $g/(h*m^2)$ to about 70 $g/(h*m^2)$, about 40 $g/(h*m^2)$ to about 80 $g/(h*m^2)$, about 40 $g/(h*m^2)$ to about 90 $g/(h*m^2)$, about 40 $g/(h*m^2)$ to about 100 $g/(h*m^2)$, about 45 $g/(h*m^2)$ to about 50 $g/(h*m^2)$, about 45 $g/(h*m^2)$ to about 60 $g/(h*m^2)$, about 45 $g/(h*m^2)$ to about 70 $g/(h*m^2)$, about 45 $g/(h*m^2)$ to about 80 $g/(h*m^2)$, about 45 $g/(h*m^2)$ to about 90 $g/(h*m^2)$, about 45 $g/(h*m^2)$ to about 100 $g/(h*m^2)$, about 50 $g/(h*m^2)$ to about 60 $g/(h*m^2)$, about 50 $g/(h*m^2)$ to about 70 $g/(h*m^2)$, about 50 $g/(h*m^2)$ to about 80 $g/(h*m^2)$, about 50 $g/(h*m^2)$ to about 90 $g/(h*m^2)$, about 50 $g/(h*m^2)$ to about 100 $g/(h*m^2)$, about 60 $g/(h*m^2)$ to about 70 $g/(h*m^2)$, about 60 $g/(h*m^2)$ to about 80 $g/(h*m^2)$, about 60 $g/(h*m^2)$ to about 90 $g/(h*m^2)$, about 60 $g/(h*m^2)$ to about 100 $g/(h*m^2)$, about 70 $g/(h*m^2)$ to about 80 $g/(h*m^2)$, about 70 $g/(h*m^2)$ to about 90 $g/(h*m^2)$, about 70 $g/(h*m^2)$ to about 100 $g/(h*m^2)$, about 80 $g/(h*m^2)$ to about 90 $g/(h*m^2)$, about 80 $g/(h*m^2)$ to about 100 $g/(h*m^2)$, or about 90 $g/(h*m^2)$ to about 100 $g/(h*m^2)$. In some embodiments of this aspect, the method is capable of producing a throughput of the GO material per an area of the first filter of about 25 $g/(h*m^2)$, about 30 $g/(h*m^2)$, about 35 $g/(h*m^2)$, about 40 $g/(h*m^2)$, about 45 $g/(h*m^2)$, about 50 $g/(h*m^2)$, about 60 $g/(h*m^2)$, about 70 $g/(h*m^2)$, about 80 $g/(h*m^2)$, about 90 $g/(h*m^2)$, or about 100 $g/(h*m^2)$. In some embodiments of this aspect, the method is capable of producing a throughput of the GO material per an area of the first filter of at least about 25 $g/(h*m^2)$, about 30 $g/(h*m^2)$, about 35 $g/(h*m^2)$, about 40 $g/(h*m^2)$, about 45 $g/(h*m^2)$, about 50 $g/(h*m^2)$, about 60 $g/(h*m^2)$, about 70 $g/(h*m^2)$, about 80 $g/(h*m^2)$, about 90 $g/(h*m^2)$, or about 100 $g/(h*m^2)$. In some embodiments of this aspect, the method is capable of producing a throughput of the GO material per an area of the first filter of at most about 25 $g/(h*m^2)$, about 30 $g/(h*m^2)$, about 35 $g/(h*m^2)$, about 40 $g/(h*m^2)$, about 45 $g/(h*m^2)$, about 50 $g/(h*m^2)$, about 60 $g/(h*m^2)$, about 70 $g/(h*m^2)$, about 80 $g/(h*m^2)$, about 90 $g/(h*m^2)$, or about 100 $g/(h*m^2)$.

A third aspect provided herein is a GO material comprising: GO and water.

In some embodiments, the GO material is aqueous. In some embodiments, the GO comprises a single layer of GO. In some embodiments, the aqueous material comprises an ink, a paste, a solution, a fluid, a liquid, a paint, a dye, a coating, or a compound.

In some embodiments the GO material has a surface area of about 800 $m^2/g$ to about 2,400 $m^2/g$. In some embodiments the GO material has a surface area of at least about 800 $m^2/g$. In some embodiments the GO material has a surface area of at most about 2,400 $m^2/g$. In some embodiments the GO material has a surface area of about 800 $m^2/g$ to about 1,000 $m^2/g$, about 800 $m^2/g$ to about 1,200 $m^2/g$, about 800 $m^2/g$ to about 1,400 $m^2/g$, about 800 $m^2/g$ to about 1,600 $m^2/g$, about 800 $m^2/g$ to about 1,800 $m^2/g$, about 800 $m^2/g$ to about 2,000 $m^2/g$, about 800 $m^2/g$ to about 2,200 $m^2/g$, about 800 $m^2/g$ to about 2,400 $m^2/g$, about 1,000 $m^2/g$ to about 1,200 $m^2/g$, about 1,000 $m^2/g$ to about 1,400 $m^2/g$, about 1,000 $m^2/g$ to about 1,600 $m^2/g$, about 1,000 $m^2/g$ to about 1,800 m²/g, about 1,000 m²/g to about 2,000 m²/g, about 1,000 m²/g to about 2,200 m²/g, about 1,000 m²/g to about 2,400 m²/g, about 1,200 m²/g to about 1,400 m²/g, about 1,200 m²/g to about 1,600 m²/g, about 1,200 m²/g to about 1,800 m²/g, about 1,200 m²/g to about 2,000 m²/g, about 1,200 m²/g to about 2,200 m²/g, about 1,200 m²/g to about 2,400 m²/g, about 1,400 m²/g to about 1,600 m²/g, about 1,400 m²/g to about 1,800 m²/g, about 1,400 m²/g to about 2,000 m²/g, about 1,400 m²/g to about 2,200 m²/g, about 1,400 m²/g to about 2,400 m²/g, about 1,600 m²/g to about 1,800 m²/g, about 1,600 m²/g to about 2,000 m²/g, about 1,600 m²/g to about 2,200 m²/g, about 1,600 m²/g to about 2,400 m²/g, about 1,800 m²/g to about 2,000 m²/g, about 1,800 m²/g to about 2,200 m²/g, about 1,800 m²/g to about 2,400 m²/g, about 2,000 m²/g to about 2,200 m²/g, about 2,000 m²/g to about 2,400 m²/g, or about 2,200 m²/g to about 2,400 m²/g. In some embodiments the GO material has a surface area of about 800 m²/g, about 1,000 m²/g, about 1,200 m²/g, about 1,400 m²/g, about 1,600 m²/g, about 1,800 m²/g, about 2,000 m²/g, about 2,200 m²/g, or about 2,400 m²/g.

In some embodiments the GO material has a conductivity of about 0.1 S/m to about 5 S/m. In some embodiments the GO material has a conductivity of at least about 0.1 S/m. In some embodiments the GO material has a conductivity of at most about 5 S/m. In some embodiments the GO material has a conductivity of about 0.1 S/m to about 0.2 S/m, about 0.1 S/m to about 0.5 S/m, about 0.1 S/m to about 0.75 S/m, about 0.1 S/m to about 1 S/m, about 0.1 S/m to about 2 S/m, about 0.1 S/m to about 3 S/m, about 0.1 S/m to about 4 S/m, about 0.1 S/m to about 5 S/m, about 0.2 S/m to about 0.5 S/m, about 0.2 S/m to about 0.75 S/m, about 0.2 S/m to about 1 S/m, about 0.2 S/m to about 2 S/m, about 0.2 S/m to about 3 S/m, about 0.2 S/m to about 4 S/m, about 0.2 S/m to about 5 S/m, about 0.5 S/m to about 0.75 S/m, about 0.5 S/m to about 1 S/m, about 0.5 S/m to about 2 S/m, about 0.5 S/m to about 3 S/m, about 0.5 S/m to about 4 S/m, about 0.5 S/m to about 5 S/m, about 0.75 S/m to about 1 S/m, about 0.75 S/m to about 2 S/m, about 0.75 S/m to about 3 S/m, about 0.75 S/m to about 4 S/m, about 0.75 S/m to about 5 S/m, about 1 S/m to about 2 S/m, about 1 S/m to about 3 S/m, about 1 S/m to about 4 S/m, about 1 S/m to about 5 S/m, about 2 S/m to about 3 S/m, about 2 S/m to about 4 S/m, about 2 S/m to about 5 S/m, about 3 S/m to about 4 S/m, about 3 S/m to about 5 S/m, or about 4 S/m to about 5 S/m. In some embodiments the GO material has a conductivity of about 0.1 S/m, about 0.2 S/m, about 0.5 S/m, about 0.75 S/m, about 1 S/m, about 2 S/m, about 3 S/m, about 4 S/m, or about 5 S/m. In some embodiments the GO material has a conductivity of at least about 0.1 S/m, about 0.2 S/m, about 0.5 S/m, about 0.75 S/m, about 1 S/m, about 2 S/m, about 3 S/m, about 4 S/m, or about 5 S/m. In some embodiments the GO material has a conductivity of at most about 0.1 S/m, about 0.2 S/m, about 0.5 S/m, about 0.75 S/m, about 1 S/m, about 2 S/m, about 3 S/m, about 4 S/m, or about 5 S/m.

In some embodiments the GO material has a C:O mass ratio of about 1:3 to about 5:1. In some embodiments the GO material has a C:O mass ratio of at least about 1:3. In some embodiments the GO material has a C:O mass ratio of at most about 5:1. In some embodiments the GO material has a C:O mass ratio of about 1:3 to about 1:2, about 1:3 to about 1:1, about 1:3 to about 2:1, about 1:3 to about 3:1, about 1:3 to about 4:1, about 1:3 to about 5:1, about 1:2 to about 1:1, about 1:2 to about 2:1, about 1:2 to about 3:1, about 1:2 to about 4:1, about 1:2 to about 5:1, about 1:1 to about 2:1, about 1:1 to about 3:1, about 1:1 to about 4:1, about 1:1 to about 5:1, about 2:1 to about 3:1, about 2:1 to about 4:1, about 2:1 to about 5:1, about 3:1 to about 4:1, about 3:1 to about 5:1, or about 4:1 to about 5:1. In some embodiments the GO material has a C:O mass ratio of about 1:3, about 1:2, about 1:1, about 2:1, about 3:1, about 4:1, or about 5:1. In some embodiments the GO material has a C:O mass ratio of at least about 1:3, about 1:2, about 1:1, about 2:1, about 3:1, about 4:1, or about 5:1. In some embodiments the GO material has a C:O mass ratio of at most about 1:3, about 1:2, about 1:1, about 2:1, about 3:1, about 4:1, or about 5:1.

In some embodiments the GO material has an oxidation percentage of about 15% to about 60%. In some embodiments the GO material has an oxidation percentage of at least about 15%. In some embodiments the GO material has an oxidation percentage of at most about 60%. In some embodiments the GO material has an oxidation percentage of about 15% to about 20%, about 15% to about 25%, about 15% to about 30%, about 15% to about 35%, about 15% to about 40%, about 15% to about 45%, about 15% to about 50%, about 15% to about 55%, about 15% to about 60%, about 20% to about 25%, about 20% to about 30%, about 20% to about 35%, about 20% to about 40%, about 20% to about 45%, about 20% to about 50%, about 20% to about 55%, about 20% to about 60%, about 25% to about 30%, about 25% to about 35%, about 25% to about 40%, about 25% to about 45%, about 25% to about 50%, about 25% to about 55%, about 25% to about 60%, about 30% to about 35%, about 30% to about 40%, about 30% to about 45%, about 30% to about 50%, about 30% to about 55%, about 30% to about 60%, about 35% to about 40%, about 35% to about 45%, about 35% to about 50%, about 35% to about 55%, about 35% to about 60%, about 40% to about 45%, about 40% to about 50%, about 40% to about 55%, about 40% to about 60%, about 45% to about 50%, about 45% to about 55%, about 45% to about 60%, about 50% to about 55%, about 50% to about 60%, or about 55% to about 60%. In some embodiments the GO material has an oxidation percentage of about 15%, about 20%, about 25%, about 30%, about 35%, about 40%, about 45%, about 50%, about 55%, or about 60%. In some embodiments the GO material has an oxidation percentage of at least about 15%, about 20%, about 25%, about 30%, about 35%, about 40%, about 45%, about 50%, about 55%, or about 60%. In some embodiments the GO material has an oxidation percentage of at most about 15%, about 20%, about 25%, about 30%, about 35%, about 40%, about 45%, about 50%, about 55%, or about 60%.

In some embodiments, one of the conductivity, the surface area, the C:O ratio, and the oxidization percentage of the GO material is measured by methylene blue absorption.

In some embodiments, the percent by mass of the GO in the GO material is about 10% to about 50%. In some embodiments, the percent by mass of the GO in the GO material is at least about 10%. In some embodiments, the percent by mass of the GO in the GO material is at most about 50%. In some embodiments, the percent by mass of the GO in the GO material is about 10% to about 15%, about 10% to about 20%, about 10% to about 25%, about 10% to about 30%, about 10% to about 35%, about 10% to about 40%, about 10% to about 45%, about 10% to about 50%, about 15% to about 20%, about 15% to about 25%, about 15% to about 30%, about 15% to about 35%, about 15% to about 40%, about 15% to about 45%, about 15% to about 50%, about 20% to about 25%, about 20% to about 30%, about 20% to about 35%, about 20% to about 40%, about 20% to about 45%, about 20% to about 50%, about 25% to about 30%, about 25% to about 35%, about 25% to about 40%, about 25% to about 45%, about 25% to about 50%, about 30% to about 35%, about 30% to about 40%, about 30% to about 45%, about 30% to about 50%, about 35% to about 40%, about 35% to about 45%, about 35% to about 50%, about 40% to about 45%, about 40% to about 50%, or about 45% to about 50%. In some embodiments, the percent by mass of the GO in the GO material is about 10%, about 15%, about 20%, about 25%, about 30%, about 35%, about 40%, about 45%, or about 50%.

In some embodiments, the viscosity of the GO material is about 10 centipoise to about 10,000 centipoise. In some embodiments, the viscosity of the GO material is at least about 10 centipoise. In some embodiments, the viscosity of the GO material is at most about 10,000 centipoise. In some embodiments, the viscosity of the GO material is about 10 centipoise to about 20 centipoise, about 10 centipoise to about 50 centipoise, about 10 centipoise to about 100 centipoise, about 10 centipoise to about 200 centipoise, about 10 centipoise to about 500 centipoise, about 10 centipoise to about 1,000 centipoise, about 10 centipoise to about 2,000 centipoise, about 10 centipoise to about 5,000 centipoise, about 10 centipoise to about 10,000 centipoise, about 20 centipoise to about 50 centipoise, about 20 centipoise to about 100 centipoise, about 20 centipoise to about 200 centipoise, about 20 centipoise to about 500 centipoise, about 20 centipoise to about 1,000 centipoise, about 20 centipoise to about 2,000 centipoise, about 20 centipoise to about 5,000 centipoise, about 20 centipoise to about 10,000 centipoise, about 50 centipoise to about 100 centipoise, about 50 centipoise to about 200 centipoise, about 50 centipoise to about 500 centipoise, about 50 centipoise to about 1,000 centipoise, about 50 centipoise to about 2,000 centipoise, about 50 centipoise to about 5,000 centipoise, about 50 centipoise to about 10,000 centipoise, about 100 centipoise to about 200 centipoise, about 100 centipoise to about 500 centipoise, about 100 centipoise to about 1,000 centipoise, about 100 centipoise to about 2,000 centipoise, about 100 centipoise to about 5,000 centipoise, about 100 centipoise to about 10,000 centipoise, about 200 centipoise to about 500 centipoise, about 200 centipoise to about 1,000 centipoise, about 200 centipoise to about 2,000 centipoise, about 200 centipoise to about 5,000 centipoise, about 200 centipoise to about 10,000 centipoise, about 500 centipoise to about 1,000 centipoise, about 500 centipoise to about 2,000 centipoise, about 500 centipoise to about 5,000 centipoise, about 500 centipoise to about 10,000 centipoise, about 1,000 centipoise to about 2,000 centipoise, about 1,000 centipoise to about 5,000 centipoise, about 1,000 centipoise to about 10,000 centipoise, about 2,000 centipoise to about 5,000 centipoise, about 2,000 centipoise to about 10,000 centipoise, or about 5,000 centipoise to about 10,000 centipoise. In some embodiments, the viscosity of the GO material is about 10 centipoise, about 20 centipoise, about 50 centipoise, about 100 centipoise, about 200 centipoise, about 500 centipoise, about 1,000 centipoise, about 2,000 centipoise, about 5,000 centipoise, or about 10,000 centipoise. In some embodiments, the viscosity of the GO material is at least about 10 centipoise, about 20 centipoise, about 50 centipoise, about 100 centipoise, about 200 centipoise, about 500 centipoise, about 1,000 centipoise, about 2,000 centipoise, about 5,000 centipoise, or about 10,000 centipoise. In some embodiments, the viscosity of the GO material is at most about 10 centipoise, about 20 centipoise, about 50 centipoise, about 100 centipoise, about 200 centipoise, about 500 centipoise, about 1,000 centipoise, about 2,000 centipoise, about 5,000 centipoise, or about 10,000 centipoise.

In some embodiments, the GO material is powder. In some embodiments, the GO material is anhydrous, intercalated, exfoliated, or any combination thereof. In some embodiments, the GO powder comprises a single layer of GO. In some embodiments, the GO powder is dispersible in water, a polar solvent, or any combination thereof.

In some embodiments, the percent by mass of the GO in the GO material is about 30% to about 95%. In some embodiments, the percent by mass of the GO in the GO material is at least about 30%. In some embodiments, the percent by mass of the GO in the GO material is at most about 95%. In some embodiments, the percent by mass of the GO in the GO material is about 30% to about 35%, about 30% to about 40%, about 30% to about 45%, about 30% to about 50%, about 30% to about 55%, about 30% to about 60%, about 30% to about 65%, about 30% to about 70%, about 30% to about 75%, about 30% to about 80%, about 30% to about 95%, about 35% to about 40%, about 35% to about 45%, about 35% to about 50%, about 35% to about 55%, about 35% to about 60%, about 35% to about 65%, about 35% to about 70%, about 35% to about 75%, about 35% to about 80%, about 35% to about 95%, about 40% to about 45%, about 40% to about 50%, about 40% to about 55%, about 40% to about 60%, about 40% to about 65%, about 40% to about 70%, about 40% to about 75%, about 40% to about 80%, about 40% to about 95%, about 45% to about 50%, about 45% to about 55%, about 45% to about 60%, about 45% to about 65%, about 45% to about 70%, about 45% to about 75%, about 45% to about 80%, about 45% to about 95%, about 50% to about 55%, about 50% to about 60%, about 50% to about 65%, about 50% to about 70%, about 50% to about 75%, about 50% to about 80%, about 50% to about 95%, about 55% to about 60%, about 55% to about 65%, about 55% to about 70%, about 55% to about 75%, about 55% to about 80%, about 55% to about 95%, about 60% to about 65%, about 60% to about 70%, about 60% to about 75%, about 60% to about 80%, about 60% to about 95%, about 65% to about 70%, about 65% to about 75%, about 65% to about 80%, about 65% to about 95%, about 70% to about 75%, about 70% to about 80%, about 70% to about 95%, about 75% to about 80%, about 75% to about 95%, or about 80% to about 95%. In some embodiments, the percent by mass of the GO in the GO material is about 30%, about 35%, about 40%, about 45%, about 50%, about 55%, about 60%, about 65%, about 70%, about 75%, about 80%, or about 95%.

Other goals and advantages of the embodiments described herein will be further appreciated and understood when considered in conjunction with the following description and accompanying drawings. While the following description may contain specific details describing particular embodiments described herein, this should not be construed as limitations to the scope of the embodiments described herein but rather as an exemplification of some embodiments. For each embodiment described herein, many variations are possible as suggested herein that are known to those of ordinary skill in the art. A variety of changes and modifications may be made within the scope of the embodiments described herein without departing from the spirit thereof.

BRIEF DESCRIPTION OF THE DRAWINGS

Features of the disclosure are set forth with particularity in the appended claims. A better understanding of the features and advantages of the present disclosure will be obtained by reference to the following detailed description that sets forth illustrative embodiments, in which the principles of the embodiments are utilized, and the accompanying drawings or figures (also "FIG." and "FIGS." herein), of which:

DETAILED DESCRIPTION

Figure 1:
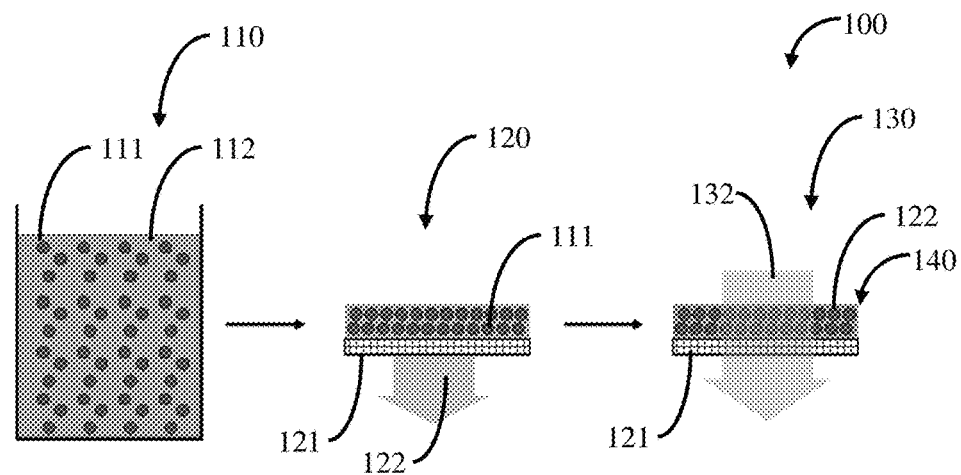
FIG. 1 shows a schematic illustration of an exemplary dead-end filtering method of forming a graphene oxide (GO) material, in accordance with some embodiments.

Provided herein are graphene materials, fabrication processes, and devices with improved performance. In some embodiments, the present disclosure provides graphene oxide (GO) materials and methods for forming GO materials. Such methods for forming GO materials avoid the shortcomings of current forming methods. Additionally, provided are methods for solvent-assisted purification and drying of GO.

Various aspects of the disclosure described herein may be applied to any of the particular applications set forth below or in any other type of manufacturing, synthesis, or processing setting. Other manufacturing, synthesis, or processing of materials may equally benefit from features described herein. For example, the methods, devices, and systems herein may be advantageously applied to manufacture (or synthesis) of various forms of graphene or GO. The embodiments described herein may be applied as a stand-alone method, device, or system, or as part of an integrated manufacturing or materials (e.g., chemicals) processing system. It shall be understood that different aspects of the disclosure may be appreciated individually, collectively, or in combination with each other.

Reference will now be made to the figures. It will be appreciated that the figures and features therein are not necessarily drawn to scale. The schematic illustrations, images, formulas, charts, and graphs referred to herein represent fabricated exemplary devices that serve as a representation of the appearance, characteristics, and functionality of the devices produced by the exemplary methods described herein.

While preferable embodiments have been shown and described herein, it will be obvious to those skilled in the art that such embodiments are provided by way of example only. Numerous variations, changes, and substitutions will occur to those skilled in the art. It should be understood that various alternatives to the embodiments described herein may be employed.

GO is a layered material formed through the oxidation of graphite that consists of hydrophilic oxygenated graphene sheets with oxygen functional groups on their basal planes and edges. In some embodiments, GO comprises a single lamellar structure of carbon-like graphene and bears a large number of oxygen-containing functional groups, allowing it to disperse within a variety of solvents. As such, the unique characteristics of GO allow for its use within a multitude of carbon-based applications such as nanocomposite materials, polymer composite materials, energy storage, and biomedical applications and as a surfactant or a catalyst.

GO can be currently formed by the Hummers' method, which employs concentrated sulfuric acid, sodium nitrate, and potassium permanganate to oxidize the graphite. Although modified Hummers' methods have simplified the original Hummers' method, all such current methods produce GO materials comprising high percentages of by-products and impurities including but not limited to $K^+$, $H^+$, $Mn^{2+}$, and $SO_4^{2-}$. In some embodiments, these impurities reduce at least one of the electrical and the chemical performance of the GO. Further, GO formed by the Hummers' method exhibits a strong acidity (pH<0) and a high salt concentration of about 40 grams per liter (g/L) to about 55 g/L.

Filtering out such performance-detrimental by-products, however, is currently expensive, time consuming, and water intensive because of GO's hydrophilicity. Filtering is further inhibited by the formation of charge-stabilized GO colloids or gels. Such colloids become more dispersive in water as the GO concentration increases to form a highly viscous GO solution even at low GO concentrations. As such, the combination of GO's high hydrophilicity and the viscosity require a substantial amount of energy to filter out impurity by-products during the production of GO.

Alternative filtering methods, such as dialysis, have been used for increased GO production throughput and efficiency. Dialysis is the process of separating molecules in solution by the difference in their rates of diffusion through a semipermeable membrane. Such methods, however, are highly time intensive because the main driving force for solute mass transfer across a dialysis membrane significantly decreases as the solution is purified and as the solute concentration across the membrane diminishes. Thus, as a large number of dialysis cycles are required to remove a sufficient quantity of by-products, such methods may not be appropriate for industrial-scale GO production.

FIG. 1 shows a schematic illustration of an exemplary dead-end filtering method of forming a GO material, in accordance with some embodiments. Provided herein is a first method of forming a purified GO material 100 comprising: forming 110 a GO suspension 112; dewatering 120 the GO suspension 112; forming a GO solution 140; and filtering 130 the GO solution 140. In some embodiments, the GO solution 140 comprises the dewatered GO suspension 122 and a solvent solution 132. In some embodiments, the first method of forming a purified GO material 100 comprises: forming 110 a GO suspension 112; dispersing the GO suspension 112 on a first filter 121; dewatering 120 the GO suspension 112 through the first filter 121 to form a dewatered GO suspension 122; forming a GO solution 140 comprising the dewatered GO suspension 122 and a solvent solution 132 and filtering 130 the GO solution 140 through the first filter 121. Alternatively, in some embodiments, the first method of forming a purified GO material 100 comprises: forming 110 a GO suspension 112; dispersing the GO suspension 112 on a first filter 121; dewatering 120 the GO suspension 112 through the first filter 121 to form a dewatered GO suspension 122; and filtering 130 the GO solution 140 through a second filter.

In some embodiments, the GO suspension 112 is dispersed onto a first filter 121 before the dewatering 120 the GO suspension 112. In some embodiments, the GO suspension 112 is dewatered 120 through a first filter 121. In some embodiments, the GO suspension 112 is dewatered 120 through the first filter 121 to form a dewatered GO suspension 122. In some embodiments, filtering 130 the GO solution 140 comprises filtering 130 the dewatered GO suspension 122 and a solvent solution 132. In some embodiments, filtering 130 the GO solution 140 comprises filtering 130 the dewatered GO suspension 122 through the first filter 121. In some embodiments, filtering 130 the dewatered GO suspension 122 comprises filtering 130 the dewatered GO suspension 122 and the solvent solution 132 through the first filter 121. Alternatively, in some embodiments, filtering 130 the dewatered GO suspension 122 comprises filtering 130 the dewatered GO suspension 122 through a second filter. In some embodiments, filtering 130 the dewatered GO suspension 122 comprises filtering 130 the dewatered GO suspension 122 and the solvent solution 132 through the second filter.

In some embodiments, the GO suspension 112 comprises GO 111. In some embodiments, the step of forming GO 111 comprises a Hummers' method. In some embodiments the percent by mass of the GO 111 in the GO suspension 112 is about 0.05% to about 2%. In some embodiments, dewatering 120 reduces the volume of the GO suspension 112 (e.g., by up to about 90%), which reduces the volume of the solvent solution 132 and the time required for any post-filtration washing processes. In some embodiments, the volume of the solvent solution 132 depends on the initial volume of the GO suspension 112.

As seen in FIG. 1, filtering 130 the GO solution 140 comprises dead-end filtering. In some embodiments, dead-end filtration comprises forcing the feed solution to flow directly into a filter, wherein the rejected components accumulate in the feed solution. Stationary phase filtration methods, such as dead-end filtration, wherein the GO product remains stationary on the filter, allows for a higher throughput than dynamic filtration means because a dilution process to maintain a low water content of the GO material is not necessary. In some embodiments, although the stationary retentate in many stationary phase filtration methods causes clogging and fouling of the filter, the use of the solvent solution 132 prevents clogging and fouling to increase throughput. In some embodiments, a filter press is an apparatus for dead-end filtration. In some embodiments, GO is purified with a filter press by transferring a GO slurry to a chamber clothed with a micro-filter, adding HCl or water, and extruding a liquid out of the GO suspension through the filter cloth or the membrane filter.

Alternatively, in some embodiments, dewatering 120 the GO suspension 112 comprises centrifugal filtering, dead-end filtering, cross-flow filtering, stationary phase filtering, dynamic phase filtering, surface filtering, depth filtering, vacuum filtering, recirculation filtering, or any combination thereof. In some embodiments, diafiltration is a dilution process that employs a washing process, which dilutes a GO solution, and a filtration process, which recovers only the GO. In some embodiments, the solute mass transfer rate during diafiltration can be mechanically controlled by exerting a hydraulic pressure upon a filtration membrane. In some embodiments, the process of diafiltration comprises rinsing out alkaline metal salts using HCl, wherein excess HCl maintains a pH as low as around 0 to suppress GO gelation. Some embodiments further comprise washing the GO solution with water and dead-end or cross-flow filtering.

As seen in FIG. 1, first filter 121 comprises a Buchner funnel. Alternatively, in some embodiments, at least one of the first filter 121 and the second filter comprise a surface filter, a sieve, a filter paper, a belt filter, a drum filter, a cross-flow filter, a screen filter, a depth filter, a polymeric membrane, a ceramic membrane, a stainless steel filter, a stainless steel mesh, a carbon fiber mesh, a microfilter, an ultrafilter, a membrane, or any combination thereof. In some embodiments, the first filter 121 comprises a stainless steel, dead-end Buchner funnel. In some embodiments, the second filter is the first filter 121.

In some embodiments, the solvent solution 132 comprises an organic solvent. In some embodiments, the solvent solution 132 comprises a polar organic solvent. The use of a polar solvent instead of, or addition to, water significantly reduces the gelation of GO and thus minimizes clogging of the first filter 121. In some cases, the reduced clogging enables high throughput and efficiency without the need for additional caustic or toxic chemicals. In some embodiments, the solvent solution 132 comprises a polar protic solvent. In some embodiments, the solvent solution 132 comprises a highly salt soluble solvent. In some embodiments, the solvent solution 132 comprises a water-miscible solvent. In some embodiments, the solvent solution 132 comprises a low-viscosity solvent. In some embodiments, the solvent solution 132 comprises a neutral pH solvent. In some embodiments, the solvent solution 132 comprises a non-toxic solvent. In some embodiments, the solvent solution 132 comprises 1,2-dichloroethane, 1,2-dimethoxy-ethane, 1,4-dioxane, 1-butanol, 1-propanol, 2-(2-propyl)-5-methyl-cyclohexane-1-ol, 2-butanol, 2-butanone, 2-propanol, 3,7-dimethylocta-2,6-dien-1-ol, acetic acid, acetone, acetonitrile, an alcohol, benzene, butan-1-ol, butane-1,2,3,4-tetraol, carbon tetrachloride, chlorobenzene, chloroform, cyclohexane, cyclohexane-1,2,3,4,5,6-hexol, dichloromethane, diethyl ether, diethylene glycol, diglyme, dimethyl ether, dimethyl sulfoxide, dimethylformamide, dimethyl-formamide, ethane-1,2-diol, ethanol, ethyl acetate, ethylene glycol, formic acid, glycerin, heptane, heptane-1,2,3,4,5,6,7-heptol, hexadecan-1-ol, hexamethylphosphoramide, hexamethylphosphoroustriamide, hexane, hexane-1,2,3,4,5,6-hexol, isopropanol, methanol, methyl t-butyl ether, methylene chloride, m-xylene, n-butanol, nitromethane, N-methyl-2-pyrrolidinone, N-methyl-2-pyrrolidone, n-propanol, or any combination thereof. In some embodiments, o-xylene, pentan-1-ol, pentane, pentane-1,2,3,4,5-pentol, petroleum ether, Prop-2-ene-1-ol, prop-2-yn-1-ol, propan-2-ol, propane-1,2,3-triol, propane-1,2-diol, p-xylene, pyridine, t-butyl alcohol, tetrahydrofuran, methanol, toluene, triethyl amine, water, or any combination thereof.

Figure 2:
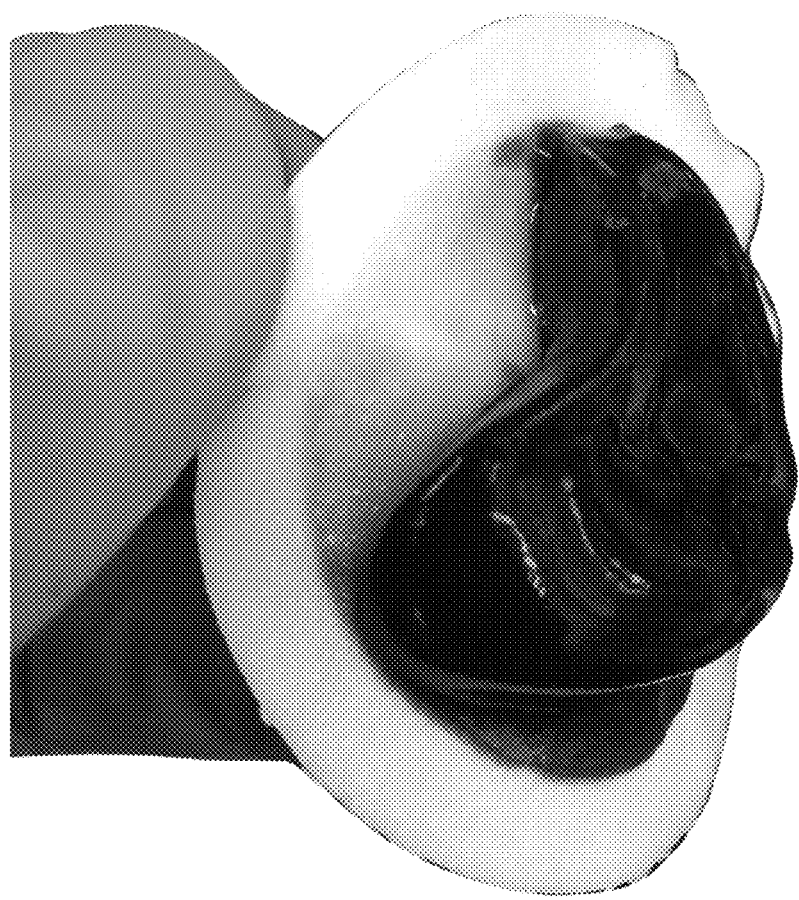
FIG. 2 shows an image of an exemplary gelated GO on a filter.

In some embodiments, because GO gelation enhances as the suspension is purified, gelated GO cakes block the filter pores and the flow channel of conventional filters, which increases the energy expenditure, maintenance, and time necessary to produce purified GO. FIG. 2 shows an image of an exemplary gelated GO on a filter.

Some embodiments further comprise drying the GO solution 140. In some embodiments, drying the GO suspension is performed by air blowing, dry evaporation, oven heating, freeze-drying, or any combination thereof. Dry evaporation can be performed at an ambient temperature or at an elevated temperature. In some embodiments, drying the GO solution is performed by drying methods known to one of skill in the art. In some embodiments, the air blowing is performed with a dry gas stream. In some embodiments, drying the GO solution 140 comprises an air blowing process employing a dry gas stream at a pressure of about 10 psi to about 30 psi. The use of the solvent solution 132 during dewatering 120 increases the throughput of the drying process. In some embodiments, freeze-drying best maintains the physiochemical properties of GO compared with heating-based drying. However, as the freeze-drying process and the storage of freeze dried GO can restack the GO sheets to form non-dispersible GO aggregates, such a drying method is not ideal. Further, freeze-drying processes exhibits an uneconomical cost/mass for high-throughput manufacturing.

Figure 3:
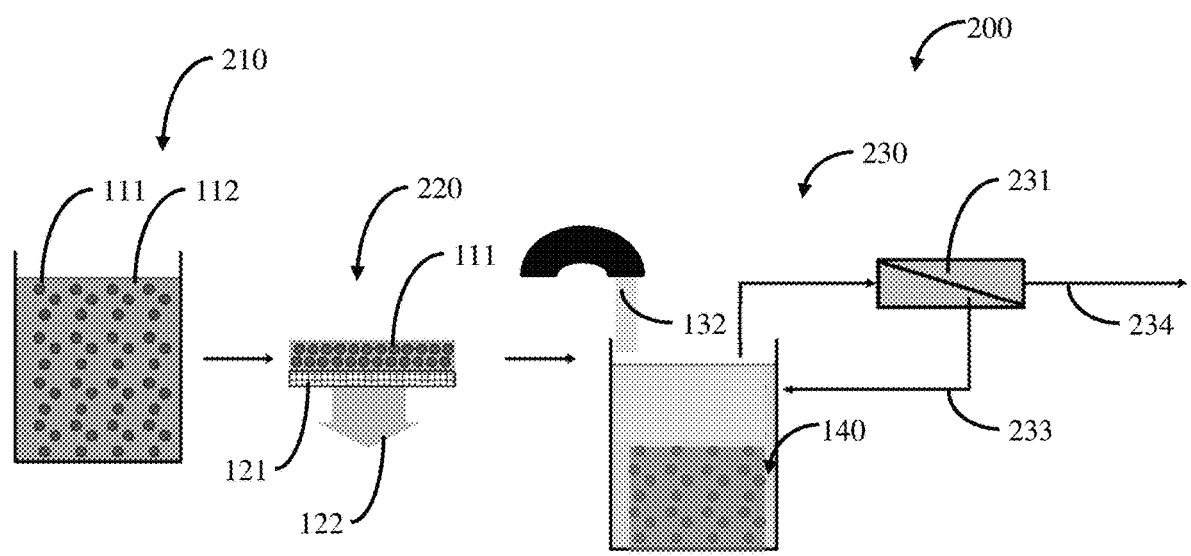
FIG. 3 shows a schematic illustration of an exemplary cross-flow filtering method of forming a GO material, in accordance with some embodiments.

FIG. 3 shows a schematic illustration of an exemplary cross-flow filtering method of forming a GO material, in accordance with some embodiments. Provided herein is a second method of forming a purified GO material 200 comprising: forming 210 a GO suspension 112; dewatering 220 the GO suspension 112 to form a dewatered GO suspension 122; forming a GO solution 140 comprising the dewatered GO suspension 122 and a solvent solution 132; and filtering 230 the GO solution 140.

In some embodiments, the GO suspension 112 is dispersed onto a first filter 121 before the dewatering 220 the GO suspension 112. In some embodiments, the GO suspension 112 is dewatered 220 through a first filter 121. In some embodiments, the GO suspension 112 is dewatered 220 through the first filter 121 to form a dewatered GO suspension 122.

In some embodiments, filtering 230 the dewatered GO suspension 122 comprises cross-flow filtering at least one of the dewatered GO suspension 122 and a solvent solution 132. In some embodiments cross-flow filtering comprising filtering a tangentially flowing feed solution to separate a retentate 233 from a permeate 234. In some embodiments, the feed solution comprises at least one of the dewatered GO suspension 122 and the solvent solution 132. In some embodiments, the retentate 233 comprises at least one of GO 111 and the solvent solution 132. In some embodiments, the permeate 234 comprises an impurity. In some embodiments, the permeate 234 is discarded.

In some embodiments, filtering 230 the GO solution 140 comprises cross-flow recirculation filtering 231 the GO solution 140. In some embodiments, cross-flow recirculation filtering 231 the GO solution 140 comprises adding the retentate 233 to the GO solution 140.

In some embodiments, cross-flow recirculation filtering 231 the GO solution 140 reduces the energy expenditure, maintenance, and time necessary to produce purified GO by preventing GO gelation. Gelation from colloid formation at even low concentrations of GO 111 forms highly viscous feed solutions that block the filter pores and the flow channel of conventional filters. By reintroducing the retentate 233 into the GO solution 140, however, cross-flow recirculation filtering 231, ensures continuously low concentrations of GO 111 throughout the filtering process. In some embodiments, cross-flow recirculation filtering 231 the GO solution 140 further comprises adding a volume of the solvent solution 132 to the GO solution 140 equal to the volume of the permeate 234. In some embodiments, cross-flow recirculation filtering 231 the GO solution 140 further comprises adding the solvent solution 132 to the GO solution 140 at a flow rate equal to the output flow rate of the permeate 234. In some embodiments, the total amount of the added solvent solution 132 depends on the initial GO 111 amount. In some embodiments, adding a volume of the solvent solution 132 to the GO solution 140 equal to the volume of the permeate 234 further ensures continuously low concentrations of GO 111 throughout the filtering process.

In some embodiments, the second method of forming a purified GO material 100 comprises: forming a GO suspension 112; dispersing the GO suspension 112 on a first filter 121; dewatering 120 the GO suspension 112 through the first filter 121 to form a dewatered GO suspension 122; forming a GO solution 140 comprising the dewatered GO suspension 122 and a solvent solution 132; and cross-flow recirculation filtering 231 the dewatered GO suspension 122 and a solvent solution 132; wherein the cross-flow recirculation filtering 231 comprises adding a retentate 233 to the GO suspension 112 and the solvent solution 132.

As seen in FIG. 3, the first filter 121 comprises a Buchner funnel. Alternatively, in some embodiments, at least one of the first filter 121 and the second filter comprises a surface filter, a sieve, a filter paper, a belt filter, a drum filter, a cross-flow filter, a screen filter, a depth filter, a polymeric membrane, a ceramic membrane, a stainless steel filter, a stainless steel mesh, a carbon fiber mesh, a microfilter, an ultrafilter, a membrane, or any combination thereof. In some embodiments, the first filter 121 comprises a stainless steel, dead-end Buchner funnel.

In some embodiments, dewatering 220 the GO suspension 112 comprises centrifugal filtering, dead-end filtering, cross-flow filtering, stationary phase filtering, dynamic phase filtering, surface filtering, depth filtering, vacuum filtering, recirculation filtering, or any combination thereof.

As seen in FIG. 3, the second filter comprises a cross-flow filter. Alternatively, in some embodiments, the second filter comprises a Buchner funnel, a surface filter, a sieve, a filter paper, a belt filter, a drum filter, a screen filter, a depth filter, a polymeric membrane, a ceramic membrane, a stainless steel filter, a stainless steel mesh, a carbon fiber mesh, a microfilter, an ultrafilter, a membrane, or any combination thereof. In some embodiments, cross-flow recirculation filtration 231 comprises running a feed solution parallel to a filter's surface. In some embodiments, filter clogging and fouling in cross-flow recirculation filtration 231 occurs less than with dead-end filtration, because of the back diffusion of foulants controlled by the cross-flow velocity.

In some embodiments, for a period of time the solvent solution 132 comprises water. In some embodiments, for a period of time the solvent solution 132 comprises a solvent. In some embodiments, for a period of time the solvent solution 132 comprises water and a solvent. In some embodiments, the period of time is at least about 5 minutes, 10 minutes, 20 minutes, 30 minutes, 40 minutes, 50 minutes, or about 60 minutes, and/or no more than about 5 minutes, 10 minutes, 20 minutes, 30 minutes, 40 minutes, 50 minutes, or about 60 minutes. In some embodiments, the period of time is at least about 1 hour, 2 hours, 3 hours, 4 hours, 5 hours, 6 hours, 7 hours, 8 hours, 9 hours, 10 hours, 11 hours, or about 12 hours, and/or no more than about 1 hour, 2 hours, 3 hours, 4 hours, 5 hours, 6 hours, 7 hours, 8 hours, 9 hours, 10 hours, 11 hours, or about 12 hours. In some embodiments, the solvent solution 132 comprises an organic solvent. In some embodiments, the solvent solution 132 comprises a polar organic solvent. The use of a polar solvent instead of, or in addition to, water significantly reduces the gelation of GO and thus minimizes clogging of the second filter. In some cases, the reduced clogging enables high throughput and efficiency without the need for additional caustic or toxic chemicals. In some embodiments, the solvent solution 132 comprises a polar protic solvent. In some embodiments, the solvent solution 132 comprises a highly salt soluble solvent. In some embodiments, the solvent solution 132 comprises a water-miscible solvent. In some embodiments, the solvent solution 132 comprises a low-viscosity solvent. In some embodiments, the solvent solution 132 comprises a neutral pH solvent. In some embodiments, the solvent solution 132 comprises a non-toxic solvent. In some embodiments, the solvent solution 132 comprises 1,2-dichloroethane, 1,2-dimethoxy-ethane, 1,4-dioxane, 1-butanol, 1-propanol, 2-(2-propyl)-5-methyl-cyclohexane-1-ol, 2-butanol, 2-butanone, 2-propanol, 3,7-dimethylocta-2,6-dien-1-ol, acetic acid, acetone, acetonitrile, an alcohol, benzene, butan-1-ol, butane-1,2,3,4-tetraol, carbon tetrachloride, chlorobenzene, chloroform, cyclohexane, cyclohexane-1,2,3,4,5,6-hexol, dichloromethane, diethyl ether, diethylene glycol, diglyme, dimethyl ether, dimethyl sulfoxide, dimethylformamide, dimethyl-formamide, ethane-1,2-diol, ethanol, ethyl acetate, ethylene glycol, formic acid, glycerin, heptane, heptane-1,2,3,4,5,6,7-heptol, hexadecan-1-ol, hexamethylphosphoramide, hexamethylphosphoroustriamide, hexane, hexane-1,2,3,4,5,6-hexol, isopropanol, methanol, methyl t-butyl ether, methylene chloride, m-xylene, n-butanol, nitromethane, N-methyl-2-pyrrolidinone, N-methyl-2-pyrrolidone, n-propanol, or any combination thereof. In some embodiments, o-xylene, pentan-1-ol, pentane, pentane-1,2,3,4,5-pentol, petroleum ether, Prop-2-ene-1-ol, prop-2-yn-1-ol, propan-2-ol, propane-1,2,3-triol, propane-1,2-diol, p-xylene, pyridine, t-butyl alcohol, tetrahydrofuran, methanol, toluene, triethyl amine, water, or any combination thereof.

In some embodiments, the GO material is an aqueous GO material. In some embodiments, the aqueous material comprises an ink, a paste, a solution, a fluid, a liquid, a paint, a dye, a coating, or a compound. In some embodiments, the GO material can be drop-cast onto a substrate. In some embodiments the substrate is a silicon wafer. In some embodiments, the drop-cast GO material is then coated with silicon dioxide.

Some embodiments further comprise drying the solvent solution 132, the GO suspension 122, and the retentate 233. In some embodiments, drying is performed by air blowing, dry evaporation, oven heating, freeze-drying, or any combination thereof. In some embodiments, drying the GO suspension is performed by drying methods known to one of skill in the art. In some embodiments, the dry evaporation is performed at an ambient temperature. In some embodiments, the air blowing is performed with a dry gas stream. In some embodiments, the air blowing is performed with a dry gas stream at a pressure of about 10 psi to about 30 psi. In some embodiments, the use of a solvent solution during dehydration increases the throughput of the drying process. In some embodiments, freeze-drying best maintains the physiochemical properties of GO compared with heating-based drying. However, as the freeze-drying process and the storage of freeze dried GO restack the GO sheets to form non-dispersible GO aggregates, such a drying method is not ideal. Further, freeze-drying processes exhibits an uneconomical cost/mass for high-throughput manufacturing.

In some embodiments, the methods described herein do not require any acid solution such as HCl to suppress GO gelation. In some embodiments, the methods do not require a pure polar solvent as a washing solution; instead, a solvent-water mixture can be applied. The use of a solvent-water mixture as a washing solution benefits the methods to enhance salt solubility of the washing solution, while still depressing GO gelation.

Figure 4A:
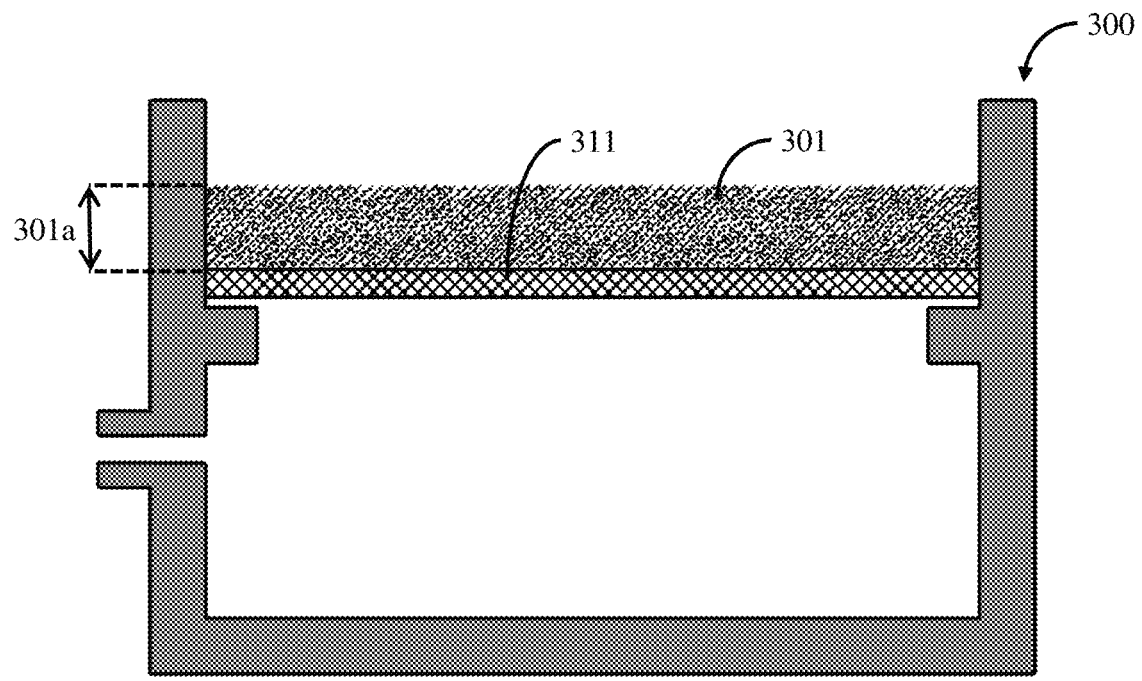
FIG. 4A shows a schematic illustration of an exemplary apparatus and method of dispersing a GO suspension on a first filter, in accordance with some embodiments.

FIG. 4A shows a schematic illustration of an exemplary apparatus and method of dispersing a GO suspension on a first filter, in accordance with some embodiments. FIG. 4A shows the dispersing of a GO suspension 301 on a first filter 311 of an apparatus 300. Per FIG. 4A, the GO suspension 301 is dispersed on a first filter 311 with a uniform thickness 301a. Alternatively, in some embodiments, the GO suspension 301 is dispersed a first filter 311 with a non-uniform thickness. In some embodiments, the GO suspension 301 is dispersed on a first filter 311 with a uniform thickness 301a, wherein the thickness 301a corresponds to a surface area of the first filter 311. In some embodiments the ratio between the uniform thickness 301a of the GO suspension 301 and a surface area of the first filter 311 is about 20:1 to about 1:20. In some embodiments the ratio between the uniform thickness 301a of the GO suspension 301 and a surface area of the first filter 311 is about 20:1, about 10:1, about 5:1, about 4:1, about 3:1, about 2:1, about 1:1, about 1:2, about 1:3, about 1:4, about 1:5, about 1:10, or about 1:20. In some embodiments, a mass of the GO suspension per an area of the first filter 311 is about 3 kilograms per meter squared ($kg/m^2$) to about 30 $kg/m^2$. Per FIG. 4A, the first filter 311 comprises a planar filter. Alternatively, in some embodiments, the first filter 311 comprises a circular filter, a curved filter, or any combination thereof. In some embodiments, the first filter 311 comprises a Buchner funnel, a surface filter, a sieve, a filter paper, a belt filter, a drum filter, a cross-flow filter, a screen filter, a depth filter, a polymeric membrane, a ceramic membrane, a stainless steel filter, a stainless steel mesh, a carbon fiber mesh, a microfilter, an ultrafilter, a membrane, or any combination thereof. In some embodiments, the first filter 311 comprises a stainless steel, dead-end Buchner funnel. In some embodiments, the first filter has a pore size of about 0.5 micrometers (m) to about 100 µm. In some embodiments the first filter 311 is removable or embedded within the apparatus.

Figure 4B:
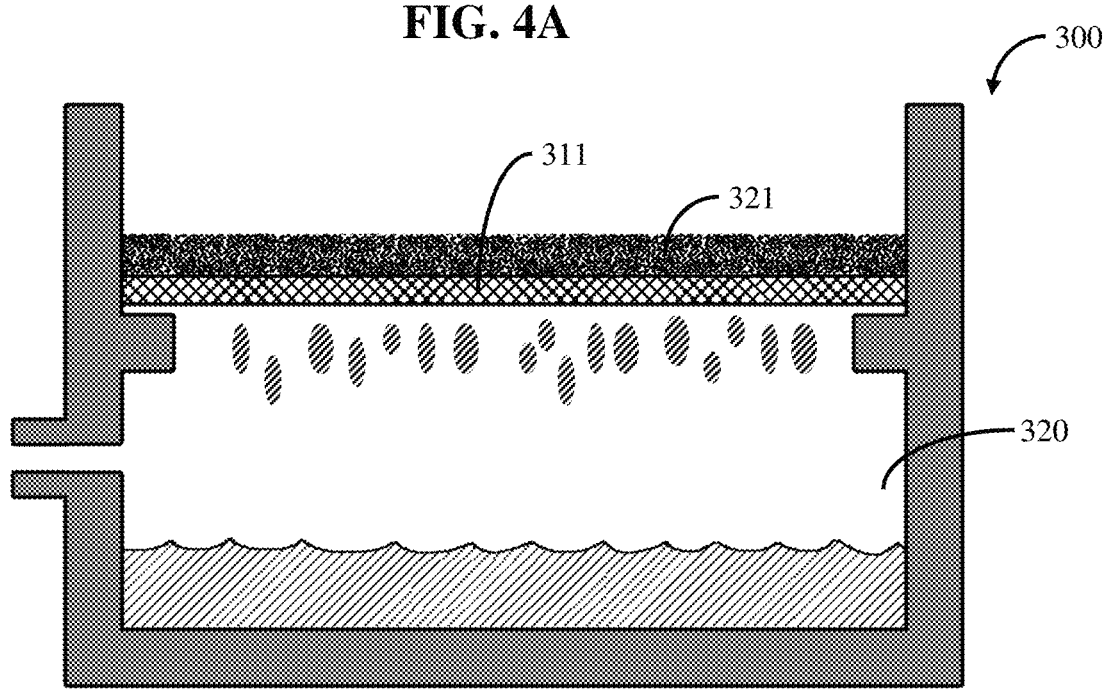
FIG. 4B shows a schematic illustration of an exemplary apparatus and method of dewatering a GO suspension on the first filter, in accordance with some embodiments.

FIG. 4B shows a schematic illustration of an exemplary apparatus and method of dewatering a GO suspension on the first filter, in accordance with some embodiments. In some embodiments, dewatering a GO suspension 301 on the first filter 311 forms a dewatered GO suspension 321. As seen in FIG. 4B, the solvent solution expelled from the GO suspension 301 is accumulated in a reservoir 320. Alternatively, in some embodiments, the solvent solution expelled from the GO suspension 301 is discarded or reused. In some embodiments, dewatering reduces the volume of the GO suspension 301 (e.g., by up to about 90%), which reduces the volume of the solvent solution and the time required for any post-filtration washing processes.

Figure 4C:
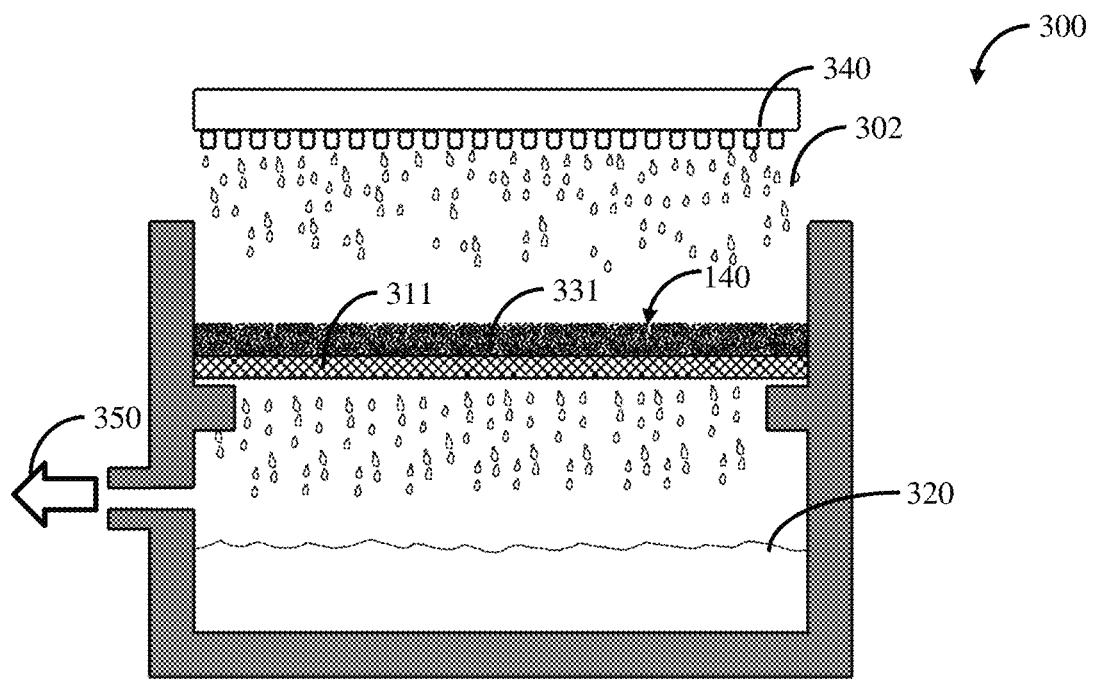
FIG. 4C shows a schematic illustration of an exemplary apparatus and method of filtering a GO solution through a first filter, in accordance with some embodiments.

FIG. 4C shows a schematic illustration of an exemplary apparatus and method of filtering a GO solution through a first filter, in accordance with some embodiments. Per FIG. 4C, in some embodiments, filtering the GO solution 140 through a first filter 311 comprises dispersing the dewatered GO suspension 331 onto the first filter 311 and dispersing the solvent 302 onto the first filter 311. Optionally, in some embodiments, filtering the GO solution 140 through a first filter 311 comprises dispersing the dewatered GO suspension 331 onto the first filter 311 and subsequently dispersing the solvent 302 onto the first filter 311. Alternatively, in some embodiments, filtering the GO solution 140 through the first filter 311 comprises dispersing the dewatered GO suspension 331 onto a first filter 311. In some embodiments, the first filter 311 is a second filter, wherein the second filter is equivalent to the first filter 311. In some embodiments, filtering the GO solution 140 through a first filter 311 comprises vacuum filtration, wherein an apparatus 300 comprises a depressurizer 350 to depressurize the reservoir 320. In some embodiments, depressurizing the reservoir 320 is performed before the dispersion of the solvent 302, during the dispersion of the solvent 302, after the dispersion of the solvent 302, or any combination thereof. In some embodiments, the apparatus 300 further comprises the depressurizer 350. As seen in FIG. 4C, the excess solvent 302 and any other impurities are collected in the reservoir 320. Alternatively, in some embodiments the excess solvent 302 and any other impurities are discarded, re-filtered, recycled, or any combination thereof. As shown in FIG. 4C, the dispersing of the solvent 302 onto the dewatered GO suspension 331 on a first filter 311 can be performed with a disperser 340, wherein the apparatus 300 comprises the disperser 340.

Figure 4D:
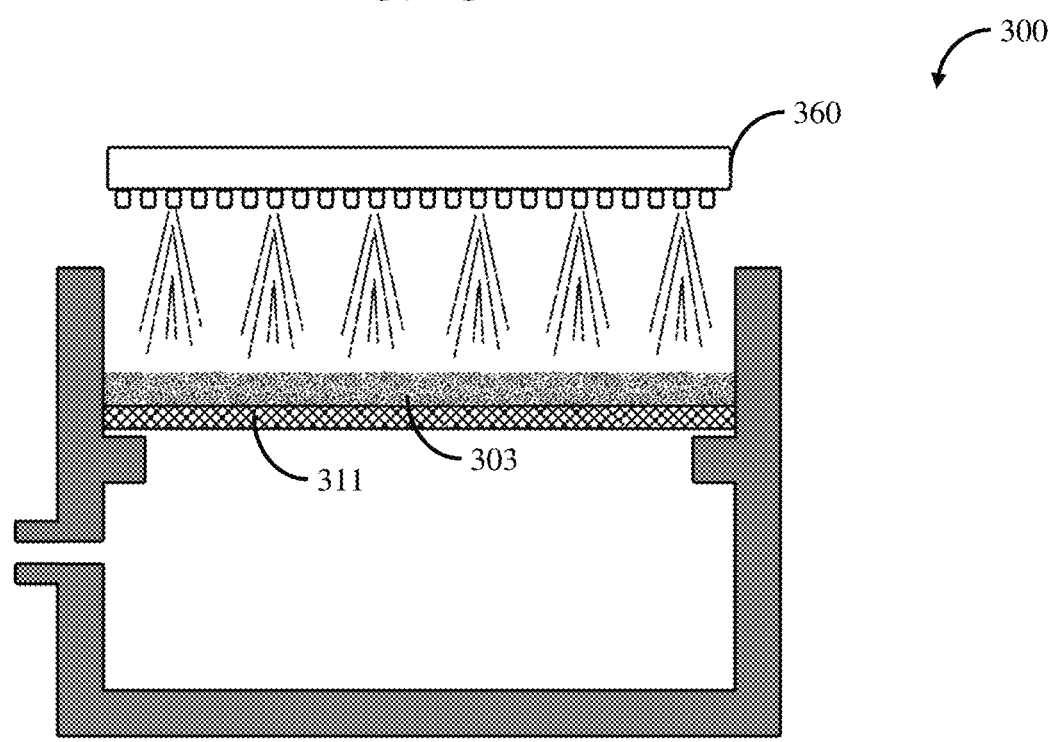
FIG. 4D shows a schematic illustration of an exemplary apparatus and method of drying a GO suspension on a first filter, in accordance with some embodiments.

FIG. 4D shows a schematic illustration of an exemplary apparatus and method of drying a GO suspension on a first filter, in accordance with some embodiments. As seen in FIG. 4D, drying the dewatered GO suspension 331 and the solvent 302 on first filter 311 is performed by a drier 360. Alternatively, in some embodiments, the dewatered GO suspension 331 and the solvent 302 are dried on the first filter 311. As shown in FIG. 4D, the drying of the solvent 302 and the dewatered GO suspension 331 can be performed with a drier 360, wherein an apparatus 300 comprises the drier 360.

Per FIG. 4D, drying the dewatered GO suspension 331 and the solvent 302 forms a GO powder 303. In some embodiments, the GO powder 303 is anhydrous, intercalated, exfoliated, or any combination thereof. In some embodiments, the GO powder 303 comprises a single layer of GO. In some embodiments, the GO powder 303 is dispersible in water, a polar solvent, or any combination thereof. Alternatively, in some embodiments, not implementing the process of drying the dewatered GO suspension 331 and the solvent 302 on the first filter 311 forms an aqueous GO material.

In some embodiments at least one of the first method and the second method is capable of producing a throughput of the GO material per an area of the first filter of about 25 g/(h*m$^2$) to about 100 g/(h*m$^2$).

Figure 5:
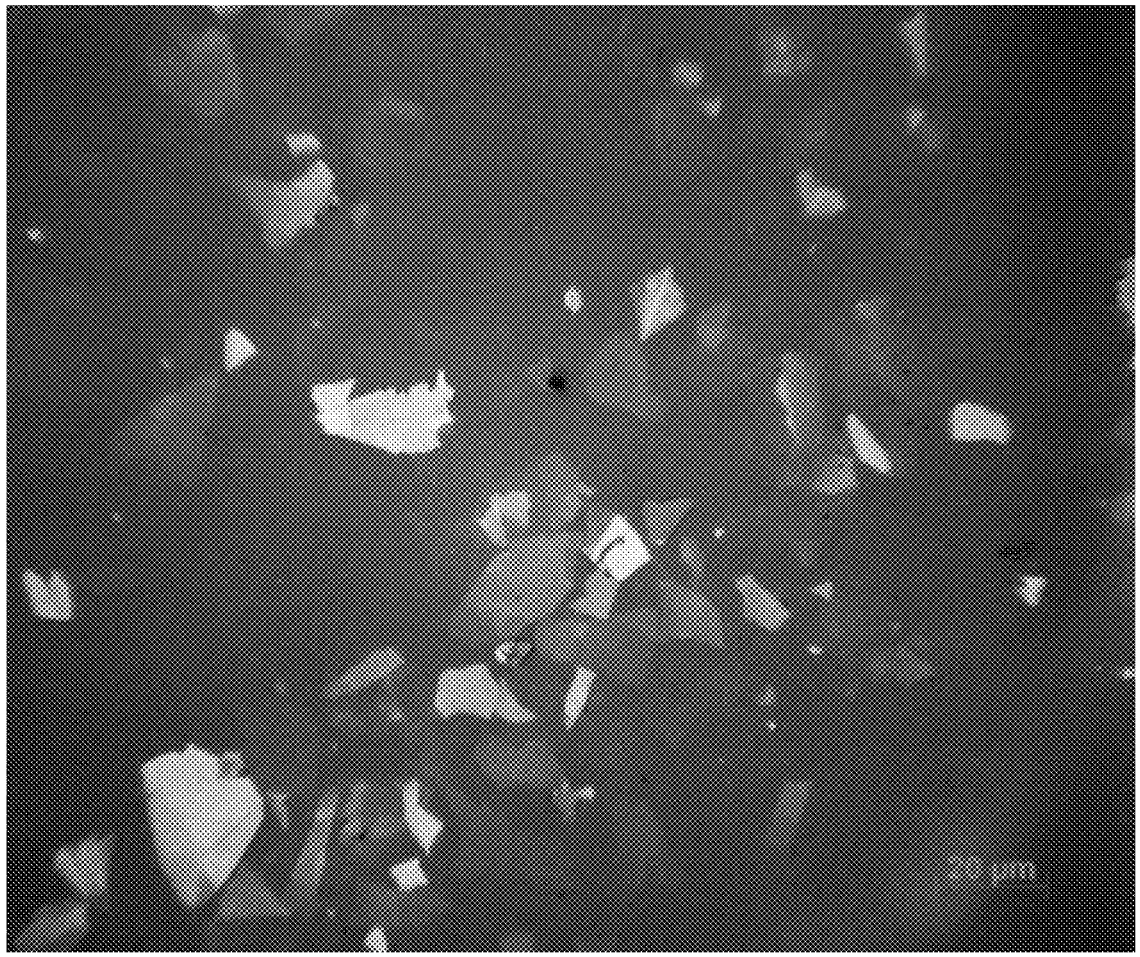
FIG. 5 shows an exemplary optical microscope image of an exemplary GO material, in accordance with some embodiments.

Optical and scanning electron microscope (SEM) images of exemplary GO materials are show in FIGS. 5 to 10F. FIG. 5 shows an exemplary optical microscope image of an exemplary GO material, in accordance with some embodiments. In some embodiments the GO material has a surface area of about 800 m$^2$/g to about 2,400 m$^2$/g. In some embodiments the GO material has a conductivity of about 0.1 S/m to about 5 S/m. In some embodiments the GO material has a C:O mass ratio of about 1:3 to about 5:1. In some embodiments the GO material has an oxidation percentage of about 15% to about 60%. In some embodiments, the percent by mass of the GO in the GO material is about 10% to about 50%.

Figure 6A:
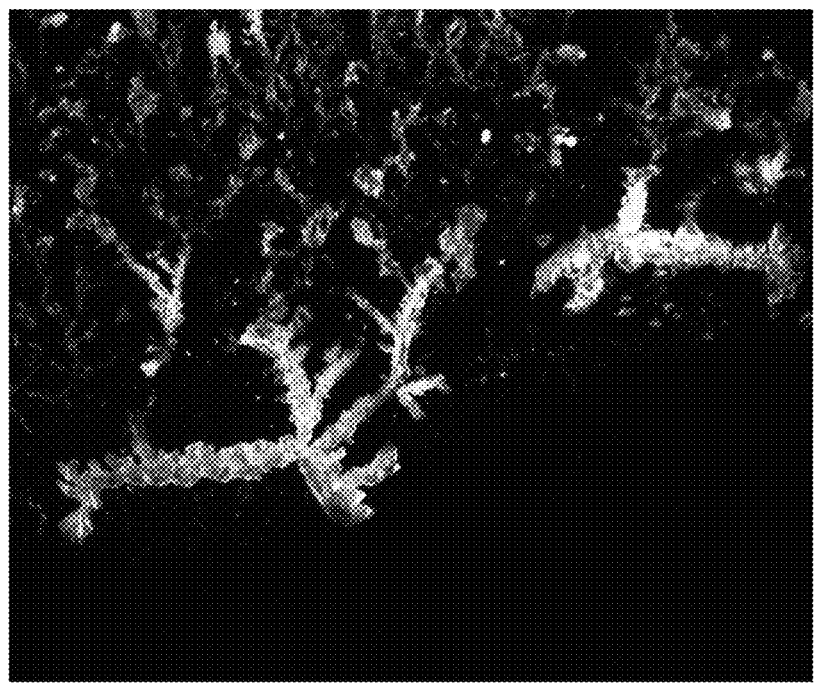
FIG. 6A shows a first optical microscope image of an exemplary GO paste, in accordance with some embodiments.
Figure 6B:
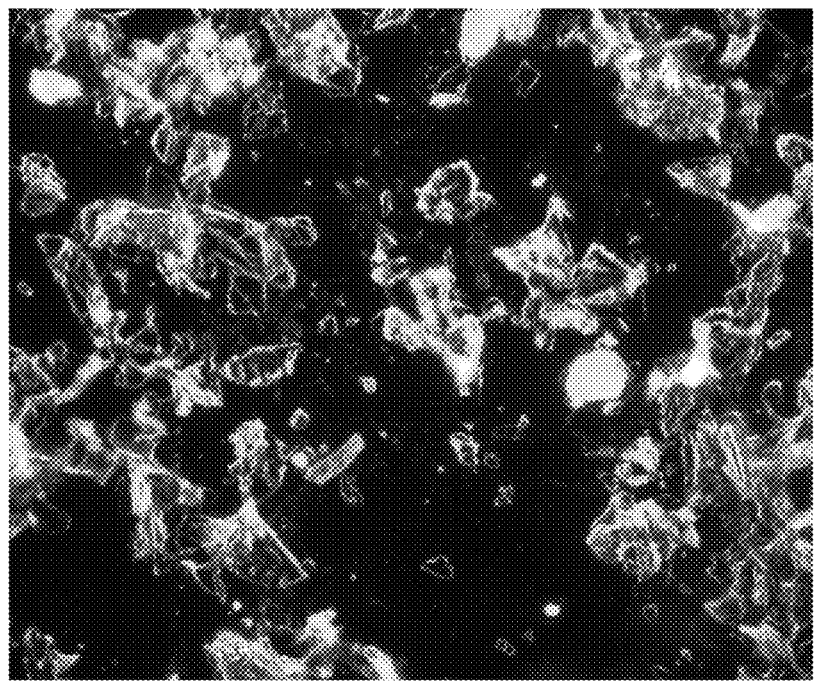
FIG. 6B shows a second optical microscope image of an exemplary GO paste, in accordance with some embodiments.
Figure 6C:
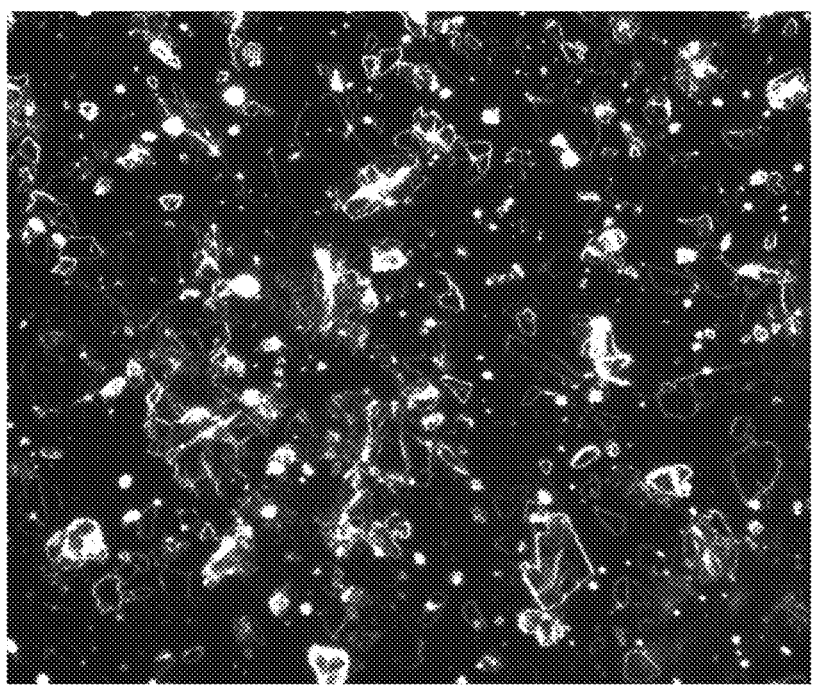
FIG. 6C shows a third optical microscope image of an exemplary GO paste, in accordance with some embodiments.
Figure 6D:
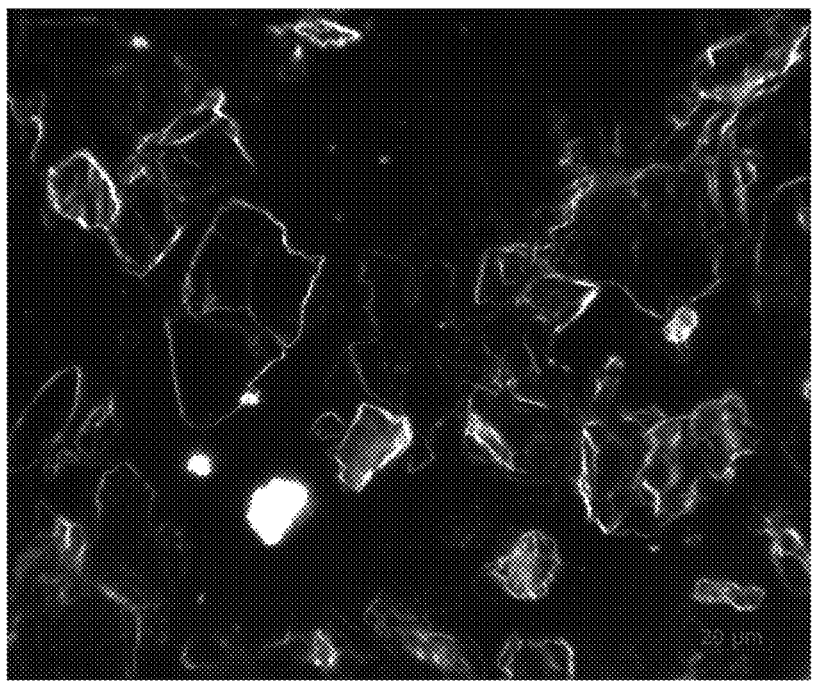
FIG. 6D shows a fourth optical microscope image of an exemplary GO paste, in accordance with some embodiments.

In some embodiments, at least one of the first method and the second method of forming a purified GO material forms an aqueous GO material. In some embodiments, the aqueous material comprises an ink, a paste, a solution, a fluid, a liquid, a paint, a dye, a coating, or a compound. FIGS. 6A-6D show optical microscope images of an exemplary aqueous GO material, in accordance with some embodiments. FIG. 6A shows a first optical microscope image of an exemplary GO paste, in accordance with some embodiments. FIG. 6B shows a second optical microscope image of an exemplary GO paste, in accordance with some embodiments. FIG. 6C shows a third optical microscope image of an exemplary GO paste, in accordance with some embodiments. FIG. 6D shows a fourth optical microscope image of an exemplary GO paste, in accordance with some embodiments. In some embodiments, the viscosity of the GO material is about 10 centipoise to about 10,000 centipoise.

Figure 7:
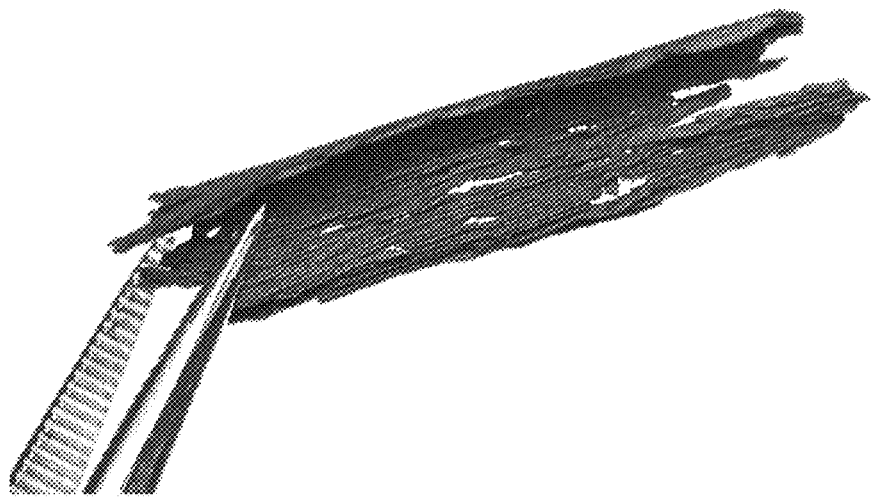
FIG. 7 shows an image of an exemplary dried GO material, in accordance with some embodiments.
Figure 8:
FIG. 8 shows an exemplary image of an exemplary dried GO powder, in accordance with some embodiments.
Figure 9A:
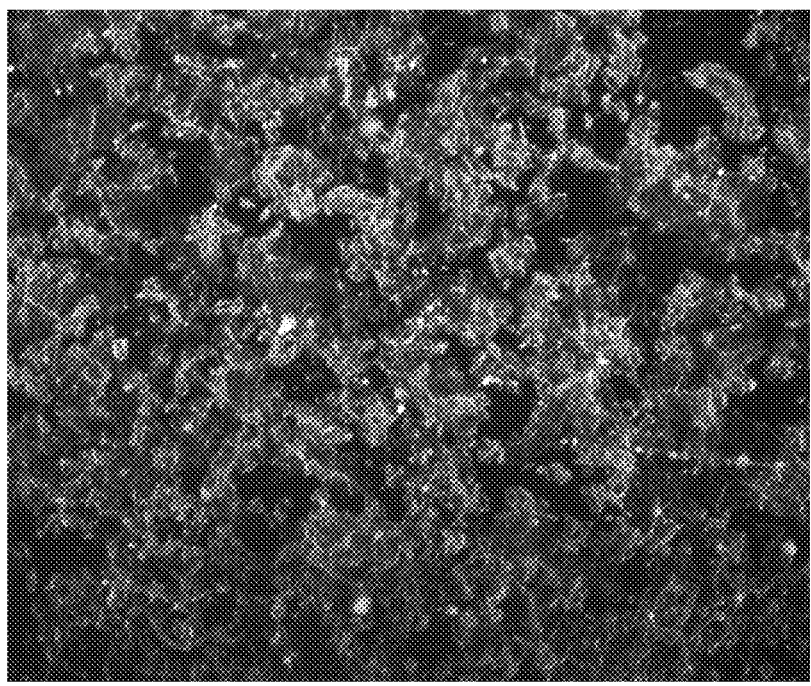
FIG. 9A shows a first optical microscope image of an exemplary powder GO material, in accordance with some embodiments.
Figure 9B:
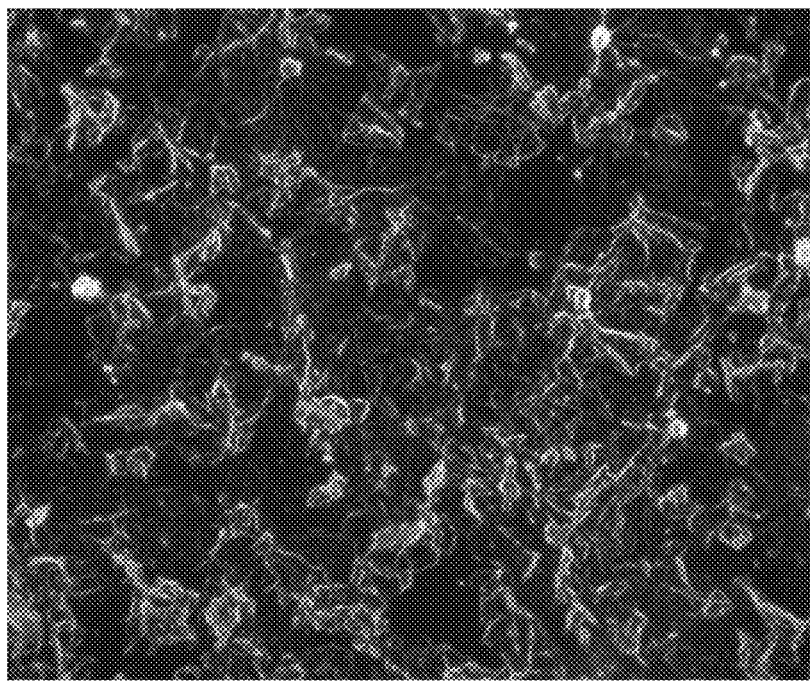
FIG. 9B shows a second optical microscope image of an exemplary powder GO material, in accordance with some embodiments.

In some embodiments, at least one of the first method and the second method of forming a purified GO material further comprises drying the GO material. In some embodiments, at least one of the first method and the second method of forming a purified GO material forms an anhydrous GO material. FIG. 7 shows an image of an exemplary dried GO material, in accordance with some embodiments. FIG. 8 shows an exemplary image of an exemplary dried GO powder, in accordance with some embodiments. In some embodiments, drying an aqueous GO material forms a GO powder. In some embodiments, the GO powder is anhydrous, intercalated, exfoliated, or any combination thereof. In some embodiments, the GO powder comprises a single layer of GO. In some embodiments, the GO powder is dispersible in water, a polar solvent, or any combination thereof. FIG. 9A shows a first optical microscope image of an exemplary powder GO material, in accordance with some embodiments. FIG. 9B shows a second optical microscope image of an exemplary powder GO material, in accordance with some embodiments.

Figure 10A:
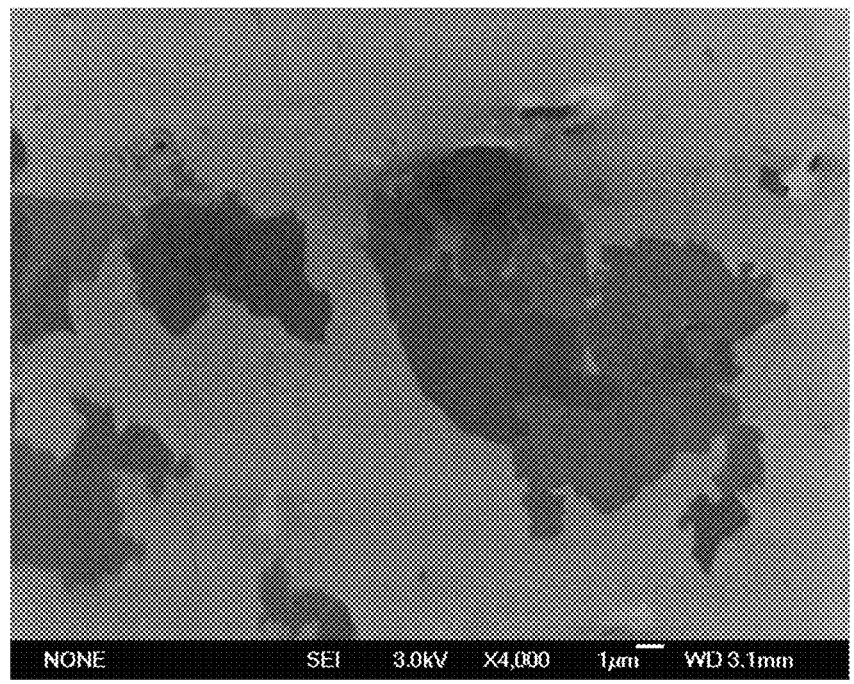
FIG. 10A shows a first high-magnification scanning electron microscope (SEM) image of an exemplary GO material, in accordance with some embodiments.
Figure 10B:
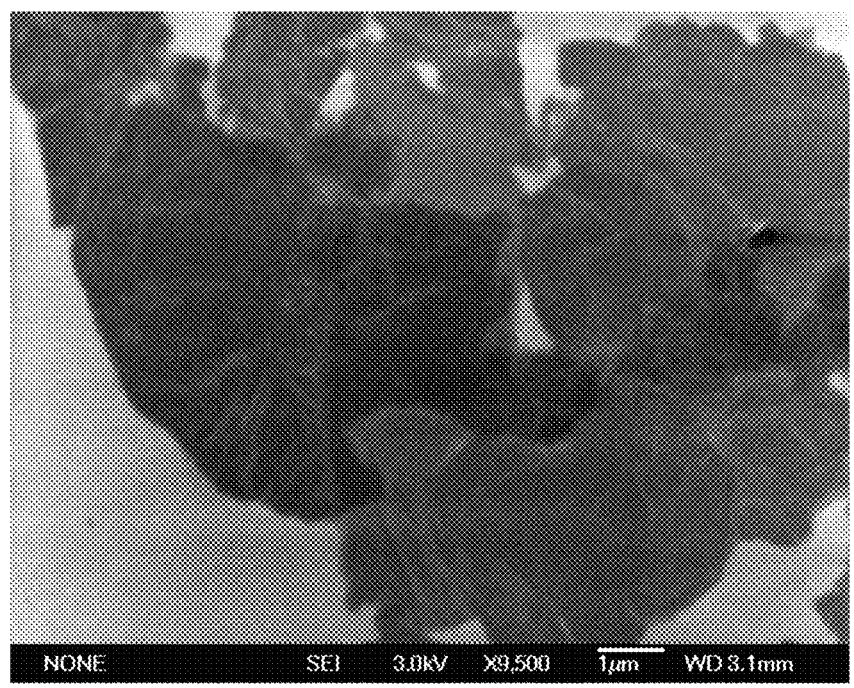
FIG. 10B shows a second high-magnification SEM image of an exemplary GO material, in accordance with some embodiments.
Figure 10C:
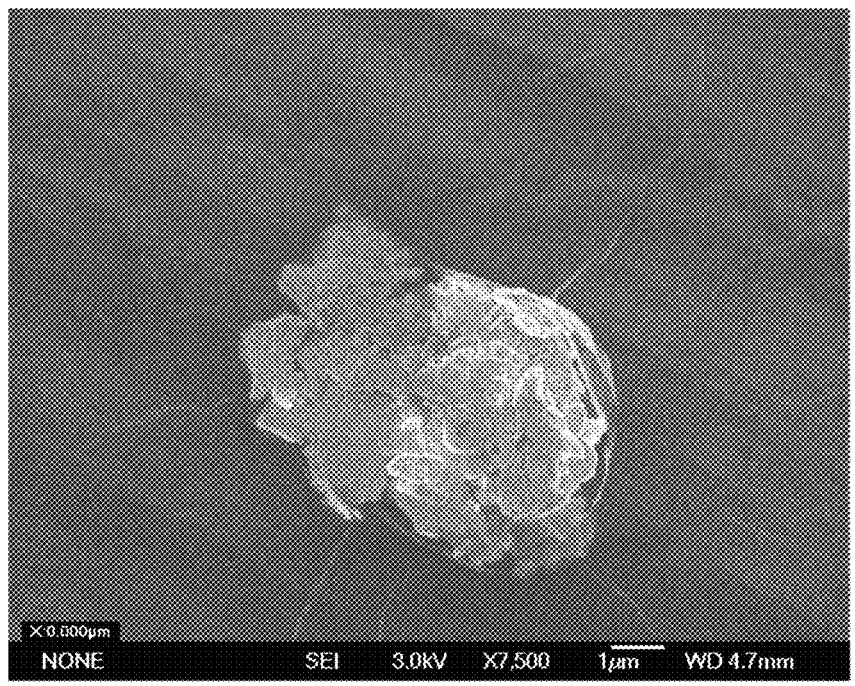
FIG. 10C shows a third high-magnification SEM image of an exemplary GO material, in accordance with some embodiments.
Figure 10D:
FIG. 10D shows a fourth high-magnification SEM image of an exemplary GO material, in accordance with some embodiments.
Figure 10E:
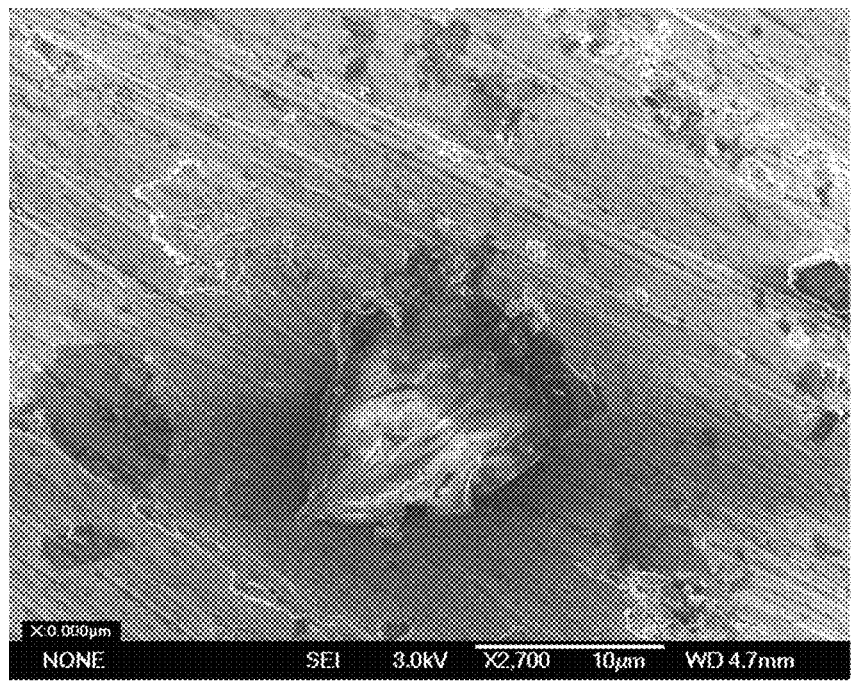
FIG. 10E shows a first low-magnification SEM image of an exemplary GO material, in accordance with some embodiments.
Figure 10F:
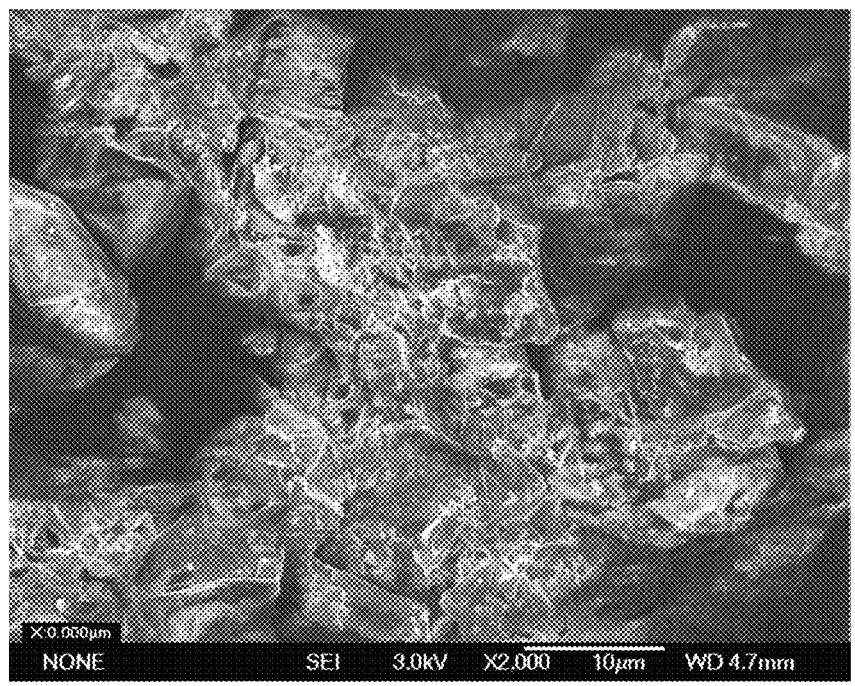
FIG. 10F shows a second low-magnification SEM image of an exemplary GO material, in accordance with some embodiments.

In some embodiments, the dried go material is further processed by grinding, freezing, dispersing, or any combination thereof. Exemplary low-magnification and high-magnification SEM images of a GO material are shown in FIGS. 10A-10F. FIG. 10A shows a first high-magnification SEM image of an exemplary GO material, in accordance with some embodiments. FIG. 10B shows a second high-magnification SEM image of an exemplary GO material, in accordance with some embodiments. FIG. 10C shows a third high-magnification SEM image of an exemplary GO material, in accordance with some embodiments. FIG. 10D shows a fourth high-magnification SEM image of an exemplary GO material, in accordance with some embodiments. FIG. 10E shows a first low-magnification SEM image of an exemplary GO material, in accordance with some embodiments. FIG. 10F shows a second low-magnification SEM image of an exemplary GO material, in accordance with some embodiments.

Figure 11:
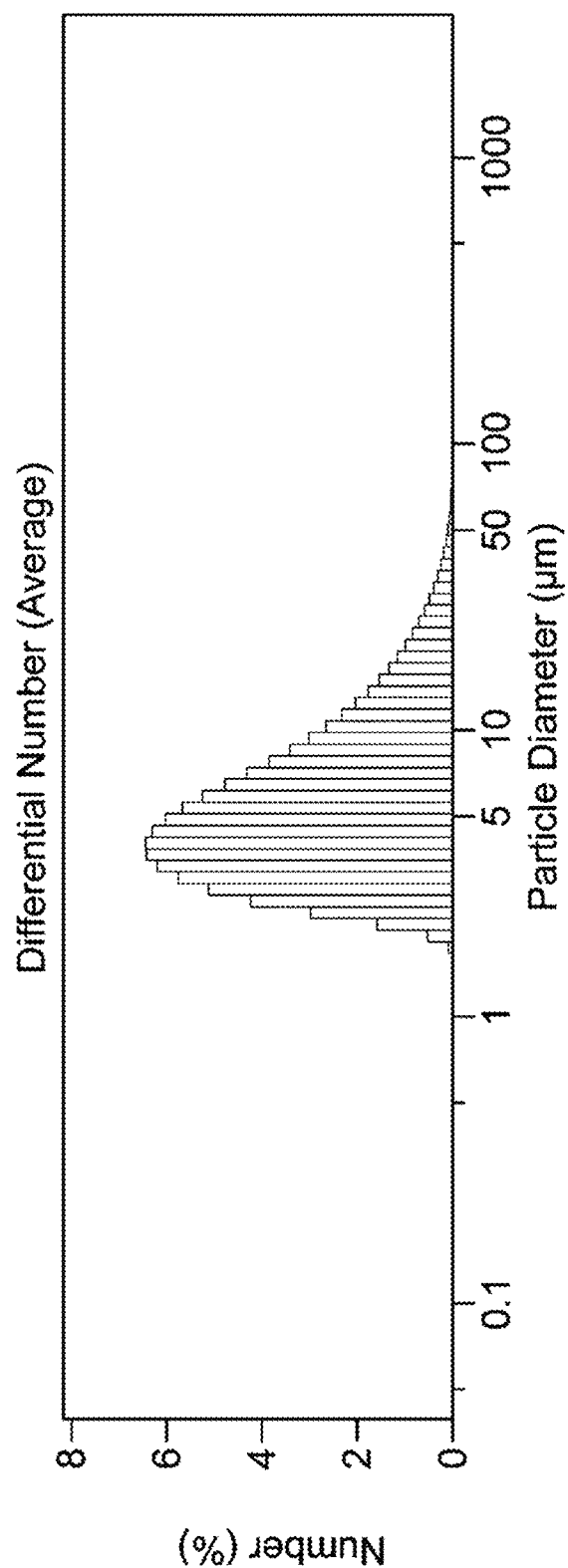
FIG. 11 shows a particle distribution chart of an exemplary GO material, in accordance with some embodiments.
Figure 12:
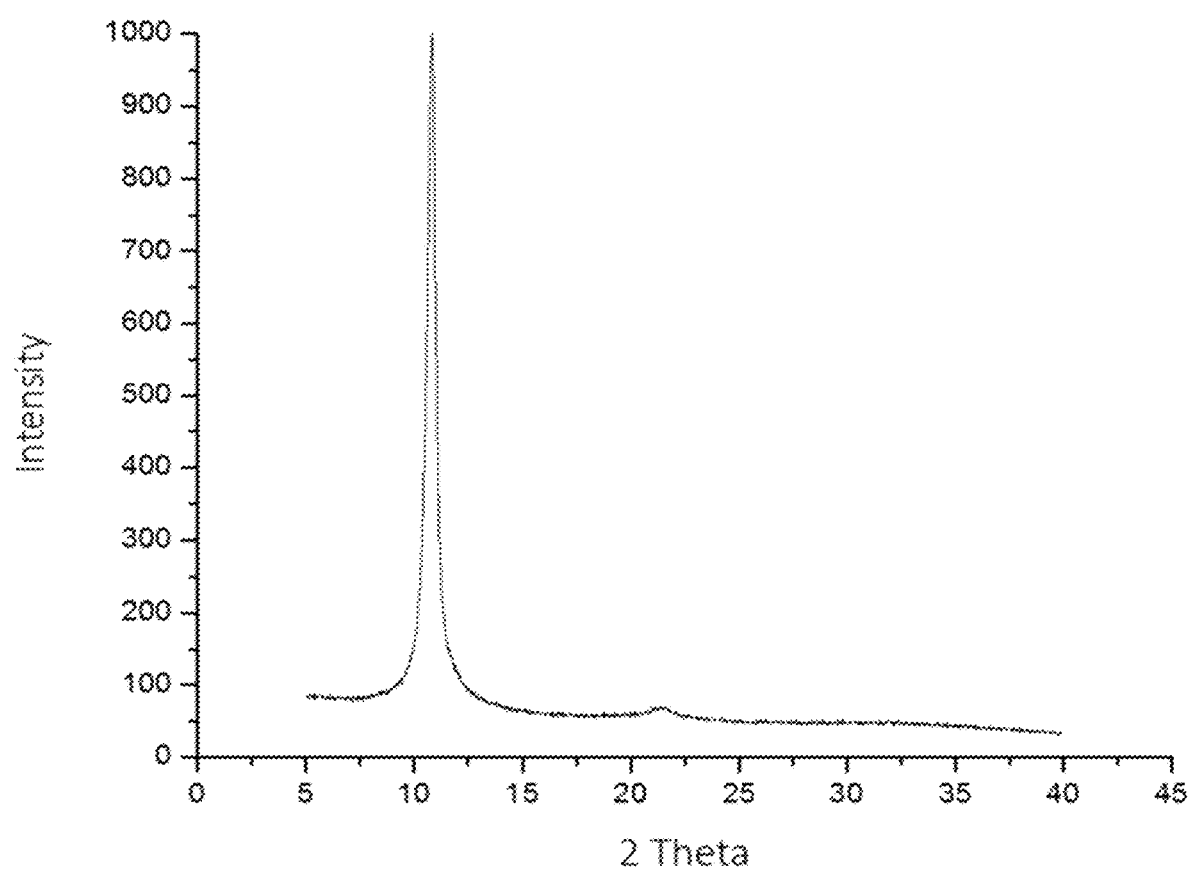
FIG. 12 shows an X-ray diffraction graph of an exemplary GO material, in accordance with some embodiments.
Figure 13:
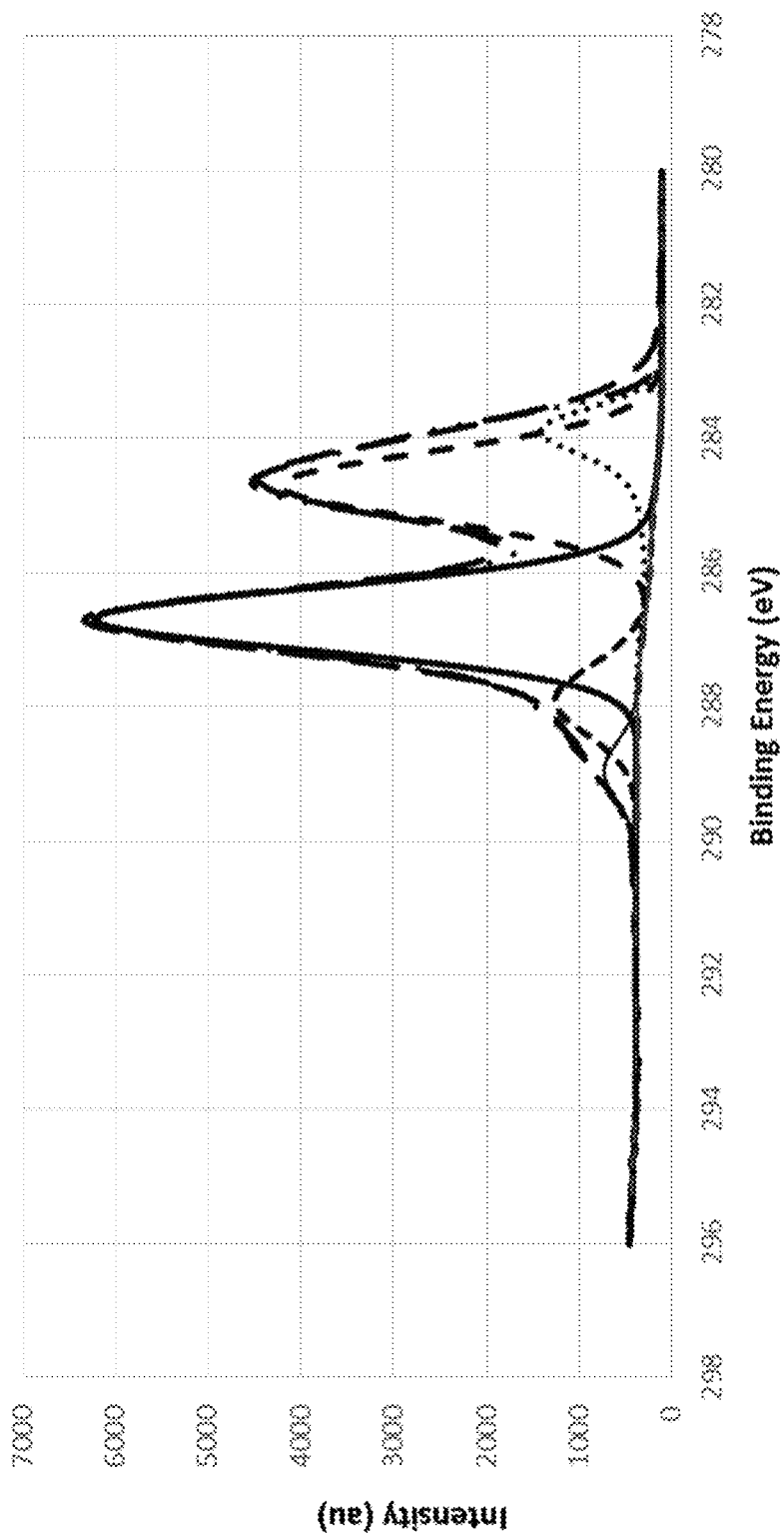
FIG. 13 shows X-ray photoelectron spectroscopy measurements of an exemplary GO material, in accordance with some embodiments.

Electrochemical characterization, per FIGS. 11 to 13 shows the extraordinary performance of exemplary GO samples formed by the methods herein. FIG. 11 shows a particle distribution chart of an exemplary GO material, in accordance with some embodiments. Per FIG. 11, the GO material exhibits a mode particle diameter of about 4 µm, with particles ranging in size from about 2 µm to about 50 µm. The particle size measurements concur with the particles seen in FIGS. 10A-10F. Particle size distribution of the GO material can be determined by measuring the static light scattering of a dilute solution of homogeneously disbursed GO material.

FIG. 12 shows an X-ray diffraction graph of an exemplary GO material, in accordance with some embodiments. X-ray diffraction graphs of the GO material can be obtained by measuring the spectra of a purified GO material that is drop-cast onto a zero-background silicon over a 15-minute scan from a 2theta of 0 to 40 degrees. FIG. 12 shows an X-ray diffraction graph of an exemplary GO material, in accordance with some embodiments. FIG. 13 shows X-ray photoelectron spectroscopy measurements of an exemplary GO material, in accordance with some embodiments. X-ray photoelectron spectroscopy measurements were performed on a purified GO sample that was drop-cast onto a copper tape.

EXAMPLES

Example 1: Centrifuge/Dead-End Filtration

A GO material is formed by preparing a GO suspension by a modified Hummers' method. The GO suspension is dewatered using a centrifuge or a dead-end filter. The dewatered GO suspension is transferred to a micro-filter and washed with a solvent-water mixture under vacuum, whereby the purified GO cakes are then removed from the micro-filter.

Example 2: Cross-Flow Filtration

A GO material is formed by preparing a GO suspension by a modified Hummers' method. The GO suspension is dewatered using a centrifuge or a dead-end filter. The dewatered GO is diluted in a process reservoir in a volume of solvent-water mixture sufficient to attain the initial volume of the GO suspension before dewatering. The GO and the solvent-water mixture are filtered through a cross-flow microfilter by a Teflon diaphragm recirculation pump and back to the process reservoir at a controlled flow rate and pressure to separate a retentate from a permeate. In some embodiments, as the GO recirculation through the microfilter produces the permeate flow, a solvent-water mixture is continuously added to the process reservoir at a flow rate based on the permeate flow rate. In some cases, the total amount of the added solvent-water mixture depends on the initial GO amount. In some cases, the permeate is discarded.

Example 3: Air-Blown Drying

Purified GO cakes on the micro-filter are rinsed with a pure polar solvent to dehydrate the GO cakes. The dehydrated GO cakes are then air blown at ambient temperature to facilitate the evaporation of any residual solvent from the GO cakes.

Example 4: GO Sheets

In a fourth example, exemplary sheets of GO material, flakes are formed by drop-casting the GO material onto a silicon wafer, drying the GO material and the wafer for a period of time of about 12 hours, and coating the dried GO material with a thin layer of silicon dioxide. In some embodiments, the exemplary optical microscope images of the device formed thereby display the lateral size distribution of the GO sheets.

While preferred embodiments of the present disclosure have been shown and described herein, it will be obvious to those skilled in the art that such embodiments are provided by way of example only. Numerous variations, changes, and substitutions will occur to those skilled in the art without departing from the disclosure. It should be understood that various alternatives to the embodiments of the disclosure described herein may be employed in practicing the embodiments disclosed herein. It is intended that the following claims define the scope of the disclosure and that methods and structures within the scope of these claims and their equivalents be covered thereby.

Terms and Definitions

Unless otherwise defined, all technical terms used herein have the same meaning as commonly understood by one of ordinary skill in the art. As used in this specification and the appended claims, the singular forms "a," "an," and "the" include plural references unless the context clearly dictates otherwise. Any reference to "or" herein is intended to encompass "and/or" unless otherwise stated.

As used herein, and unless otherwise defined, the term "about" refers to a range of values within plus and/or minus 10% of the specified value.

As used herein, and unless otherwise specified, the term "GO" refers to graphene oxide.

As used herein, and unless otherwise specified, the term "solvent" refers to a substance that dissolves a solute, resulting in a solution.

As used herein, and unless otherwise specified, the term "polar solvent" refers to a solvent with large dipole moments that contain bonds between atoms with very different electronegativities.

As used herein, and unless otherwise specified, the term "polar protic solvent" refers to a solvent that solvates anions via hydrogen bonding.

As used herein, and unless otherwise specified, the term "alcohol" refers to an organic compound in which the hydroxyl functional group (OH) is bound to a saturated carbon atom.

As used herein, and unless otherwise specified, the term "centrifugal filtering" refers to a process that involves the application of the centrifugal force on the sedimentation of heterogeneous mixtures within a centrifuge to separate two miscible substances.

As used herein, and unless otherwise specified, the term "filter" refers to a semi-permeable membrane.

As used herein, and unless otherwise specified, the term "dead-end filtering" refers to a process of filtration comprising passing a feed solution perpendicularly through a filter, wherein the filter prevents a retentate from flowing through and wherein the filter allows a permeate to flow through.

As used herein, and unless otherwise specified, the term "cross-flow filtering" refers to a process of filtration comprising passing a feed solution tangentially through a filter, wherein the filter prevents a retentate from flowing through and wherein the filter allows a permeate to flow through.

As used herein, and unless otherwise specified, the term "surface filtering" refers to a process of filtration comprising passing a feed solution through a solid sieve, wherein the solid sieve prevents a retentate from flowing through and wherein the solid sieve allows a permeate to flow through.

As used herein, and unless otherwise specified, the term "depth filtering" refers to a process of filtration comprising passing a feed solution through a bed of granular material, wherein the bed prevents a retentate from flowing through and wherein the bed allows a permeate to flow through.

As used herein, and unless otherwise specified, the term "vacuum filtering" refers to a process of filtration comprising applying pressure to a feed solution as it passes through a filter, wherein the filter prevents a retentate from flowing through and wherein the filter allows a permeate to flow through.

As used herein, and unless otherwise specified, the term "recirculation filtering" refers to a process of filtration comprising passing a feed solution through a filter, wherein the filter prevents a retentate from flowing through, wherein the filter allows a permeate to flow through, and wherein the retentate or the permeate are recirculated into the feed solution.

As used herein, and unless otherwise specified, the term "Buchner funnel" refers to a funnel that comprises a filter or filter paper.

As used herein, and unless otherwise specified, the term "belt filter" refers to a filter comprising a pair of filtering cloths and belts that is passed through a system of rollers.

As used herein, and unless otherwise specified, the term "drum filter" refers to a drum, the walls of which comprise a semipermeable membrane that is rotated to filter a media within.

As used herein, and unless otherwise specified, the term "microfilter" refers to a filter with a pore size of about 0.1 μm to about 10 μm.

As used herein, and unless otherwise specified, the term "ultrafilter" refers to a filter with a pore size of about 0.01 μm to about 0.1 μm.

While preferable embodiments of the present methods and devices taught herein have been shown and described herein, it will be obvious to those skilled in the art that such embodiments are provided by way of example only. Numerous variations, changes, and substitutions will occur to those skilled in the art without departing from the methods and devices taught herein. It should be understood that various alternatives to the embodiments of the methods and devices taught herein described herein may be employed in practicing the methods and devices taught herein. It is intended that the following claims define the scope of the methods and devices taught herein and that methods and structures within the scope of these claims and their equivalents be covered thereby.

Other Non-Limiting Embodiments

Graphene oxide is a layered material that consists of hydrophilic oxygenated graphene sheets. The GO sheets commonly possess oxygen functional groups on their basal planes and edges. GO is typically obtained by strong oxidation of graphite, which subsequently transforms hydrophobic graphite into hydrophilic GO. Since the landmark discovery of graphene, great attention has been given to GO as a synthetic precursor for the large-scale chemical production of graphene. GO features a single lamellar structure of carbon-like graphene. However, unlike graphene, GO bears a large number of oxygen-containing functional groups, which makes GO dispersible in several types of solvents. The unique characteristics of GO allow it to be used for many promising carbon-based applications and as an excellent precursor to graphene. GO has been employed in nanocomposite materials, polymer composite materials, energy storage, and biomedical applications; in catalysis; and as a surfactant.

The most common method for producing GO is a modified version of Hummers' method. The original method was developed by Hummers and Offeman and required concentrated sulfuric acid, sodium nitrate, and potassium permanganate in order to oxidize the graphite. The reaction has since been modified and simplified in many ways by many different researchers, but in every case the by-products and impurities include an array of ions (e.g., $K^+$, $H^+$, $Mn^{2+}$ and $SO_4^{2-}$) that outweigh the GO product by several times over. This large quantity of impurities, existing as ionic species in the slurry, makes purification of this very useful product very time, energy, and water intensive. The oxygen functionalities on the surface of GO make the product very hydrophilic and cause typical filtration methods such as dead-end filtration to be painfully slow. To make matters more difficult, GO forms a charge-stabilized colloid that becomes more dispersive in water as the solution becomes purer. This leads to an incredibly viscous solution even at concentrations as low as 2% by mass, causing more advanced filtration techniques such as tangential flow filtration to become very energy intensive because of the inability of the solutions to flow with ease.

Purification is an essential step to assure stability and safety of the final GO product. Several downstream applications of GO cannot tolerate even small concentrations of impurities. In fact, purification is frequently regarded as the primary challenge for industrial production of GO mainly due to the unique chemical properties of GO. To remove the large amounts of impurities present in the reaction solution, GO is typically either subjected to dialysis or diafiltration.

Dialysis is commonly used to purify GO suspensions in laboratory applications because of its ease of operation. However, dialysis is typically considered an extremely slow process because the main driving force for solute mass transfer across a dialysis membrane significantly decreases as the solution is purified and the difference in free solute concentration across the membrane also is reduced. The slow mechanism of dialysis makes this process take several days, and often several weeks, to complete the purification and thus is not appropriate to be employed in industrial-scale GO production.

Diafiltration is a dilution process that employs a washing process along with a filtration process. Diafiltration typically uses micro-molecular permeable filters that separate suspended solids but permeate salts. For diafiltration, the washing process dilutes the salts and suspended solids, while the filtration process recovers only the suspended solids (e.g., the GO particles). Consequently, GO diafiltration dilutes salts but sustains GO in the GO solution. Compared with dialysis, diafiltration demands much less time because the solute mass transfer rate in diafiltration can be mechanically controlled by the hydraulic pressure exerted in a filtration membrane. There are various protocols for GO filtration and washing. Typically, the alkaline metal salts are first rinsed out using HCl, followed by thorough washing with water. An excess amount of HCl is used to maintain pH as low as around 0 for suppressing GO gelation. Then, either dead-end filtration or cross-flow filtration is employed in GO purification to reach completion.

In dead-end filtration, all the feed solution is forced to flow directly into a filter, wherein the rejected components accumulate in the feed solution and thus accelerate filter clogging and fouling. In cross-flow filtration, the feed solution flows parallel to a filter surface with the inlet feed stream entering the filtration module at a certain composition. Filter clogging and fouling are lessened with cross-flow filtration because of its enhanced back diffusion of foulants controlled by cross-flow velocity.

A filter press is a conventional apparatus to achieve dead-end filtration for a slurry type of suspension such as a GO dispersion. For GO purification with a filter press, the GO slurry is first transferred to several chambers clothed with micro-filters. Then, HCl or water is added into the chambers, and the chambers are pressed altogether to extrude the liquid out of the GO suspension through the filter cloth or the membrane filter.

Cross-flow filtration can also be applied to purify GO suspensions. In one embodiment, a GO slurry is first washed with HCl in a filter press. For subsequent washing with water, cross-flow filtration can be used; the HCl-washed GO slurry is transferred to the cross-flow filtration unit under a certain pressure level and is washed with water, while the pressurized filtration unit permeates wastewater containing the salts but free of GO particles. Fresh wash water should be continuously added to the cross-flow filtration system at a flow rate comparable to the permeating rate of wastewater. The GO suspension is purified through the cross-flow diafiltration until impurities in the GO suspension are reduced to the desired level.

A challenge for GO filtration is that GO tends to gel in aqueous media. GO gelation is enhanced as the suspension is purified and contains fewer salts. GO gelation significantly complicates filtration-based purification methods since the gelated GO cake blocks the filter pores and the flow channel in the filter module.

After a GO suspension is purified, the GO suspension can be dried to convert it to a solid form. Typically, vacuum freeze-drying is employed to turn a GO suspension into a dry powder, despite its high cost on an industrial scale, because freeze-drying minimizes the change in the physiochemical properties of GO compared with heating-based drying. However, it has been reported that commercially available freeze-dried GO loses its original dispersibility and thus limits its use for several downstream applications. The freeze-drying process is considered to cause partial restacking of the GO sheets, which forms GO aggregates that cannot be broken up during re-dispersion.

The foregoing shortcomings of conventional purification and drying methods are addressed in the present embodiments. It is to be understood that both the following general description and the following detailed description are exemplary and explanatory only and are not restrictive, as claimed. Provided are methods for solvent-assisted purification and drying of GO. The methods utilize a polar solvent to facilitate the GO filtration process and the GO drying process. Compared with using pure water as a washing solution in GO filtration, the use of a polar solvent significantly reduces the gelation of GO and thus minimizes the filter clogging by gelled GO cakes. The methods described do not need any acid solution such as HCl to suppress GO gelation. The methods do not necessarily need a pure polar solvent as a washing solution; a solvent-water mixture can also be applied. The use of a solvent-water mixture as a washing solution benefits the methods to enhance salt solubility of the washing solution while still depressing GO gelation. The polar solvent should have the following characters: high polarity, high salt solubility, good water miscibility, low viscosity, low toxicity, and neutral pH.

The following examples describe the present disclosure in more detail. It is to be understood that the foregoing detailed descriptions are exemplary and explanatory only and are not restrictive, as claimed.

A fresh GO suspension prepared by the modified Hummers' method exhibits strong acidity (pH<0) and high salt concentration (40-55 g/L). The fresh GO suspension is dewatered using either a centrifuge or a dead-end filter. The dewatering process leads to a volume reduction of up to 90%, which minimizes the demand for the following washing process. The dewatered GO cakes are placed on a micro-filter and then washed with a solvent-water mixture under vacuum. The amount of washing with the solvent-water mixture depends on the initial GO amount. After the washing process, the purified GO cakes are collected from the micro-filter.

After the washing process as described above, the purified GO cakes on the micro-filter are rinsed further with a pure polar solvent to dehydrate the GO cakes. The dehydrated GO cakes are air blown at ambient temperature to facilitate the evaporation of any residual solvent from the GO cakes. After the air-blowing process, ambient-dried GO cakes are collected, which are readily dispersible in either pure water or polar solvents.

Fresh GO is prepared by a modified Hummers' method. The fresh GO suspension is dewatered using either a centrifuge or a dead-end filter. The dewatered GO cakes are diluted with a solvent-water mixture back to the initial volume of the fresh GO suspension. The diluted GO suspension is placed in a process reservoir that is connected to a cross-flow microfiltration unit through a recirculation pump. The pump circulates the diluted GO suspension from the process reservoir, through the micro-filter and back to the process reservoir at a controlled flow rate and pressure. While the GO recirculation through the micro-filter produces the permeate flow, a solvent-water mixture is continuously added to the process reservoir by means of the flow rate based on the permeate flow. The total amount of the added solvent-water mixture depends on the initial GO amount. After the diafiltration process, the purified GO suspension is collected from the process reservoir.

Graphite oxide is a layered material that consists of hydrophilic oxygenated graphene sheets. The unique characteristics of GO allow it to be used for many promising carbon-based applications and as an excellent precursor to graphene. Purification is an essential step to assure stability and safety of the final GO product. In fact, purification is frequently regarded as the primary challenge for industrial production of GO mainly due to the extreme gelation of GO. Provided herein are methods utilizing solvent-assisted purification and the drying of GO. Exemplary methods can utilize a polar solvent to facilitate GO filtration process and GO drying process. Compared with using pure water as a washing solution in GO filtration, the use of a polar solvent significantly reduces the gelation of GO and thus minimizes the filter clogging by gelated GO cakes. The methods described herein do not necessarily use a pure polar solvent as a washing solution; the solvent-water mixture can also be applied in the methods. The use of solvent-water mixture as a washing solution benefits the methods to enhance salts solubility of the washing solution while still depressing GO gelation. The polar solvent should have the following characters: high polarity, high salt solubility, good water miscibility, low viscosity, low toxicity, and neutral pH. The following examples describe the present disclosure in more detail. It is to be understood that both the foregoing detailed descriptions are exemplary and explanatory only and are not restrictive, as claimed.

Example 1

A fresh GO suspension prepared by the modified Hummers' method exhibits strong acidity (pH<0) and high salt concentration (40-55 g/L). The fresh GO suspension is dewatered using either a centrifuge or a dead-end filter. The dewatering process leads to a volume reduction of up to 90%, which minimizes the demand for the following washing process. The dewatered GO cakes are placed on a microfilter and then washed with a solvent-water mixture under vacuum. The amount of washing with the solvent-water mixture depends on the initial GO amount. After the washing process, the purified GO cakes are collected from the microfilter.

Example 2

After the washing process in Example 1, the purified GO cakes on the microfilter are rinsed further with a pure polar solvent to dehydrate the GO cakes. The dehydrated GO cakes are air-blown at ambient temperature to facilitate the evaporation of any residual solvent from the GO cakes. After the air-blowing process, ambient-dried GO cakes are collected, which are readily dispersible in either pure water or polar solvents.

Example 3

Fresh GO is prepared by a modified Hummers' method. The fresh GO suspension is dewatered using either a centrifuge or a dead-end filter. The dewatered GO cakes are diluted with a solvent-water mixture back to the initial volume of the fresh GO suspension. The diluted GO suspension is placed in a process reservoir that is connected to a cross-flow microfiltration unit through a recirculation pump. The pump circulates the diluted GO suspension from the process reservoir, through the microfilter, and back to the process reservoir at a controlled flow rate and pressure. While the GO recirculation through the microfilter produces the permeate flow, a solvent-water mixture is continuously added to the process reservoir by means of the flow rate based on the permeate flow. The total amount of the added solvent-water mixture depends on the initial GO amount. After the diafiltration process, the purified GO suspension is collected from the process reservoir.

The most common method for producing GO is a modified version of Hummers' method. The original method was developed by Hummers and Offeman and required concentrated sulfuric acid, sodium nitrate, and potassium permanganate in order to oxidize the graphite. The reaction has since been modified and simplified in many ways by many different researchers, but in every case the by-products and impurities include an array of ions (e.g., $K^+$, $H^+$, $Mn^{2+}$, and $SO_4^{2-}$) that outweigh the GO product by several times over. This large quantity of impurities, existing as ionic species in the slurry, makes purification of this very useful product very time, energy, and water intensive. The oxygen functionalities on the surface of GO make the product very hydrophilic and cause typical filtration methods such as dead-end filtration painfully slow. To make matters more difficult, GO forms a charge stabilized colloid that becomes more dispersive in water as the solution becomes purer. This leads to an incredibly viscous solution even at concentrations as low as 2% by mass, causing more advanced filtration techniques such as tangential flow filtration to become very energy intensive because of the inability of the solution to flow with ease.

Purification is an essential step to assure stability and safety of the final GO product. In fact, purification is frequently regarded as the primary challenge for industrial production of GO mainly due to the unique chemical properties of GO. To remove the large amounts of impurities present in the reaction solution, GO is typically either subjected to dialysis or diafiltration. However, dialysis is typically considered an extremely slow process because the main driving force for solute mass transfer across a dialysis membrane significantly decreases as the solution is purified and the difference in free solute concentration across the membrane also is reduced. This slow mechanism of dialysis makes this process take several days, and often several weeks, to complete the purification and thus is not appropriate to be employed in an industrial-scale GO production. Diafiltration is a dilution process that employs a washing process along with a filtration process. For diafiltration, the washing process dilutes the salts and suspended solids, while the filtration process recovers only the suspended solids (e.g., the GO particles). Consequently, GO diafiltration dilutes salts but sustains GO in the GO solution. Compared with dialysis, diafiltration demands much less time because the solute mass transfer rate in diafiltration may be mechanically controlled by the hydraulic pressure exerted in a filtration membrane. A challenge for GO filtration is that GO tends to gel in aqueous media. GO gelation is enhanced as the suspension is purified and contains fewer salts. GO gelation significantly complicates filtration-based purification methods since the gelated GO cake blocks the filter pores and the flow channel in the filter module. After a GO suspension is purified, the GO suspension can be dried to convert it to a solid form. Typically, vacuum freeze-drying is employed to turn a GO suspension into a dry powder, despite its high cost on an industrial scale, because freeze-drying minimizes the change in the physiochemical properties of GO compared with heating-based drying. However, it has been reported that commercially available freeze dried GO loses its original dispersibility and thus limits its use for several downstream applications. The freeze-drying process is considered to cause partial restacking of the GO sheets, which forms GO aggregates that cannot be broken up during redispersion. The above shortcomings of conventional purification and drying methods are addressed in the present embodiments. Disclosed embodiments employ solvent-assisted purification and drying of GO. Methods described herein utilize a polar solvent to facilitate the GO filtration process and the GO drying process. Compared with using pure water as a washing solution in GO filtration, the use of a polar solvent significantly reduces the gelation of GO and thus minimizes the filter clogging by gelled GO cakes. Embodiments provided herein enable the purification process to avoid using any acid solution such as HCl to suppress GO gelation. Diafiltration is the most common method to purify the GO suspension, and there are various protocols for GO filtration and washing. Typically, the alkaline metal salts are first rinsed out using HCl, followed by thorough washing with water. An excess amount of HCl is used to maintain pH as low as around 0 for suppressing GO gelation. Then, either dead-end filtration or cross-flow filtration is employed in GO purification to reach completion. In dead-end filtration, all the feed solution is forced to flow directly into a filter, wherein the rejected components accumulate in the feed solution and thus accelerate filter clogging and fouling. In cross-flow filtration, the feed solution flows parallel to a filter surface with the inlet feed stream entering the filtration module at a certain composition. Filter clogging and fouling are lessened with cross-flow filtration because of its enhanced back diffusion of foulants controlled by cross-flow velocity. A filter press is a conventional apparatus to achieve dead-end filtration for a slurry type of suspension such as a GO dispersion. For GO purification with a filter press, the GO slurry is first transferred to several chambers clothed with microfilters. Then, HCl or water is added into the chambers, and the chambers are pressed altogether to extrude the liquid out of the GO suspension through the filter cloth or the membrane filter. A challenge for GO filtration is that GO tends to gel in aqueous media. GO gelation is enhanced as the suspension is purified and contains fewer salts. GO gelation significantly complicates filtration-based purification methods since the gelated GO cake blocks the filter pores and the flow channel in the filter module.

The invention claimed is:

1. A method of forming a purified graphene oxide (GO) material comprising:
forming a GO suspension comprising GO;
dewatering the GO suspension with a first filter to form a dewatered GO suspension;
forming a GO solution comprising the dewatered GO suspension and a solvent solution comprising a solvent; and
filtering the GO solution through a second filter to form the purified GO material having a particle size of about 2 μm to about 50 μm,
wherein filtering the GO solution comprises dead-end filtering and vacuum filtering, and
wherein a hydraulic pressure exerted upon the GO suspension is about 1 pound per square inch (psi) to about 5 psi.

2. The method of claim 1, wherein filtering the GO solution further comprises centrifugal filtering, cross-flow filtering, stationary phase filtering, dynamic phase filtering, surface filtering, depth filtering, recirculation filtering, or any combination thereof.

3. The method of claim 2, wherein filtering the GO solution comprises cross-flow recirculation filtering of the GO solution to form a retentate and a permeate, wherein the retentate is added to the GO solution.

4. The method of claim 3, further comprising continually adding a volume of the solvent solution to the GO solution during the cross-flow recirculation filtering of the GO solution.

5. The method of claim 4, wherein the volume of the solvent solution is added to the GO solution at a solvent solution flow rate approximately equal to a flow rate of the permeate.

6. The method of claim 4, wherein for a first period of time the solvent solution comprises at least one of water and the solvent, and for a second period of time the solvent solution comprises water or the solvent.

7. The method of claim 1, wherein a percent by mass of the GO in the GO suspension is about 0.05% to about 2%.

8. The method of claim 1, wherein dewatering the GO suspension comprises centrifugal filtering, dead-end filtering, cross-flow filtering, stationary phase filtering, dynamic phase filtering, surface filtering, depth filtering, vacuum filtering, recirculation filtering, or any combination thereof.

9. The method of claim 1, wherein the solvent solution comprises a protic solvent.

10. The method of claim 1, wherein a percent by mass of the GO suspension in the GO suspension and the solvent solution is about 10% to about 60%.

11. The method of claim 1, wherein a mass of the GO suspension per an area of the second filter is about 3 kilograms per meter squared (kg/m$^2$) to about 30 kg/m$^2$.

12. The method of claim 1, wherein filtering the dewatered GO suspension and the solvent solution comprises depositing the dewatered GO suspension onto the second filter and then depositing the solvent solution onto the dewatered GO suspension on the second filter.

13. The method of claim 1, wherein at least one of the first filter and the second filter comprise a Buchner funnel, a surface filter, a sieve, a filter paper, a belt filter, a drum filter, a cross-flow filter, a screen filter, a depth filter, a polymeric membrane, a ceramic membrane, a stainless steel filter, a stainless steel mesh, a carbon fiber mesh, a microfilter, an ultrafilter, a membrane, or any combination thereof.

14. The method of claim 1, wherein the second filter is the first filter.

15. The method of claim 1, further comprising drying the GO suspension and the solvent solution.

16. The method of claim 15, wherein drying the GO suspension is performed by air blowing, dry evaporation, heating, oven heating, freeze-drying, or any combination thereof.

17. The method of claim 16, wherein the air blowing is performed with a dry gas stream at a pressure of about 10 psi to about 30 psi.

18. The method of claim 16, wherein the heating is performed at a temperature of about 10° C. to about 50° C.

19. The method of claim 1, wherein the GO material comprises GO powder, an anhydrous GO powder, an intercalated GO powder, an exfoliated GO powder, a single layer GO material, a water dispersible GO material, a dispersible GO material, an aqueous GO material, a GO ink, a GO paste, a GO solution, a GO fluid, a GO liquid, a GO paint, a GO dye, a GO coating, a GO compound, or any combination thereof.

20. The method of claim 1, wherein the purified GO material has a surface area of about 800 m$^2$/g to about 2,400 m$^2$/g.

21. The method of claim 1, wherein the purified GO material has a conductivity of about 0.1 siemens per meter (S/m) to about 5 S/m.

22. The method of claim 1, wherein the purified GO material has an oxidation percentage of about 15% to about 60%.

23. The method of claim 1, wherein the solvent comprises ethyl acetate, tetrahydrofuran, dichloromethane, acetone, acetonitrile, dimethylformamide, dimethyl sulfoxide, acetic acid, n-butanol, isopropanol, n-propanol, ethanol, methanol, formic acid, or any combination thereof.

24. The method of claim 1, wherein the solvent comprises an alcohol.

25. The method of claim 24, wherein the alcohol comprises methanol, ethanol, propan-2-ol, butan-1-ol, pentan-1-ol, hexadecan-1-ol, ethane-1,2-diol, propane-1,2-diol, propane-1,2,3-triol, butane-1,2,3,4-tetraol, pentane-1,2,3,4,5-pentol, hexane-1,2,3,4,5,6-hexol, heptane-1,2,3,4,5,6,7-heptol, prop-2-ene-1-ol, 3,7-dimethylocta-2,6-dien-1-ol, prop-2-yn-1-ol, cyclohexane-1,2,3,4,5,6-hexol, 2-(2-propyl)-5-methyl-cyclohexane-1-ol, or any combination thereof.

\* \* \* \* \*